United States Patent
Maruyama

(10) Patent No.: US 8,060,723 B2
(45) Date of Patent: Nov. 15, 2011

(54) MEMORY MANAGEMENT DEVICE

(75) Inventor: Naotaka Maruyama, Fujisawa (JP)

(73) Assignee: Kernelon Silicon Inc., Fujisawa-Shi (JP)

( * ) Notice: Subject to any disclaimer, the term of this patent is extended or adjusted under 35 U.S.C. 154(b) by 357 days.

(21) Appl. No.: 12/281,603

(22) PCT Filed: Jan. 10, 2007

(86) PCT No.: PCT/US2007/050131
§ 371 (c)(1),
(2), (4) Date: Sep. 3, 2008

(87) PCT Pub. No.: WO2008/084531
PCT Pub. Date: Jul. 17, 2008

(65) Prior Publication Data
US 2011/0246728 A1 Oct. 6, 2011

(51) Int. Cl.
*G06F 13/00* (2006.01)
(52) U.S. Cl. .......... 711/208; 711/151; 711/166
(58) Field of Classification Search .......... 711/151, 711/166, 208
See application file for complete search history.

(56) References Cited

U.S. PATENT DOCUMENTS

| | | |
|---|---|---|
| 2003/0093610 A1 | 5/2003 | Lai et al. |
| 2004/0004964 A1* | 1/2004 | Lakshmanamurthy et al. .............. 370/394 |
| 2005/0213603 A1* | 9/2005 | Karighattam et al. ........ 370/463 |

FOREIGN PATENT DOCUMENTS

| | | |
|---|---|---|
| JP | 04030232 | 2/1992 |
| JP | 2003316645 | 11/2003 |
| WO | WO9844420 | 10/1998 |

OTHER PUBLICATIONS

International Search Report, International application No. PCT/JP2007/050131, Japanese Patent Office, May 22, 2007.
International Preliminary Report on Patentability and Written Opinion of the International Searching Authority, International application No. PCT/JP2007/050131, The International Bureau of WIPO, Jul. 14, 2009.

* cited by examiner

Primary Examiner — Reba I. Elmore
(74) Attorney, Agent, or Firm — Lewis and Roca LLP

(57) ABSTRACT

A second memory stores data in units of segments. An assignment control circuit sets up a buffer space as a logical address space. A buffer space is formed as a set of at least one segment. A state storage circuit stores association between a buffer space and segments as segment assignment information. An address conversion circuit refers to segment assignment information to convert a logical address into a physical address. A segment queue stores a free segment and a buffer queue stores a free buffer. The state storage circuit includes a plurality of register groups each of which includes a plurality of segment registers. A register group is associated with one of the plurality of buffer spaces. A range number identifying a range of logical addresses in the associated buffer space is set up in a segment register.

9 Claims, 39 Drawing Sheets

FIG.9

| SegOdr \ BFID | 0 | 1 | 2 | 3 | 4 | ...... | 7 |
|---|---|---|---|---|---|---|---|
| 0 | 0 | 10 | 7 | 5 | 14 | | — |
| 1 | 2 | — | 8 | 9 | 17 | | — |
| 2 | 3 | — | 15 | 11 | — | | — |
| 3 | — | — | 16 | — | — | | — |
| 4 | — | — | 20 | — | — | | — |
| 5 | — | — | 21 | — | — | | — |
| 6 | — | — | — | — | — | | — |
| 7 | — | — | — | — | — | | — |
| ⋮ | ⋮ | ⋮ | ⋮ | ⋮ | ⋮ | | ⋮ |
| 15 | — | — | — | — | — | | — |

MEMORY MANAGEMENT DEVICE

CROSS-REFERENCE TO RELATED APPLICATIONS

The present application is a national phase application from Patent Cooperation Treaty application number PCT/JP2007/050131 filed Jan. 10, 2007, the disclosure of which is incorporated herein by reference.

BACKGROUND OF THE INVENTION

1. Technical Field

The present invention relates to a memory management technology.

2. Description of the Related Art

In association with the development of highly-functional, low-cost electronic devices (e.g., central processing units (CPUs)), many embedded systems such as cell phones now include a highly-advanced operating system (OS). Various functions are required of an OS in accordance with the performance and usage of systems. Of these, memory management function represents a core function.

Due to the constraints in the size of housings and fabrication cost, the capacity of memories that can be built into a system is limited. The constraints are particularly rigorous in embedded systems so that efficient use of limited memory resources is called for. Also, many systems strictly require that a process be completed within a predefined period of time. In the case of systems with severe time requirements, overhead associated with memory management processes significantly affects the performance of the system as whole.

SUMMARY OF THE INVENTION

A general purpose of the present invention is to provide a technology capable of implementing high-speed and high-efficient memory management functions.

One aspect of the present invention relates to a memory management device.

The device comprises: an execution control circuit operative to execute at least one task; a memory operative to store data in units of segments; an assignment control circuit operative to assign to a task a buffer space accessed by a logical address; an address conversion circuit operative to convert a logical address into a physical address; a state storage circuit operative to store, as segment assignment information, the association between a buffer space and a segment; a segment queue; and a buffer queue.

The state storage circuit includes a plurality of register groups each including a plurality of segment registers. Each register group is associated with one of the plurality of buffer spaces. A segment register stores a range number identifying a range of logical addresses in the associated buffer space.

The assignment control circuit, upon receipt of a buffer acquisition request, sets up association between a buffer space and a segment by acquiring a buffer ID and at least one segment ID from the buffer queue and the segment queue, respectively, and by recording the at least one segment ID thus acquired in at least one segment register in the register group associated with the buffer ID thus acquired. A buffer ID is an ID uniquely identifying a buffer space. A segment ID is an ID uniquely identifying a segment.

The address conversion circuit, upon receipt of a request to access the memory, converts a logical address into a physical address by referring to segment assignment information, identifying a range number which occurs in the register group associated with a task requesting the access and which is associated with the designated logical address, acquiring a segment ID stored in the segment register associated with the range number, and identifying a physical address associated with the segment ID.

A series of steps including assignment of a buffer space to a task, assignment of a segment to a buffer space, and conversion of a logical address into a physical address to allow memory access can be implemented in hardware logic. With this, memories can be managed at a higher speed than with software OSs. By handling buffer spaces in units of segments, the efficiency of use of a memory can be improved.

Optional combinations of the aforementioned constituting elements, and implementations of the invention in the form of methods, systems, recording mediums, and computer programs may also be practiced as additional modes of the present invention.

Accordingly, high-speed and highly-efficient memory management functions can be implemented.

BRIEF DESCRIPTION OF THE DRAWINGS

FIG. 9 shows how segment registers store data in the state storage circuit;

DETAILED DESCRIPTION

A memory management device 100 according to an embodiment of the present invention implements the memory managing function of an OS by an electronic circuit. A brief summary of a commonly practiced memory management method will first be described with reference to FIGS. 1 and 2 and then a problem with the method will be discussed. A brief summary of the memory management method will then be given with reference to FIG. 3. The circuit structure and processing details of the memory management device 100 will be described in detail with reference to FIG. 4 and the subsequent drawings.

The basic configuration of the memory management device 100 will be described to illustrate a "basic implementation" and then two "variations" in which parts of the function are expanded or modified will be described.

Figure 1:
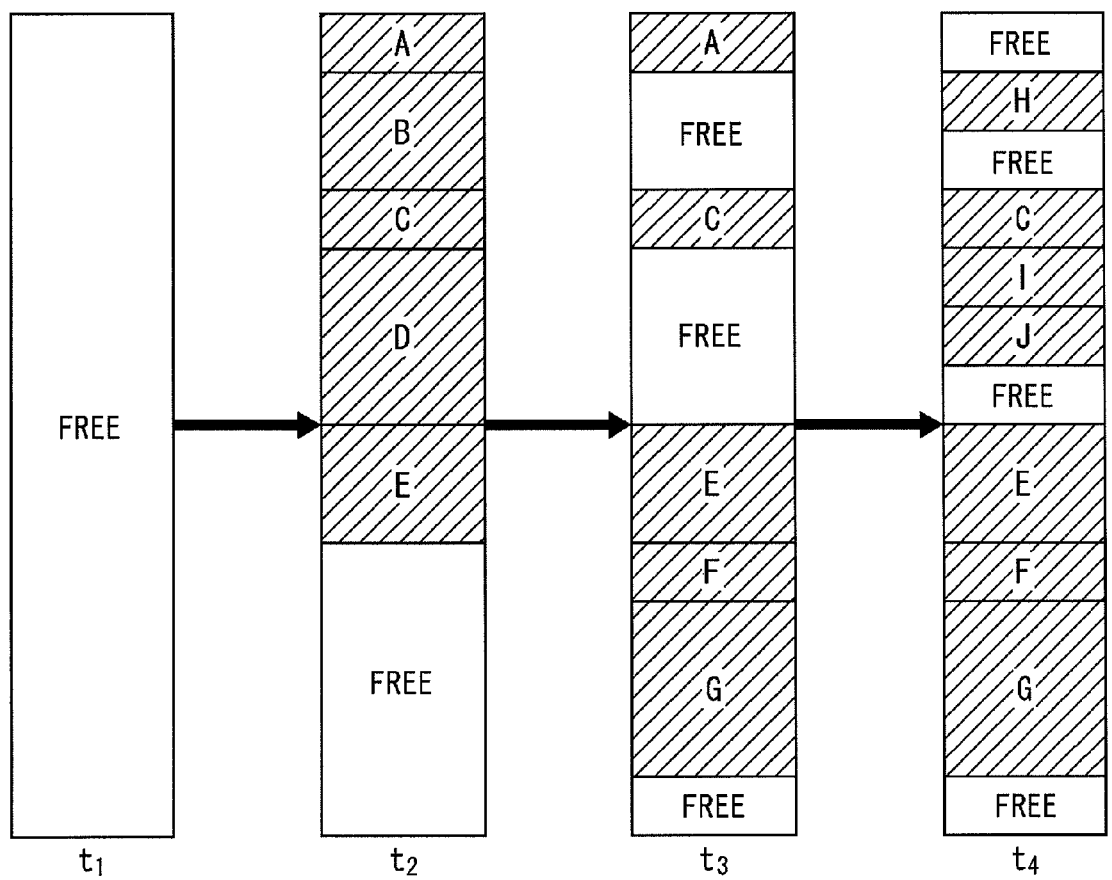
FIG. 1 is a schematic diagram illustrating a free assignment method, an example of commonly used memory management method.

FIG. 1 is a schematic diagram illustrating a free assignment method, an example of commonly used memory management method.

The term "memory" refers to a heap memory. FIG. 1 shows that a heap memory is reserved and released through the steps below.

time t1: The heap memory is initialized. The entire heap memory is free.

time t2: One or more tasks are started. The OS reserves five areas A-E in accordance with requests by the tasks to acquire a memory. Hereinafter, the area labeled "A" will be referred to as "assigned area (A)". Each of the shaded areas in the figure represents an assigned area.

time t3: In the process of executing the task, the OS releases the assigned area (B) and the assigned area (C), based upon requests to release a memory from the task. Meanwhile, the OS reserves the assigned area (F) and the assigned area (G), based upon new requests to acquire a memory.

time t4: In the process of executing the task, the OS releases the assigned area (A). Meanwhile, the OS reserves the assigned area (I) and the assigned area (J) in the heap memory.

In the case of the free assignment method as illustrated, it is necessary to search for a free area sufficient to reserve an assigned area. As reservation and release are repeated, however, free areas will be fragmented.

For this reason, the OS often fails to reserve an assigned area of a required size. The problem discussed above is particularly manifested in communication-oriented applications, which is not initialized for years once the host device is powered on.

Figure 2:
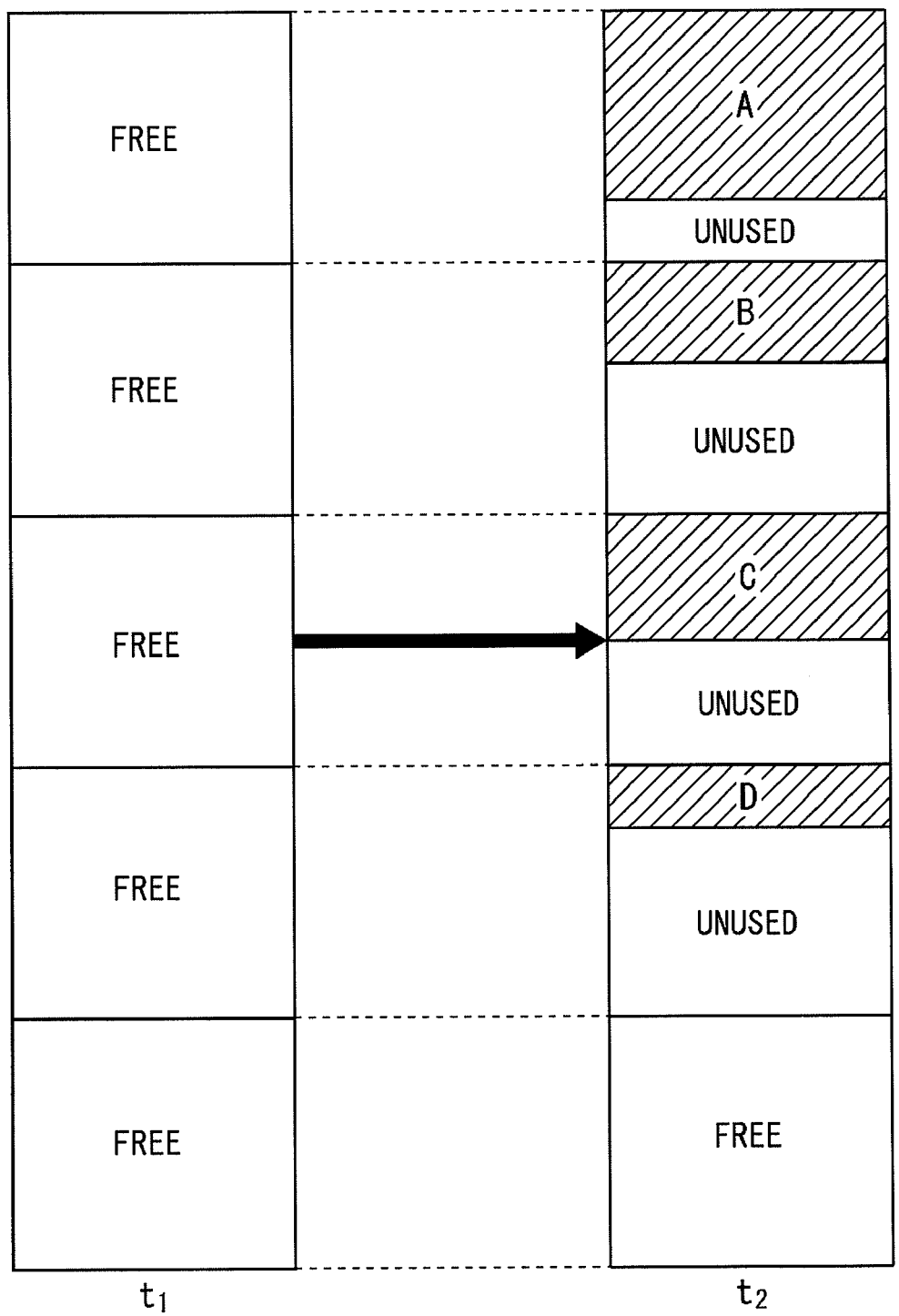
FIG. 2 is a schematic diagram illustrating a fixed memory assignment method, an example of commonly-used memory management method.

FIG. 2 is a schematic diagram illustrating a fixed memory assignment method, an example of commonly-used memory management method.

In a fixed assignment method, a heap memory is divided into "unit areas" of fixed sizes before assignment. Referring to FIG. 2, the heap memory is divided into five unit areas. At time t1, the heap memory is initialized and all five unit areas are free. At time t2, four assignment areas are requested by one or more tasks. The OS reserves an assignment area (A), an assignment area (B), an assignment area (C), and an assignment area (D) in separate unit areas. In the fixed assignment method, one assignment area can be reserved in one unit area.

Since the reservation of at least five assignment areas is ensured in the fixed assignment method shown in FIG. 2, the method will prove useful in a system where the number of assigned areas is five or less. However, the size of an assigned area is limited by the size of a unit area. Further, even an assignment area of a small size occupies a single unit area and so the efficiency of memory usage is poor.

Figure 3:
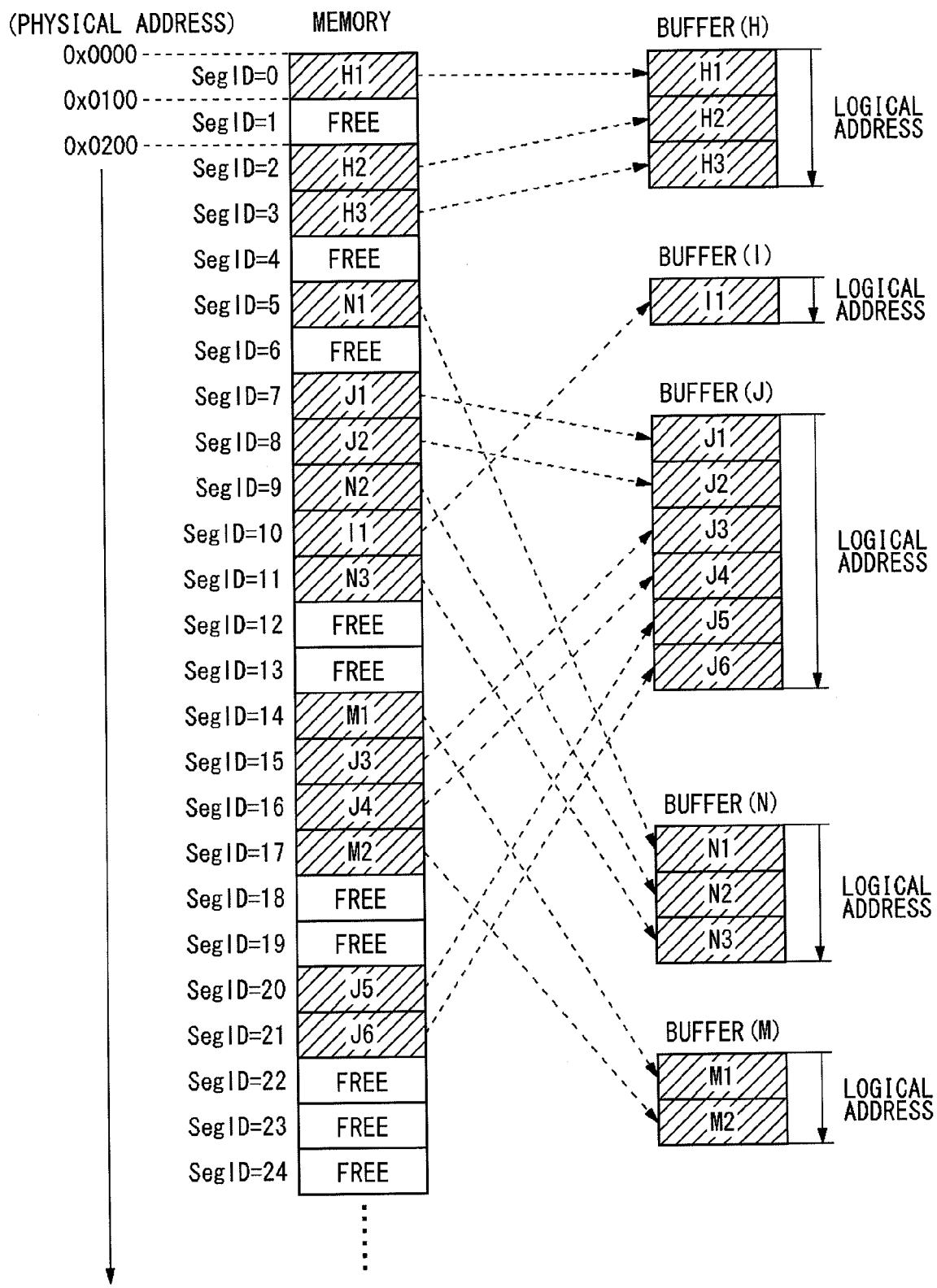
FIG. 3 is a schematic diagram illustrating a memory assignment method.

FIG. 3 is a schematic diagram illustrating a memory assignment method.

In the illustrated memory management method, a heap memory is managed in units of "segments" of, for example, 256 bytes. A heap memory is divided into a plurality of "segments", each of which is assigned an ID called a segment ID (hereinafter, denoted as "SegID"). The size of a segment illustrated is 256 bytes. Thus, the segment with SegID(0) (hereinafter, denoted as "segment (ID:0)") corresponds to physical addresses 0x00000x00FF. The segment (ID:1) corresponds to physical addresses 0x0100-0x01FF. In this way, a SegID defines a range of physical addresses in the heap memory.

Five assigned areas including an assigned area (H), an assigned area (I), an assigned area (J), an assigned area (N), and an assigned area (M) are reserved. The assigned area (H) comprises three segments, namely a segment (ID:0), a segment (ID:2), and a segment (ID:3). The assigned area (H) does not necessarily comprise continuous physical addresses. Since an assigned area does not necessarily comprise continuous physical addresses, the size of an assigned area can be expanded simply by adding any free segment. The free assignment method and the fixed assignment method have a problem in that the methods will produce large free areas not set up as assigned areas. However, according to the memory management method, the efficiency of memory usage is significantly improved by managing free areas in small units, i.e., segments.

Meanwhile, discontinuous physical addresses forming assigned areas will result in the difficulty for a task to identify a physical address to be accessed. In order to address this difficulty, continuous logical addresses are defined in the assigned areas. For example, in the assigned area (H), a segment (H1) is associated with logical addresses "0x0000-0x00FF", the segment (H2) is associated with logical addresses "0x0100-0x01FF", and the segment (H3) is associated with logical addresses "0x0200-0x02FF." Even when the actual physical addresses are not continuous, the logical addresses are continuous in the assigned area. Similarly, the logical addresses of the assigned areas (I) and (J) start with "0x0000." Hereinafter, a logical address space formed by at least one segment will be referred to as a "buffer" or a "buffer space". A buffer may be a logical address space unique to a task. Alternatively, a single task may use a plurality of buffer spaces. In the illustrated case, five buffer spaces, i.e., five logical address spaces, are formed.

To achieve logical address based addressing, a mechanism is called for to convert a logical address designated by a task into a physical address for identifying a physical location in the memory. The address conversion function may be implemented by a memory management function of a software OS. However, a software OS uses the computing power of a CPU for its operation. As such, the execution of processes related to memory management affects the performance in processing an application. In a system with severe requirement for realtime response, it is favorable to reduce overhead associated with memory management as much as possible.

The memory management device 100 achieves high-speed as well as efficient memory management by implementing the memory management method shown in FIG. 3 in hardware logic.

Figure 4:
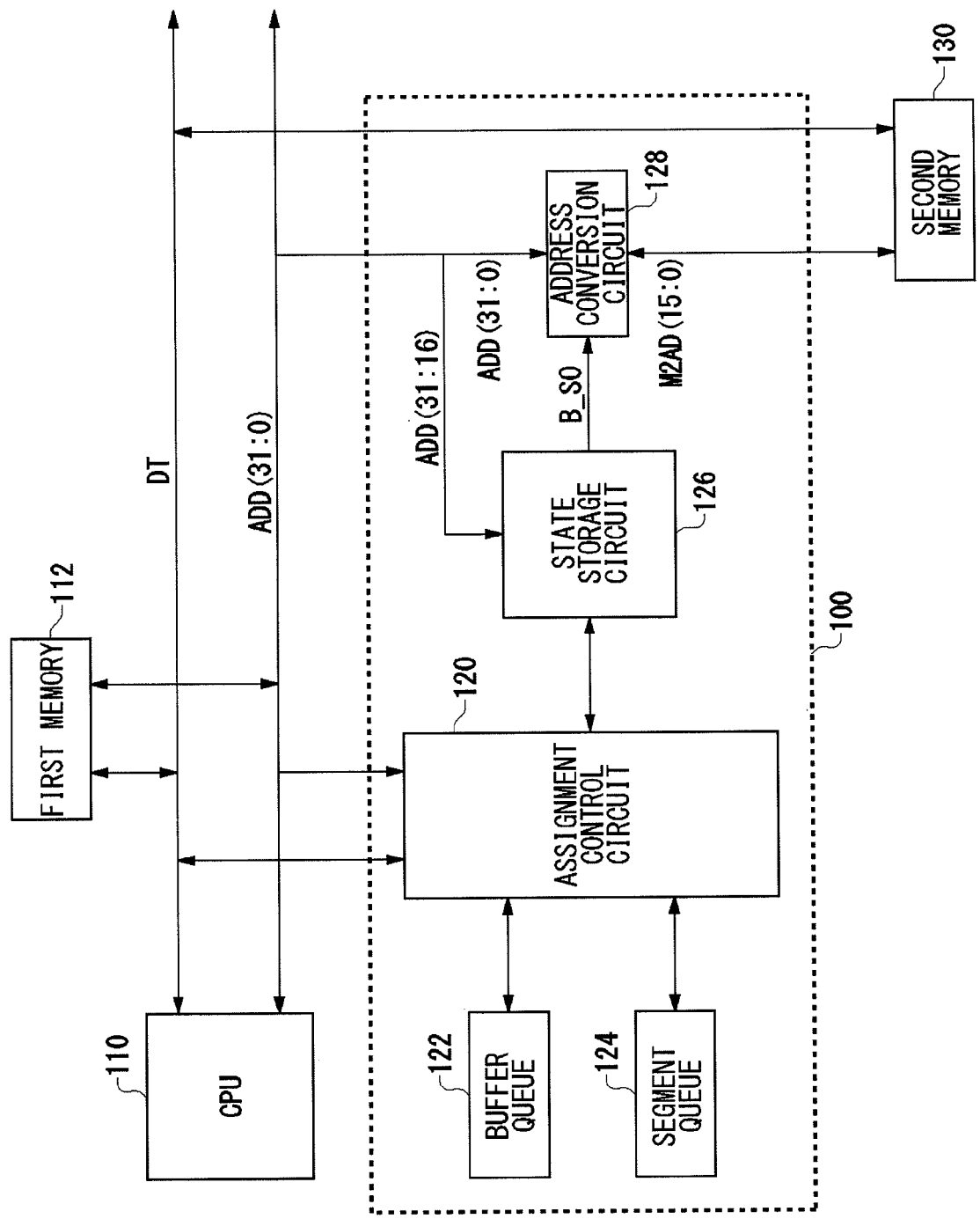
FIG. 4 is a circuit diagram showing a memory management device.

FIG. 4 is a circuit diagram showing the memory management device 100.

An address bus ADD and a data bus DT are connected to a CPU 110. The CPU 110 designates an address in memories via the address bus ADD. The bus ADD has a 32-bit width. The details of the bus ADD will be described with reference to FIG. 5. The CPU 110 transmits and receives data via the data bus DT.

A first memory 112 is connected to the address bus ADD and the data bus DT. The first memory 112 is used by the CPU 110 as a program area and a stack area. The second area 130 is connected to the data bus DT and is connected to the address bus ADD via an address conversion circuit 128. The second memory 130 is used by the CPU 110 as a heap area. As described with reference to FIG. 3, the second memory 130 is divided into a plurality of segments.

An assignment control circuit 120 associates a buffer with segments. The assignment control circuit 120 assigns a buffer to a task and assigns segments to a buffer. The number of buffers and the number of segments are limited. Of a predetermined number of buffers, a buffer queue 122 holds the "buffer ID (hereinafter, referred to as "BFID")" of buffers that are available for assignment. Of a predetermined number of segments, a segment queue 124 holds the segment ID (SegID) of segments available for assignment. The association between buffers and segments is held in a state storage circuit 126 as segment assignment information. In the case shown in FIG. 3, the buffer (H), the segment (ID:0), the segment (ID:2), and the segment (ID:3) are associated with each other to form segment assignment information. The address conversion circuit 128 converts a logical address ADD [31:0] sent out from the CPU 110 into a physical address M2AD [15:0].

In the basic implementation described below and in a variation directed to improvement in transfer process described later, it will be assumed that the maximum number of buffers is eight, the segment size is 256 bytes, the maximum number of segments per buffer is 16, the total number of segments is 128 (=16×8).

The memory management device 100 is formed to include at least the assignment control circuit 120, the buffer queue 122, the segment queue 124, the state storage circuit 126, and the address conversion circuit 128. Alternatively, the device 100 may include the CPU 110, the second memory 130, and the first memory 112. The assignment control circuit 120 will be described in detail with reference to FIG. 7, the state storage circuit 126 with reference to FIGS. 8 and 9, and the address conversion circuit 128 with reference to FIG. 10.

Figure 5:
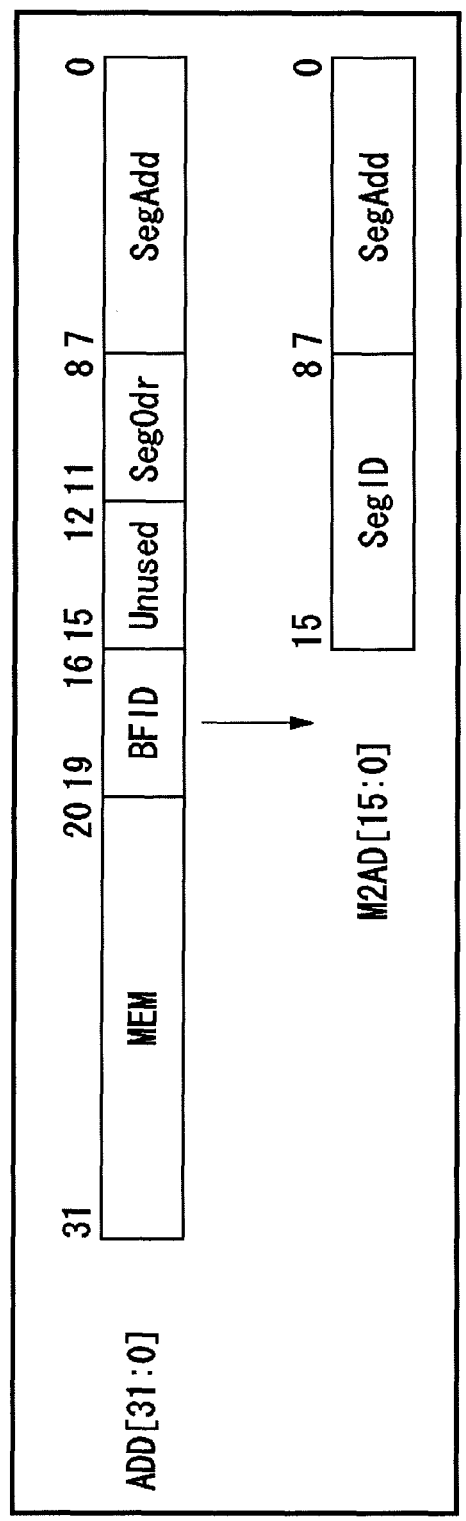
FIG. 5 shows the data structure of a logical address ADD and a physical address M2AD.

FIG. 5 shows the data structure of a logical address ADD and a physical address M2AD.

Memory (MEM): Of the 32-bit logical address ADD[31:0], the highest-order 12 bits ADD[31:20] designate a memory to be accessed. When ADD[31:20]=0, the first memory 112 is the destination of access. When ADD[31:20]=1, the second memory 130 is the destination of access.

Buffer (BFID): The four bits ADD[19:16] designate a buffer space to be accessed. A task is assigned a buffer space responsive to a "buffer acquisition request command" described later. The task acquires the BFID of the buffer space thus assigned to the task and subsequently designates the access destination buffer space using the BFID. Since the maximum number of buffers is eight, BFID varies between 0 and 7.

Segment number (SegOdr): The four bits ADD[11:8] indicates a "segment number (hereinafter, also denoted as "SegOrder" or "SegOdr")". SegOdr is a number for designating a range of logical addresses in a given buffer space. In the case of FIG. 3, the SegOdr's of H1 (segment (ID:0)), H2 (segment (ID:2), and H3 (segment (ID:3) in the buffer (H) are "0", "1", and "2", respectively. A segment number identifies a range of logical addresses in a designated buffer space. Since the maximum number of segments per buffer is 16, a segment number varies between "0 and 15". Hereinafter, a segment identified by SegID=m will be indicated as a "segment (No.: m)". SegID specified a location in the second memory 130 in terms of the physical address. SegOdr designates a location in a buffer space in terms of the logical address. Segment orders will be discussed in further detail with reference to FIG. 6.

Intra-segment address (SegAdd): The eight bits ADD[7:0] indicates an "infra-segment address (hereinafter, also denoted as "SegAdd")". Since a segment has a size of 256 bytes, an intra-segment address varies between "0 and 255".

Thus, the CPU 110 designated a location in the second memory 130 to be accessed, using a logical address ADD[31:0], which includes MEM, BFID, SegOdr, and SegAdd. The address conversion circuit 128 generates a physical address M2AD[15:0] from the logical address ADD[31:0] and the segment assignment information stored in the state storage circuit 126. A specific method of conversion will be described in detail with reference to FIG. 11.

SegId: the highest-order eight bits M2AD[15:8] of a physical address M2AD[15:0] indicates SegID. SegID designates a range of physical addresses and is defined by a segment size.

Intra-segment address (SegAdd): The eight bits M2AD[7:0] indicates an intra-segment address (SegAdd).

In the case shown in FIG. 3, for example, if SegID=1 and SegAdd=0x0004 in M2AD[15:0], the physical address will be 0x0104 (=0x0100+0x0004) since the segment (ID:1) corresponds to physical addresses "0x0100-0x01FF".

Figure 6:
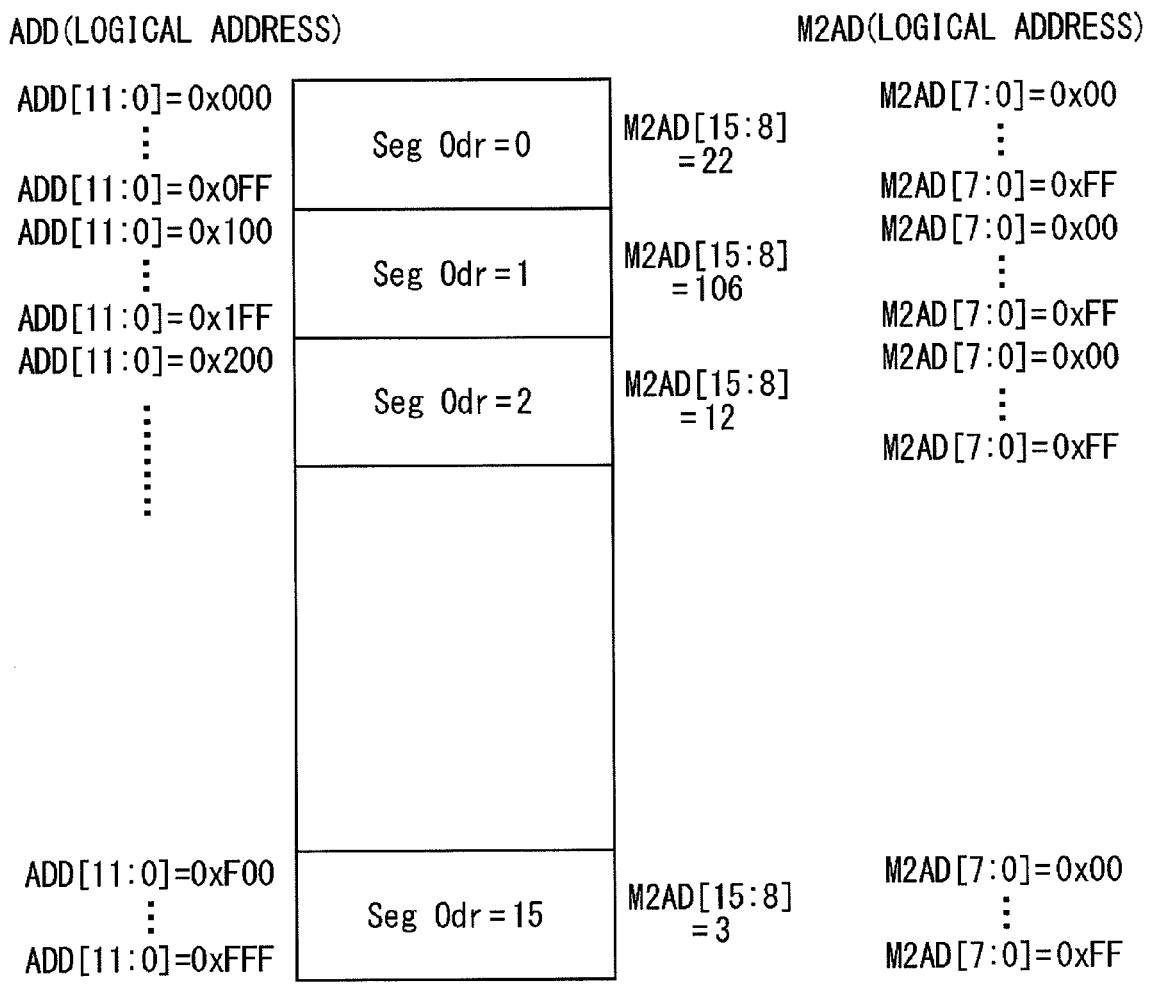
FIG. 6 shows the association between a logical address ADD and a physical address M2AD.

FIG. 6 shows the association between a physical address ADD and a physical address M2AD.

A segment (No.:0) corresponds to logical addresses "0x000-0x0FF". Similarly, a segment (No.: 1) corresponds to logical addresses "0x100-0x1FF."

The segment associated with the position at the start of the buffer space, i.e., the segment (No.:0), is a segment (ID:22). The segment (No.:1) is associated with a segment (ID:106). The association is set up by the assignment control circuit 120 in the state storage circuit 126 as segment assignment information. The intra-segment address M2AD[7:0] designates a position in the segment. A logical address ADD is converted into a physical address M2AD based upon segment assignment information.

Figure 7:
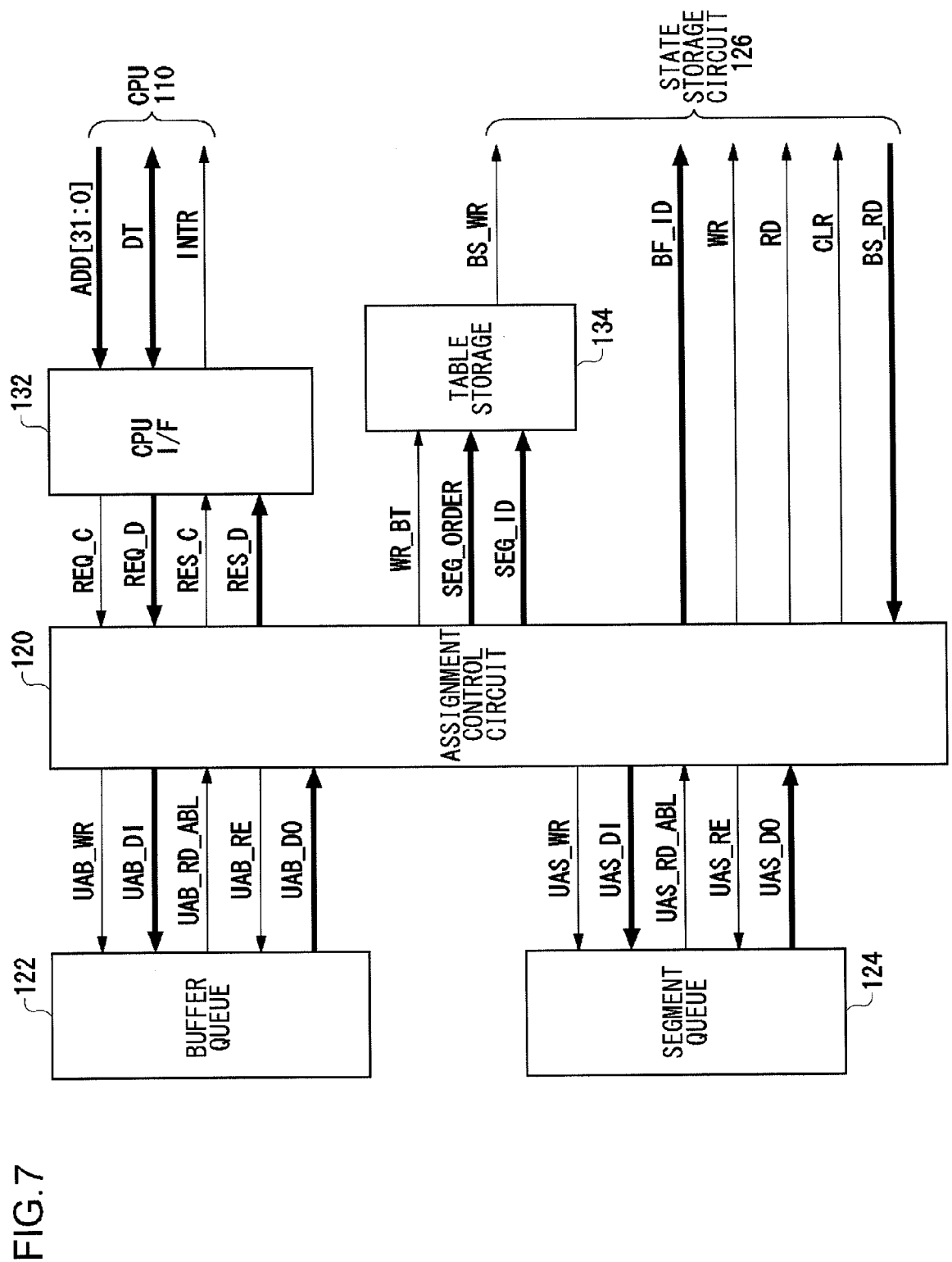
FIG. 7 is related to the basic implementation and shows the configuration of an assignment control circuit and the peripheral circuit.

FIG. 7 is related to the basic implementation and shows the configuration of the assignment control circuit 120 and the peripheral circuit.

(1) Buffer Queue 122

A buffer queue 122 is a memory for storing the BFID of buffer spaces available for assignment in the first-in-first-out (FIFO) mode. Since the maximum number of buffer spaces assignable by the assignment control circuit 120 is eight, the buffer queue 122 stores eight BFIDs in an initial state. When a new buffer space is assigned to a task, the assignment control circuit 120 takes out one BFID from the buffer queue 122. When releasing a buffer space already assigned, the assignment control circuit 120 returns the BFID to the buffer queue 122.

The following five signals are exchanged between the buffer queue 122 and the assignment control circuit 120.

a. UAB_WR: A write signal from the assignment control circuit 122 to the buffer queue 122.

b. UAB_DI: A BFID transmission signal from the assignment control circuit 120 to the buffer queue 122. When UAB_WR is asserted, BFID occurring in UAB_DI is written into the buffer queue 122. When releasing a buffer space, the assignment control circuit 120 asserts UAB_WR and returns one BFID to the buffer queue 122.

c. UAB_RD_ABL: Indicates whether BFID is stored in the buffer queue 122, i.e., whether there remains any buffer space available for assignment.

UAB_RD_ABL is set to "1" when BFID is stored and is set to "0" when no BFID is stored. In acquiring a new buffer space, the assignment control circuit 120 checks UAB_RD_ABL to determine whether it is possible to acquire a buffer space.

d. UAB_RE: A read signal from the assignment control circuit 120 to the buffer queue 122.

e. UAB_DO: A BFID transmission signal from the buffer queue 122 to the assignment control circuit 120. When UAB_RE is asserted, BFID occurring in UAB_DO is read from the buffer queue 122 into the assignment control circuit 120. In assigning a new buffer space, the assignment control circuit 120 examines whether UAB_RD_ABL=1 before asserting UAB_RD. This allows one BFID to be taken out from the buffer queue 122.

(2) Segment Queue 124

The segment queue 124 is a memory for storing the SegID of segments available for assignment in the FIFO mode. Since the maximum number of segments that can be assigned by the assignment control circuit 120 is 128, 128 SegIDs are stored in the segment queue 124 in an initial state. In assigning a new segment to a buffer space, the assignment control circuit 120 takes out SegID from the segment queue 124. In releasing a segment already assigned, the assignment control circuit 120 returns the SegID to the segment queue 124.

The following five signals are exchanged between the segment queue 124 and the assignment control circuit 120.

a. UAS_WR: A write signal from the assignment control circuit 120 to the segment queue 124.

b. UAS_DI: A SegID transmission signal from the assignment control circuit 120 to the segment queue 124. When UAS_WR is asserted, BFID occurring in UAS_DI is written into the segment queue 124. When releasing a segment in association with the release of a buffer space, the assignment control circuit 120 asserts UAS_WR.

c. UAS_RD_ABL: Indicates whether SegID is stored in the segment queue 124, i.e., whether there remains any segment available for assignment. UAS_RD_ABL is set to "1" when SegID is stored and is set to "0" when no SegID is stored. In acquiring a new segment, the assignment control circuit 120 refers to UAS_RD_ABL to determine whether a segment can be acquired.

d. UAS_RE: A read signal from the assignment control circuit 120 to the segment queue 124.

e. UAS_DO: A SegID transmission signal from the segment queue 124 to the assignment control circuit 120. When UAS_RE is asserted, SegID occurring in UAS_DO is read from the segment queue 124 into the assignment control circuit 120. In assigning a segment to a buffer, the assignment control circuit 120 examines whether UAS_RD_ABL=1 before asserting UAS_RD.

(3) CPU Interface 132

The CPU interface 132 is a decoder circuit connected to the address bus ADD and the data bus DT of the CPU 110 and mediates the transmission of commands from the CPU 110 to the assignment control circuit 120. The CPU interface 132 also mediates the transmission of data from the assignment control circuit 120 to the CPU 110. A plurality of commands are transmitted from the CPU 110 to the assignment control circuit 120 via DT. Parameters for a command (hereinafter, referred to as "configuration parameters") are also transmitted to the assignment control circuit 120 via DT. The CPU interface 132 is provided with a register for storing commands and configuration parameters. The assignment control circuit 120 sends to the CPU 110 "result data" indicating success or failure of a command, and a parameter (hereinafter, referred to as a "result parameter") indicating a result of execution. The CPU interface 132 is also provided with a register for holding result data and result parameters.

a. REQ_C: A signal asserted when the CPU interface 132 stores a command and configuration parameters.

b. REQ_D: Indicates a command and configuration parameters transmitted from the CPU 110. When REQ_C is asserted, the assignment control circuit 120 reads a command and configuration parameter by referring to REQ_D.

c. RES_C: A signal asserted by the assignment control circuit 120 upon completion of execution of a command.

d. RES_D: Indicates result data and a result parameter transmitted from the assignment control circuit 120. When RES_C is asserted, the CPU interface 132 records the result data and result parameter occurring in RES_D in the register.

e. INTR: An interrupt signal transmitted upon completion of execution of a command. After recording result data in the register, the CPU interface 132 notifies the CPU 110 as such by asserting INTR. Upon being notified by INTR, the CPU 110 reads the result data and result parameter from the register of the CPU interface 132 via the data bus DT. Thus, the CPU interface 132 mediates the transmission of a command and the reply of the associated result between the assignment control circuit 132 and the CPU 110.

(4) Table Storage 134

A table storage 134 is a register which temporarily stores the entirety or a part of the segment assignment information in the state storage circuit 126. The assignment control circuit 120 acquires segment assignment information from the state storage circuit 126 and records the same in the table storage 134. The circuit 120 updates the segment assignment information in the state storage circuit 126 by modifying the information and then sending the modified information to the state storage circuit 126. The table storage 134 may be characterized as a work area in which the assignment control circuit 120 configures segment assignment information for the state storage circuit 126. Hereinafter, the data stored in the table storage 134 may be referred to as a "segment table" to distinguish it from segment assignment information.

The following four signals are related to the table storage 134.

a. WR_BT: A write signal from the assignment control circuit 120 to the table storage 134.

b. SEG_ORDER: A signal designating a segment number (SegOdr).

c. SEG_ID: A signal designating SegID. When WR_BT is asserted, SegID designated by SEG_ID is written in the segment table in association with a segment designated by SEG_ORDER.

d. BS_WR: Indicates a segment table. The content of the segment table is output on a constant basis in BS_WR. The assignment control circuit 120 records the entirety or a part of the data occurring in BS_WR in the state storage circuit 126 by asserting WR, the write signal directed to the state storage circuit 126.

The following five signals are exchanged between the assignment control circuit 120 and the state storage circuit 126.

e. BS_RD: A signal indicating segment assignment information in the state storage circuit 126. By asserting a read signal RD directed to the state storage circuit 126, segment assignment information occurs in BS_RD.

f. BF_ID: A signal designating BFID.

g. WR: A write signal from the assignment control circuit 120 to the state storage circuit 126. When WR is asserted, the data for a buffer space designated by BFID is recorded in the state storage circuit 126, the data forming a part of the segment table occurring in BS_WR.

h. RD: A read signal from the assignment control circuit 120 to the state storage circuit 126. When RD is asserted, the data for a buffer space designated by BFID occurs in BS_RD, the data forming a part of the segment assignment information in the state storage circuit 126. The data thus read is copied to the segment table in the table storage 134.

i. CLR: A clear signal from the assignment control circuit 120 to the state storage circuit 126. When CLR is asserted, the segment assignment information for a buffer space designated by BFID is cleared.

The assignment control circuit 120 may be formed to include the CPU interface 132 and the table storage 134.

Figure 8:
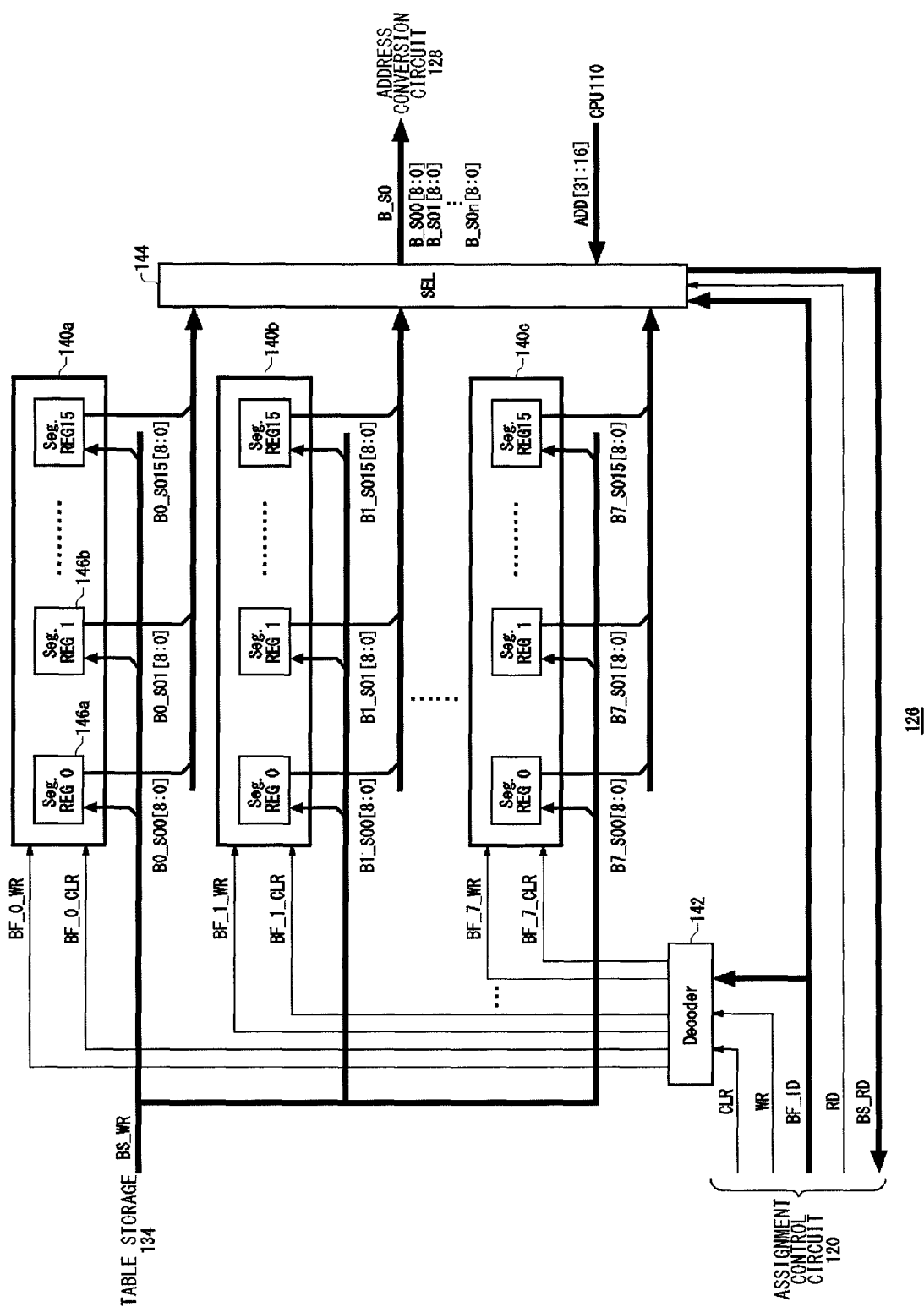
FIG. 8 shows the configuration of a state storage circuit according to the basic implementation.

FIG. 8 shows the configuration of the state storage circuit 126 according to the basic implementation.

The state storage circuit 126 is provided with a plurality of register groups collectively referred to as register groups 140. Each register group 140 is associated with BFID, i.e, a buffer space. A register group 140a corresponds to a buffer space with BFID=0 (hereinafter, denoted as "buffer space (ID:0)"). Since the maximum number of buffer spaces is eight, there are eight register groups 140. A register group 140 with BFID=n will be denoted as a "register group 140 (ID:n)".

A register group 140 includes a plurality of segment registers 146. A segment register 146 is associated with a segment number (SegOdr). Since the maximum number of segments per buffer space is 16, there are 16 segment registers included in a register group 140. A segment register 146 with SegOdr=m will be denoted as a "segment register (No.:m)". Referring to FIG. 8, a segment register 146a is a segment register 146 (No.:0) in a register group (ID:0). A segment register 146b is a segment register 146 (No.:1) in a register group 140 (ID:0).

A segment register 146 according to the basic implementation is a 9-bit register. Denoting the data stored in a segment register 146 (No.:m) of a register group 140 (ID:n) as Bn_Sm [8:0], the highest-order one bit Bn_Sm[8] indicates whether a segment is assigned to a segment (No.:m) in the buffer space (ID:n). Bn_Sm[8]=1 indicates "assigned" and Bn_Sm[8]=0 indicates "unassigned". The remaining eight bits Bn_Sm[7:0] indicate SegID of the assigned segment.

For example, if B2_S1[8]=1 and B2_S1[7:0]=102 in a segment register 146 (No.:1) of a register group 140 (ID:2), it means that a segment (ID:102) is assigned.

BS_WR, which indicates segment assignment information transmitted from the table storage 134, is fed to the register groups 140 and, eventually, to the segment registers 146. Of BS_WR, the data related to BFID=n is fed to the register group 140 (ID:n). Of the data thus fed, the data related to SegOdr=m is fed to the segment register 146 (No.:m).

When the state storage circuit 126 designates BFID=0 in BF_ID asserts WR, a decoder 142 asserts BF_0_WR. Of the segment assignment information occurring in BS_WR, the data corresponding to BFID=0 is written into the register group 140 (ID:0). Designation of other BFID values invokes a similar operation.

When the state storage circuit 126 designates BFID=0 in BF_ID, and when CLR is asserted, the decoder 142 asserts BF_0_CLR. When this occurs, all of the segment registers 146 included in the register group 140 (ID:0) are cleared such that B0_Sm[8]=0. The association between the buffer and segments is cleared in the designated register group 140.

Data in a segment register 146 is output to a selector 144. When the assignment control circuit 120 designates BFID=n in BF_ID and asserts RD, the selector 144 sends the data in the register group 140 (ID:n) to the assignment control circuit 120 as BS_D.

When a logical address ADD designates BFID, the selector 144 transmits the data in the associated register group 140 to the address conversion circuit 128 as B_SO (a set comprising B_SO0[8:0], B_SO1[8:01], . . . , B_SO15[8:0]).

FIG. 9 shows how segment registers 146 store data in the state storage circuit 126.

Referring to FIG. 9, a column corresponds to a register group 140. For example, the field with BFID=2 and SegOdr=4 contains SegId stored in the segment register 146 (No.:4) in the register group 140 (ID:2). The figure shows that the field contains SegID=20. Thus, a segment (ID:20) is associated with the segment (No.:4) of the buffer space (ID:2). Referring to FIG. 9, segments are not assigned to those fields with "-". For example, segments are respectively assigned to the segment (No.:0), the segment (No.:1), and the segment (No.:2) of the register group 140 (ID:0), but no segments are assigned to the subsequent segments.

Figure 10:
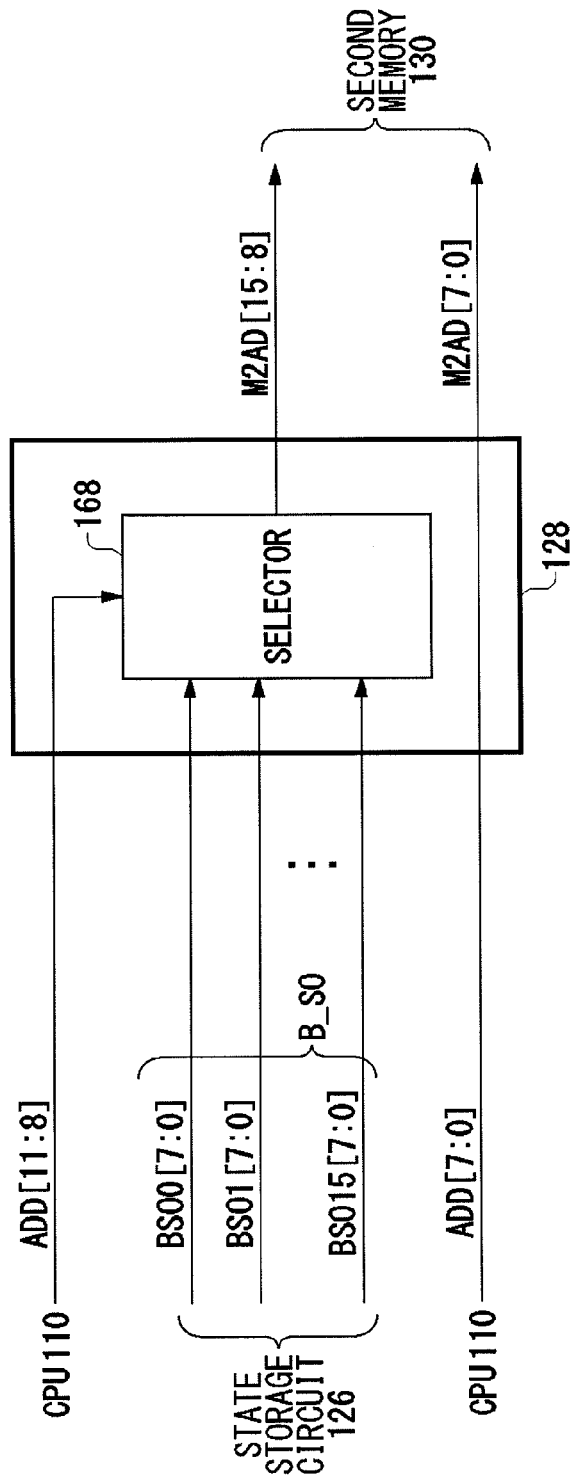
FIG. 10 shows the configuration of an address conversion circuit according to the basic implementation.

FIG. 10 shows the configuration of the address conversion circuit 128 according to the basic implementation.

A logical address ADD designated by the CPU 110 and B_SO sent from the state storage circuit 126 are fed to the address conversion circuit 128. Of the logical address ADD [31:0], ADD[31:6] is fed to the selector 144 of the state storage circuit 126. The selector transmits 144 the segment information for BFID designated in ADD[31:16] to the address conversion circuit 128 as B_SO.

Of the logical address ADD[31:0] designated by the CPU 110, SegOdr designated by ADD[11:8] is fed to a selector 168 in the address conversion circuit 128. If SegOdr=m, the selector 168 sends SegID, in B_SO, of the associated segment (No.:m) as M2AD[15:8]. The intra-segment address (SegAdd) in ADD[7:0] is sent as M2AD[7:0] unmodified. In this way, a logical address ADD[31:0] is converted into a physical address [15:0].

A description will now be given of the steps performed in the memory management device 100 having the above circuit configuration with reference to a flowchart. Hereinafter, five steps including "address conversion", "buffer acquisition", "full buffer release", "partial buffer release", and "segment transfer" will be described in this order.

Figure 11:
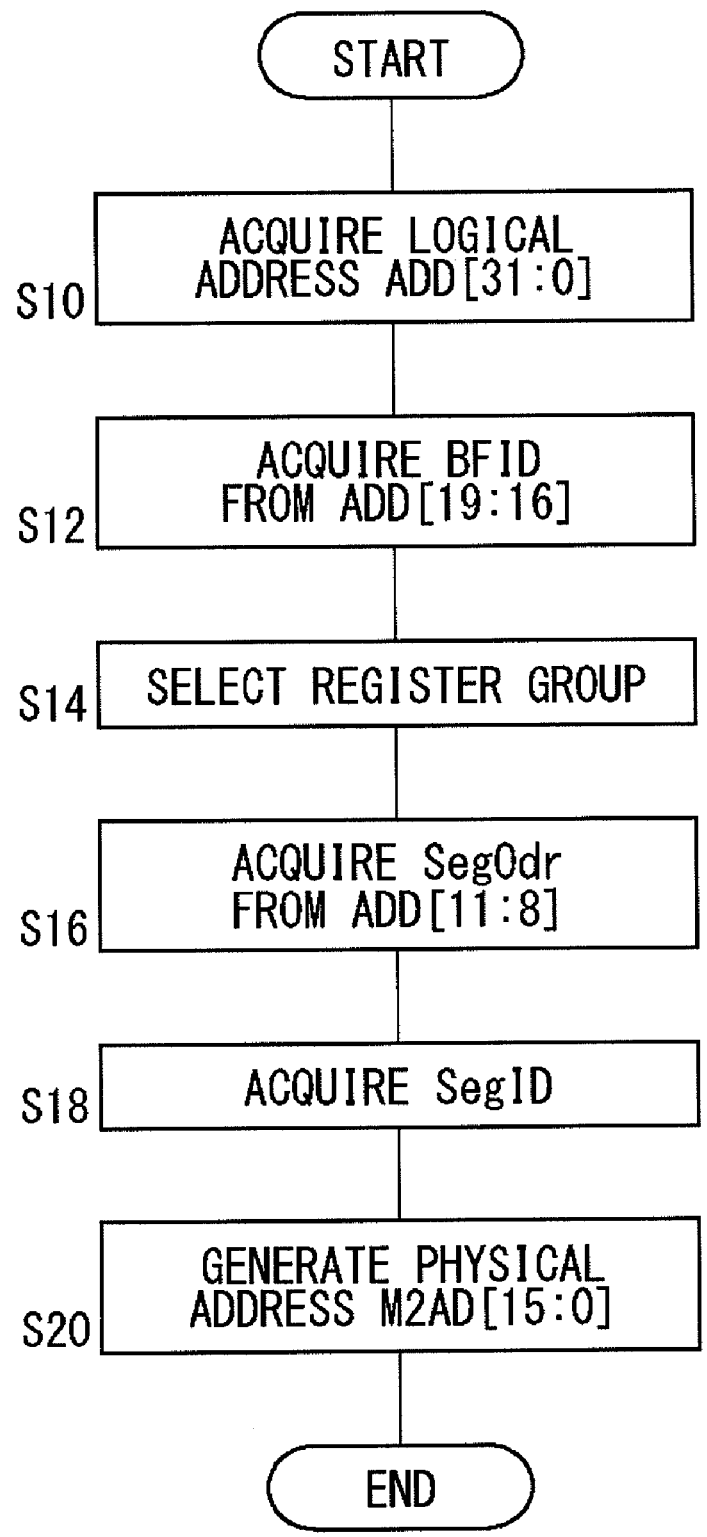
FIG. 11 is a flowchart showing the steps performed in address conversion according to the basic implementation.

FIG. 11 is a flowchart showing the steps performed in address conversion according to the basic implementation.

A task executed by the CPU 110 designates a location in the second memory 130 to be accessed, using a logical address ADD[31:0]. The address conversion circuit 128 acquires the logical address ADD[31:0] (S10). In this process, the state storage circuit 126 acquires ADD[31:16] in the logical address ADD[31:0]. The selector 144 of the state storage circuit 126 acquires BFID from ADD[19:6] in ADD [31:16] (S12). It will be assumed that BFID=n is designated. The selector 144 of the state storage circuit 126 selects the register group 140 (ID:n) corresponding to the designated BFID=n (S14). The state storage circuit 126 sends the segment assignment information for the buffer space (ID:n) designated by the logical address ADD[31:0] to the address conversion circuit 128 as B_SO.

Meanwhile, the address conversion circuit 128 acquires SegOdr from ADD[11:8] in ADD[31:0] (S16). It will be assumed that SegOdr=m is designated. The selector 168 of the address conversion circuit 128 identifies SegID for the designated SegOdr by referring to B_SOm (S18). A physical address M2AD[15:0] is generated from SegID thus acquired and the intra-segment address indicated by ADD[7:0].

Figure 12:
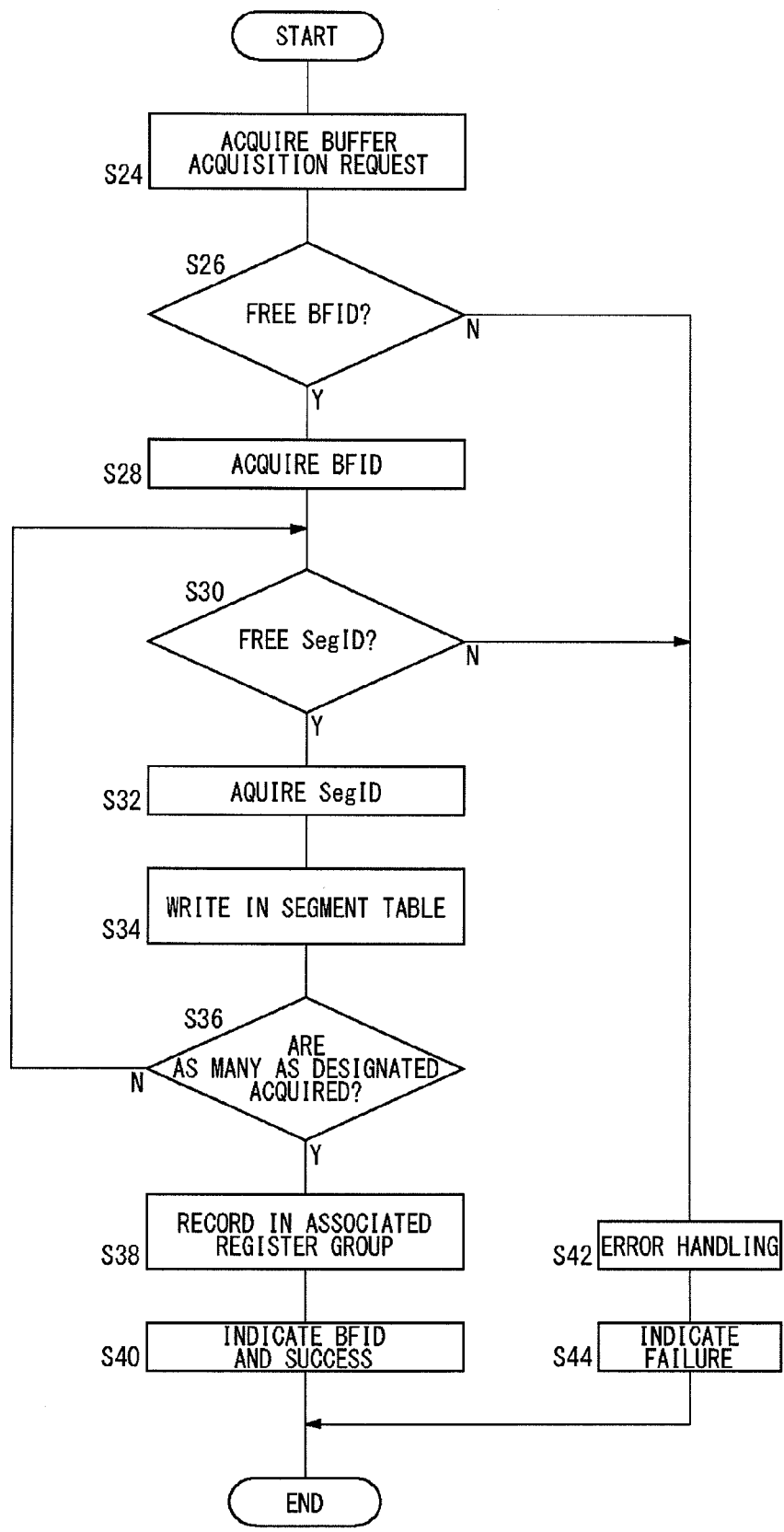
FIG. 12 is a flowchart showing the steps performed in buffer acquisition according to the basic implementation.

FIG. 12 is a flowchart showing the steps performed in buffer acquisition according to the basic implementation.

A task executed by the CPU 110 may request a buffer space for storing a result of execution. When this occurs, the task transmits a "buffer acquisition request" to the assignment control circuit 120 via the CPU interface 132. The number of segments to be assigned to a buffer is designated by a configuration parameter for the buffer acquisition request command. In other words, the configuration parameter designates the size of a buffer space. Upon reading a buffer acquisition request command from REQ_D, the assignment control circuit 120 initiates a buffer acquisition process described below.

The assignment control circuit 120 acquires a buffer acquisition request command (S24). The assignment control circuit 120 checks UAB_RD_ABL from the buffer queue 122 to determine whether there is BFID left free (S26). If there are no free buffers (N in S26), control proceeds to S42 for error handling. If there is any free buffer (Y in S26), the assignment control circuit 120 acquires one BFID by referring to UAB_DO (S28). It will be assumed that BFID=n is acquired.

Subsequently, the assignment control circuit 120 checks UAS_RD_ABL from the segment queue 124 to determine whether there is SegID left free (S30). If there are no free segments (N in S30), control proceeds to S42 for error handling. If there is any free segment (Y in S30), the assignment control circuit 120 acquires one SegID by referring to UAS_DO (S32). The assignment control circuit 120 records SegID thus acquired in the segment table of the table storage 134, starting with SegOdr=0 (S34). The segment for which SegID is recorded in the segment table is designated as "assigned" and the other segments are designated as "unassigned". If the number of SegIDs acquired falls short of the number designated in the configuration parameter (N in S36), control returns to S30. If as many SegIDs as designated are acquired (Y in S36), the assignment control circuit 120 records the data in the segment table of the table storage 134 in the register group 140 (ID:n), designating the acquired BFID=n and asserting WR (S38).

In this way, the new association between a buffer and segments is recorded in the state storage circuit 126 as segment assignment information. The assignment control circuit 120 notifies the CPU 110 of the success of "buffer acquisition request" via RES_D, with the acquired BFID=n as a result parameter (S40).

Meanwhile, if the acquisition of BFID or SegID fails (N in S26, N in S30), the assignment control circuit 120 performs a predetermined error handling process (S42) and then notifies the CPU 110 of the failure of "buffer acquisition request" (S44). Error handling is a process for resuming a state occurring before processing a buffer acquisition request. For example, if the acquisition of BFID is successful but the acquisition of SegID fails, BFID is returned to the buffer queue 122. When a buffer acquisition request fails, the task may retry a buffer acquisition request after a predetermined period of time.

Figure 13:
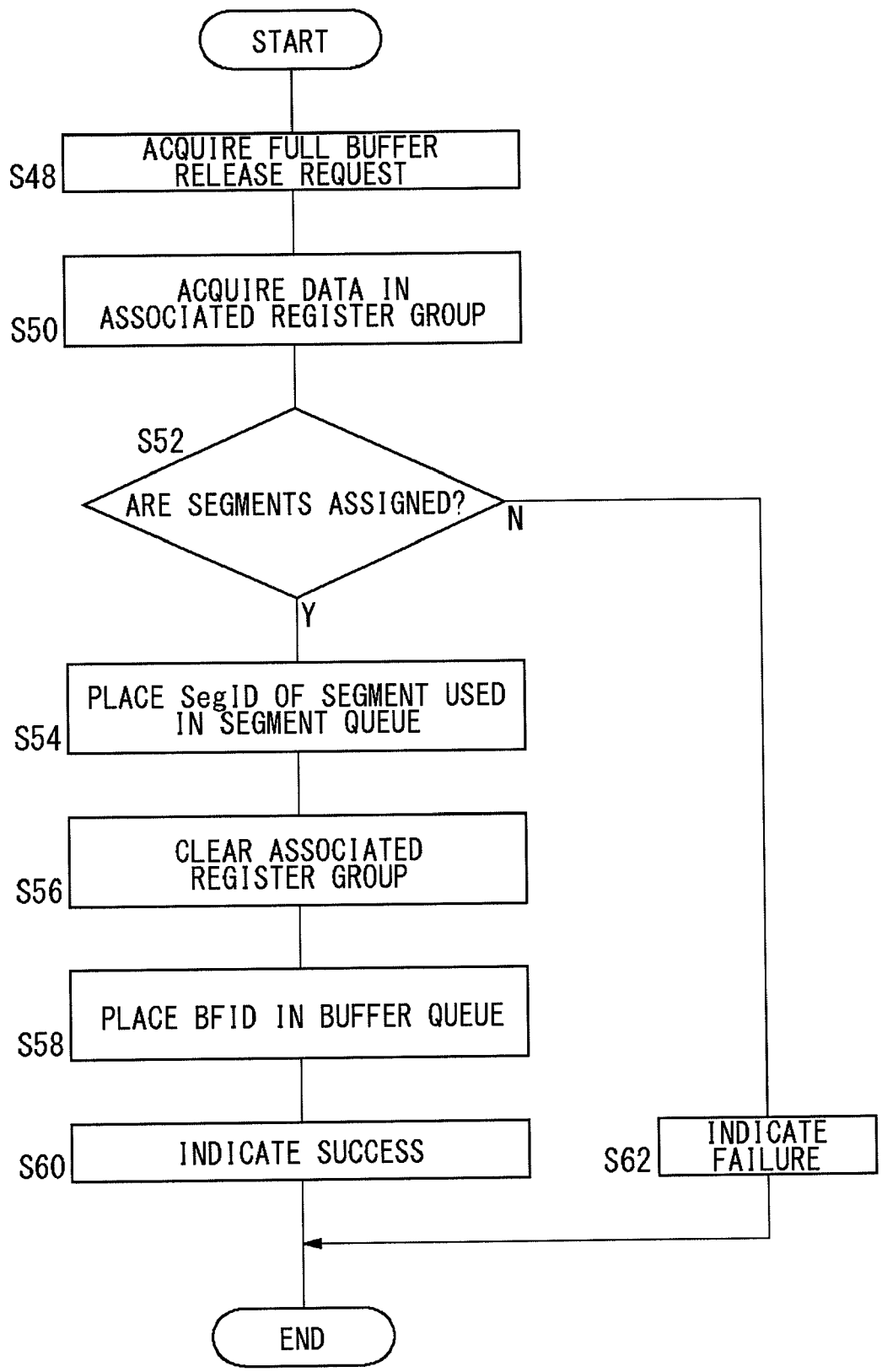
FIG. 13 is a flowchart showing the steps performed in full buffer release according to the basic implementation.

FIG. 13 is a flowchart showing the steps performed in full buffer release according to the basic implementation.

When a task executed by the CPU 110 no longer uses a buffer space once reserved, the task releases the buffer space. The methods for releasing a buffer space include "full release" in which the entirety of segments associated with the buffer space are released and "partial release" in which some of the segments are released. For full release, the task transmits a "full buffer release request command" to the assignment control circuit 120 via the CPU interface 132. The BFID of a buffer space to be released is designated by a configuration parameter for the full buffer release request command. Upon reading the full buffer release request command from REQ_D, the assignment control circuit 120 initiates a full buffer release process described below.

The assignment control circuit 120 acquires a full buffer releast request command (S48). The assignment control circuit 120 reads from BS_RD the data in the register group 140 associated with the BFID designated by the configuration parameter (S50). It will be assumed that BFID=n is designated. If no segments are assigned to the register group 140 (ID:n), i.e., if no segments are assigned to the buffer space (ID:n) (N in S52), the full buffer release request is invalid. Thereupon, the circuit 120 notifies the task of a "failure" (S62). Since no segments are assigned to the buffer space, the buffer space is not used. In this case, BFID=n is placed in the buffer queue 122 so as to make BFID=n available for assignment again. Whether not segments are assigned to a buffer can be determined by checking Bn_Sm[8] in a segment register 146.

If at least one segment is assigned (Y in S52), the assignment control circuit 120 places the SegIDs of the at least one assigned segment in the segment queue 124 (S54). Further, the assignment control circuit 120 sets all of the segment registers 146 in the associated register group (ID:n) to "unassigned:0", by asserting CLR (S56). In this way, all segments associated with the buffer space (ID:n) designated in the full buffer release request are made available for assignment again. Subsequently, the assignment control circuit 120 places the designated BFID=n in the buffer queue 122 (S58). In this way, BFID=n is also made available for assignment again. The assignment control circuit 120 notifies the CPU 110 of the success of full buffer release request via RES_D.

Figure 14:
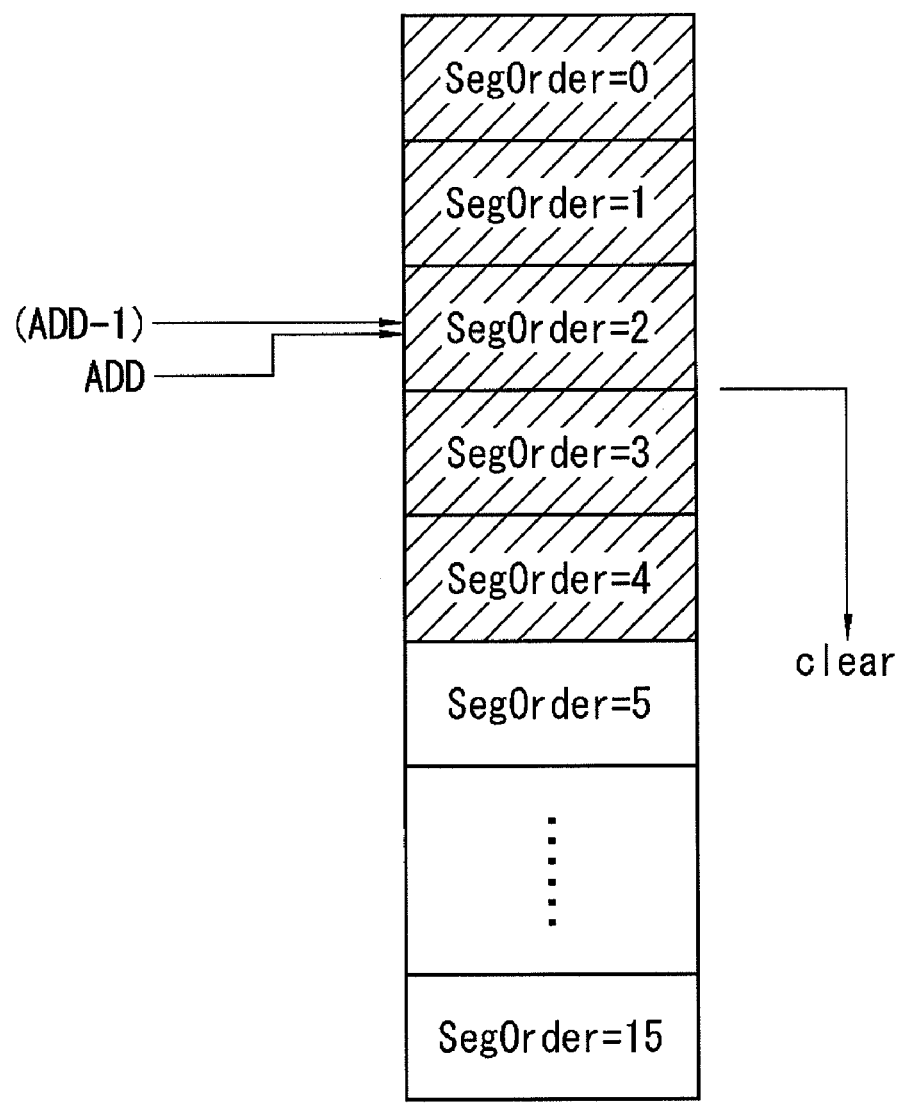
FIG. 14 is a schematic diagram illustrating the details of partial buffer release.

FIG. 14 is a schematic diagram illustrating the details of partial buffer release.

In the process of executing a task, some of the data in the buffer space may become unnecessary. In this case, it is favorable to promote the re-use of memory by releasing segments storing unnecessary data. Partial buffer release is a process for releasing some of at least one segment associated with a buffer space.

In the illustrated example, segments are assigned to segment numbers "0"-"4" in the buffer space (ID:n). In order to release some of these five assigned segments, i.e., to make them available for assignment again, the task transmits a partial buffer release request command to the assignment control circuit 120 via the CPU interface 132. The configuration parameters include the BFID of a buffer space to be released and a "released address" designated by a logical address. The released address is a logical address.

Initially, a segment number (SegOdr) which includes a logical address located at "released address-1" is identified. In the illustrated example, the segment number in question is "2". Hereinafter, the segment number which includes a logical address located at "released address-1" will be referred to as a "maintained number". The assignment control circuit 120 releases the segment associated with "maintained number+1" and the segments associated with segment numbers that follow. In the illustrated example, the segments associated with the segment numbers 3 and 4 are released.

Figure 15:
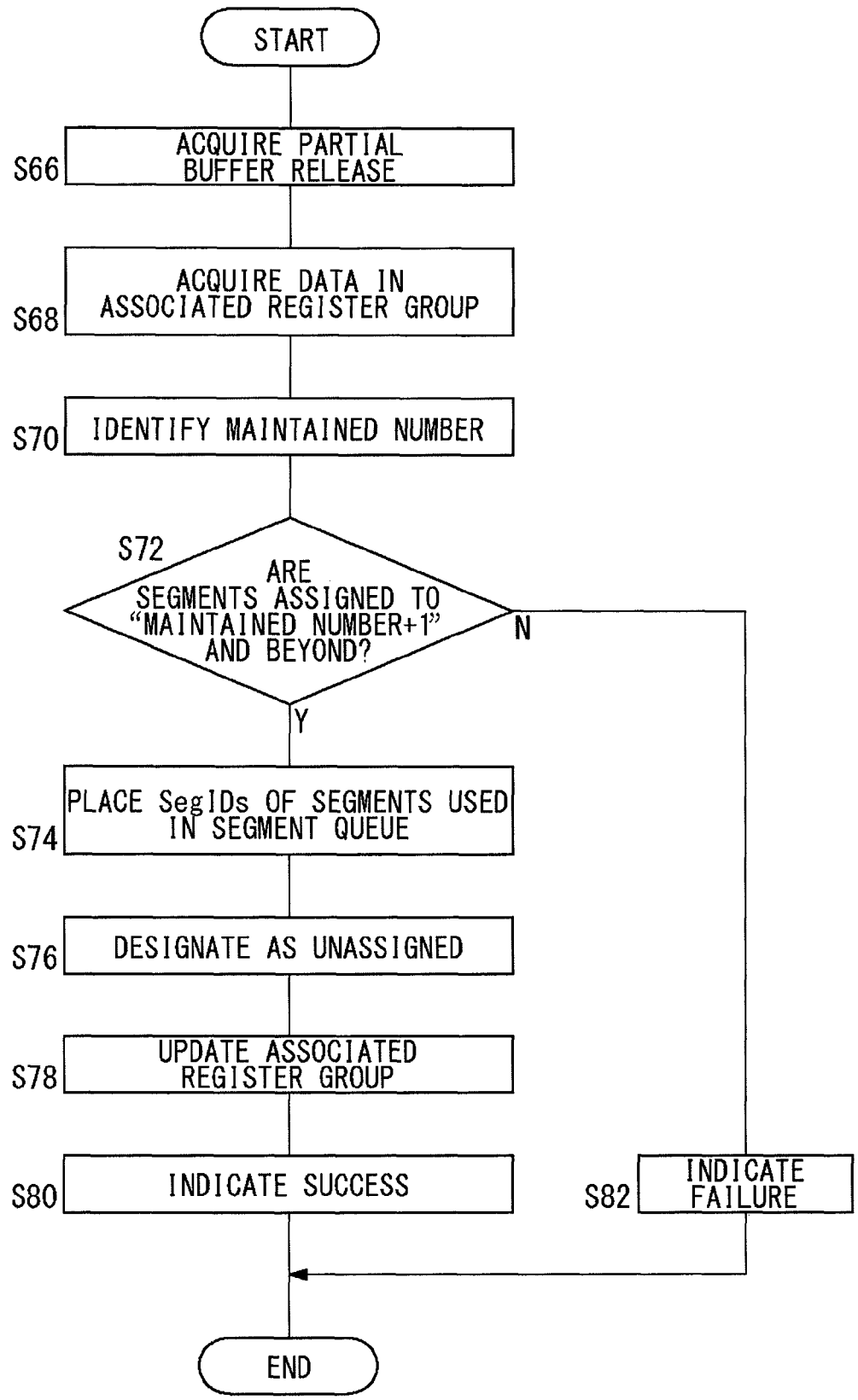
FIG. 15 is a flowchart showing the steps performed in partial buffer release according to the basic implementation.

FIG. 15 is a flowchart showing the steps performed in partial buffer release according to the basic implementation.

The assignment control circuit 120 acquires a partial buffer release request command (S66). The assignment control circuit 120 reads from BS_RD the data in the register group 140 associated with the BFID designated in the configuration parameters (S68). It will be assumed that BFID=n is designated. Subsequently, the circuit 120 identifies a maintained number from the released address designated in the configuration parameters (S70). If no segments are assigned to the segment with the segment number "maintained number+1" and to the segments that follow in the register group 140 (ID:n), i.e., the buffer space (ID:n) (N in S72), the "partial buffer release request" is invalid. Thereupon, the circuit 120 notifies the task of a "failure" (S82).

If at least one segment is assigned (Y in S72), the assignment control circuit 120 places in the segment queue 124 the SegIDs of the segment number "maintained number+1" and the numbers that follow (S74). Further, the assignment control circuit 120 sets the segment number "maintained number+1" and the numbers that follow to "unassigned:0" in the segment table in the table storage 134 (S76). The circuit 120 updates the content of the register group 140 (ID:n) by recording the data in the segment table thus set up in the register group 140 (ID:n) (S78). Thus, of the segments associated with the buffer space (ID:n), all of the segments associated with the segment number "maintained number+1" and the numbers that follow are made available for assignment again. The assignment control circuit 120 notifies the CPU 110 the success of the "partial buffer release request" via RES_D (S80).

Figure 16:
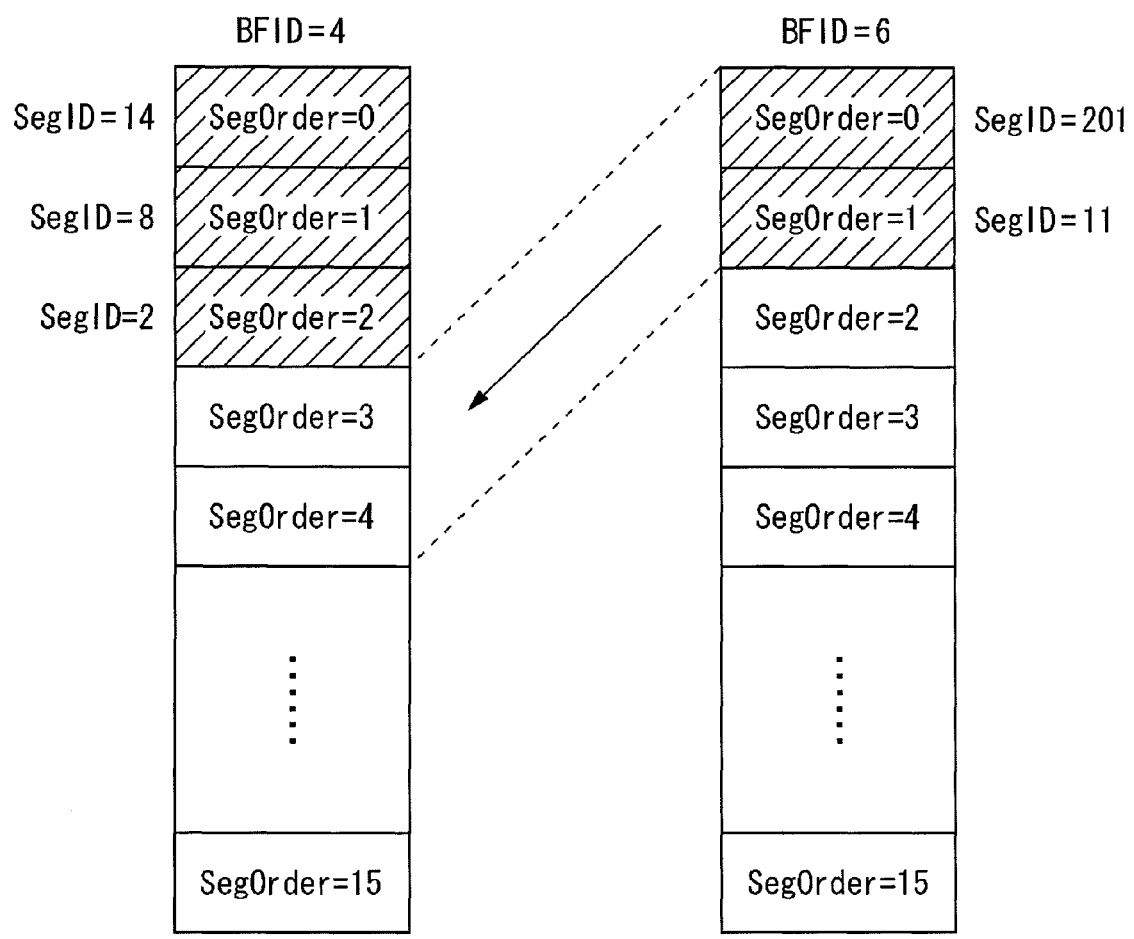
FIG. 16 is a schematic diagram illustrating the details of segment transfer.

FIG. 16 is a schematic diagram illustrating the details of segment transfer.

In the process of executing a task, there may be cases where it is desired to move data in a given buffer space to another buffer space. In other cases, it is desired to achieve memory sharing (memory mapping) between a given buffer space and another buffer space. Segment transfer is a process for configuring the destination of assignment of segments associated with a given buffer space to be another buffer space.

In the illustrated example, segments are assigned to segment numbers "0"-"2" in the buffer space (ID:4).

The SegIDs of the assigned segments are "14", "8", and "2", respectively. Meanwhile, segments are assigned to segment numbers "0" and "1" in the buffer space (ID:6). The SegIDs of the assigned segments are "201" and "11", respectively. It will be assumed that the segments assigned to the buffer space (ID:6) will also be assigned to the buffer space (ID:4) so that the same segments are assigned to a plurality of buffer spaces. More specifically, the purpose of the process is to assign the segment (ID:201) and the segment (ID:11) to the segment (No. 3) and the segment (No.:4) in the buffer space (ID:4).

To assign the segments in the buffer space (ID:6) to the buffer space (ID:4), the task transmits a "segment transfer request" command to the assignment control circuit 120 via the CPU interface 132. The configuration parameters are such that the transfer destination BFID=4 and the transfer source BFID=6.

In response to the segment transfer request, the assignment control circuit 120 assigns the segment (ID:201) and the segment (ID:11) in the segment numbers "0" and "1" in the buffer space (ID:6), respectively, to the segment numbers "3" and "4" in the buffer space (ID:4). At this stage, the segment (ID:201) is assigned to the segment (No.:3) of the buffer space (ID:4). Meanwhile, the association between the segment (ID:201) and the buffer space (ID:6) is not cleared. For this reason, the segment (ID:201) is assigned both to the buffer space (ID:4) and the buffer space (ID:6).

It will be assumed that task A rewrites the data in the segment (No.:3) in the buffer space (ID:4) that can be accessed by task A. This results in the data in the associated segment (ID:201) being rewritten. This translates into the rewriting of the data in the segment (No.:0) in the buffer space (ID:6). By allowing task A to record the data to be delivered to task B in the segment (No.:3) in the buffer space (ID:4), task B can acquire the data delivered by task A by reading the data from the segment (No.:0) in the buffer space (ID:6) that can be accessed by task B. Originally, the buffer space (ID:4), which is a logical address space for task A, and the buffer space (ID:6), which is a logical address space for task B, are separate logical address spaces. By assigning segments in a duplicate manner, data can be efficiently shared between different buffer spaces. The same is true of the segment (ID:11). Thus, a segment transfer request enables so-called "memory mapping" between a plurality of buffer spaces.

A segment transfer request may assign the segment (ID: 201) and the segment (ID:11) only to the buffer space (ID:4) instead of performing memory mapping. By changing the destination of assignment of the segment (ID:201) and the segment (ID:11) from the segment (No.:0) and the segment (No.:1) in the buffer space (ID:6) to the segment (No.:3) and the segment (No.:4) in the buffer space (ID:4), the data in the buffer space (ID:6) will be moved to the buffer space (ID:4). More specifically, the assignment control circuit 120 reads the data for the buffer space (ID:4) into the table storage 134. Subsequently, the circuit 120 acquires the data for the buffer space (ID:6) from the state storage circuit 126 and appends the data thus acquired to the data read into the table storage 134. The circuit 120 then writes the data in the data storage 134 in the state storage circuit 126 in one setting, designating BFID=4.

Figure 17:
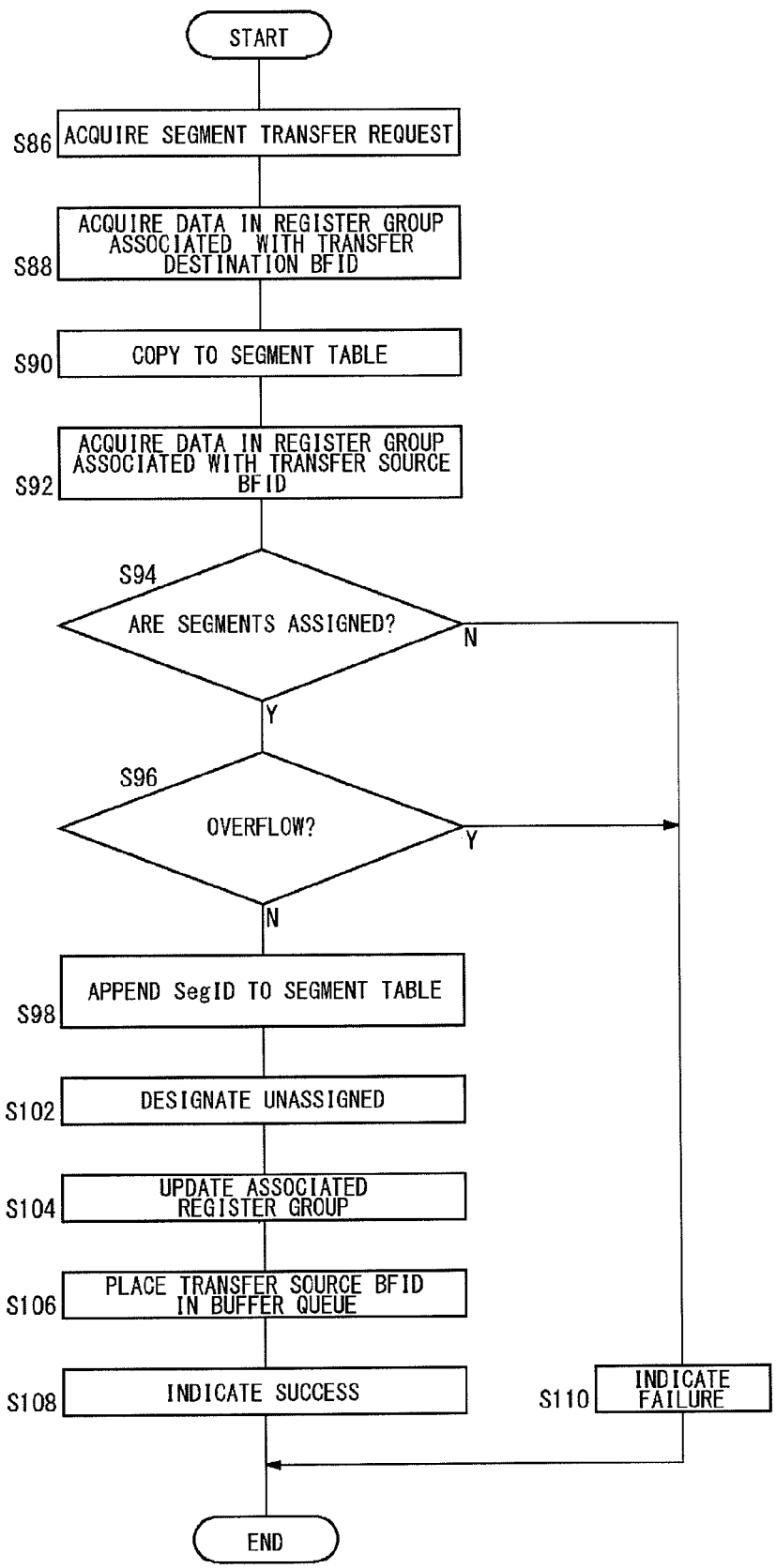
FIG. 17 is a flowchart showing the steps performed in segment transfer according to the basic implementation.

FIG. 17 is a flowchart showing the steps performed in segment transfer according to the basic implementation. The description herein will assume that the destination of assignment of the segments in a transfer source buffer space is "changed" to a transfer destination buffer space and the transfer source buffer space is fully released, instead of performing memory mapping. It will be assumed that the transfer destination buffer space is such that BFID=n1 and the transfer source buffer space is such that BFID=2.

The assignment control circuit 120 acquires a segment transfer request command (S86). The assignment control circuit 120 reads from BS_RD the data in the register group 140 (ID:n1) associated with the transfer destination BFID=1 (S88) and copies the data thus read to the segment table in the table storage 134 (S90). The circuit 120 then reads from BS_RD the data in the register group 140 (ID:n2) associated with the transfer source BFID=2 (S92). If no segments are assigned in the transfer source buffer space (ID:n2) (N in S94), the "segment transfer request" is invalid since there are no segments to be transferred in the first place. Thereupon, the circuit 120 notifies the task of a failure (S110).

Even if there are assigned segments in the transfer source buffer space (ID:n2) (Y in S94), the segment transfer request fails if there are not enough free space left in the transfer destination buffer space (ID:n1) (Y in S96). For example, if segments are respectively assigned through the segment number "14" in the transfer destination buffer space (ID:n1), overflow occurs if the transfer of two or more segments is attempted, resulting in a failure of a segment transfer request.

If there is enough free space available for assignment of segments in the transfer destination buffer space (ID:n1) (N in S96), the SegIDs of the segments assigned to the transfer source buffer space (ID:n2) are appended to the segment assignment information, maintained in the table storage 134, for the transfer destination BFID=n1. The associated segments are designated as being "assigned" (S98). All of the segments in the transfer source buffer space (ID:n2) are designated as being "unassigned" by asserting CLR (S102). The segment assignment information in the segment table associated with BFID=n1 is recorded in the state storage circuit 126 (S104). The assignment control circuit 120 places the transfer source BFID=n2 in the buffer queue 122 (S106). Thus, BFID=2 is made available for assignment again. The assignment control circuit 120 notifies the CPU 110 of the success of the "segment transfer request" (S108).

If the aforementioned memory management function is to be implemented by a software OS, the execution of memory management must heavily depend on the computing power of the CPU 110. It will also create overhead associated with access by the software OS itself to the first memory 112 and the second memory 130.

In contrast, the memory management device 100 executes the memory management function in hardware logic. Since the second memory 130 can be used in units of segments, not only the usage efficiency of the second memory 130 can be improved but also the memory management can be independent of the processing power of the CPU 110. Therefore, memory management can be performed without reducing the performance of the CPU 110 processing tasks. Further, since memory management is achieved through a process simpler than that of the memory management by the CPU 110, a general-purpose processor, the inventive approach is also useful for reduction of power consumption.

The memory management device 100 is particularly useful in executing an application that requires frequent acquisition and release of buffer spaces in an environment with severe time constraints.

Figure 18:
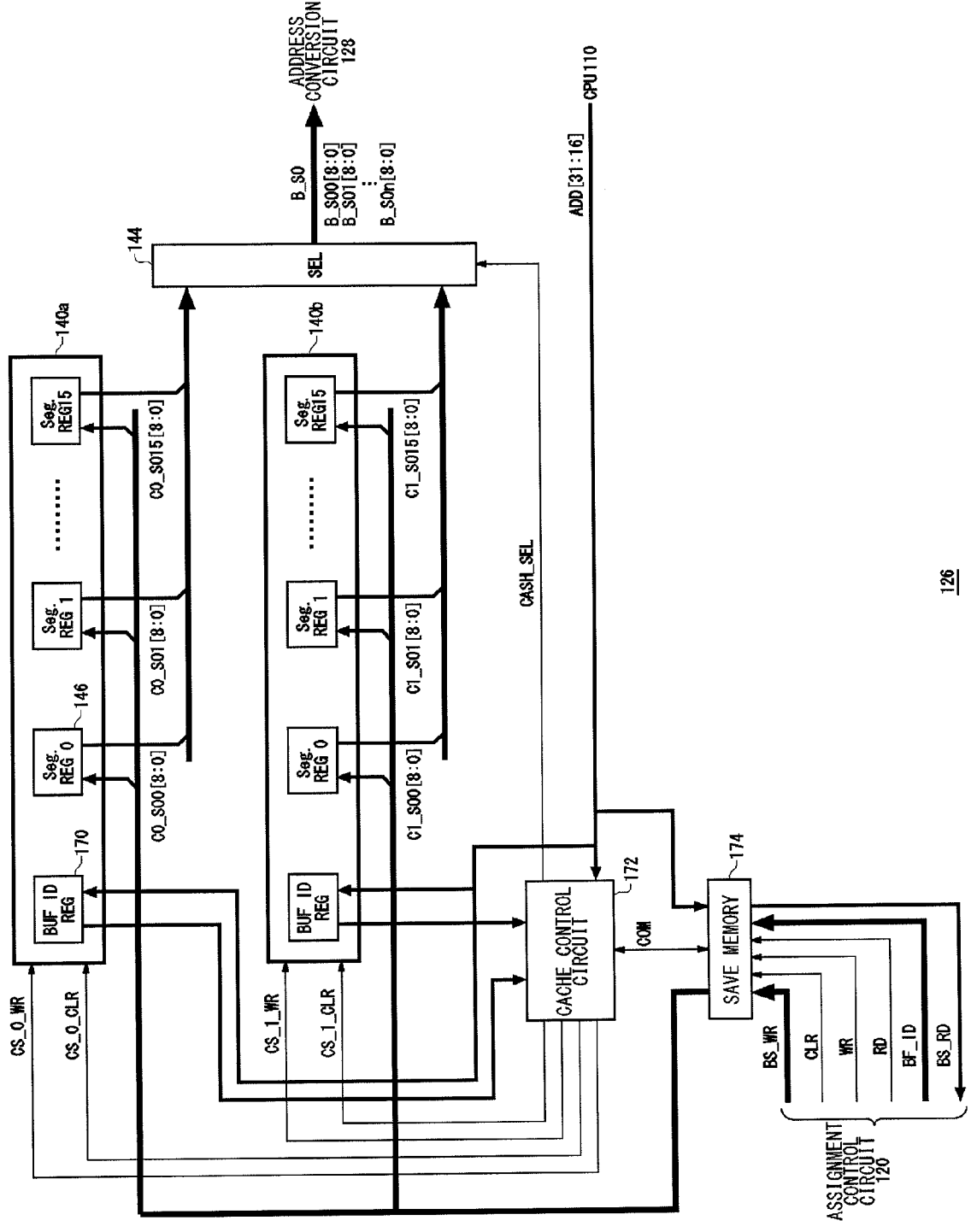
FIG. 18 relates to the basic implementation and shows the configuration of the state storage circuit provided with a cache control function.

FIG. 18 relates to the basic implementation and shows the configuration of the state storage circuit 126 provided with a cache control function.

The state storage circuit 126 shown in FIG. 8 is provided with as many register groups 140 as there are buffers. FIG. 18 shows the configuration of the state storage circuit 126 in which more buffers than there are register groups 140 can be assigned. For brevity of the description, it will be assumed that the state storage circuit 126 includes only two register groups 140. The difference from the state storage circuit 126 shown in FIG. 8 is that there are provided a save memory 174 and a CASH control circuit 172 having the function of the decoder 142. The save memory 174 may be a dual port random access memory (RAM). Each register group 140 is provided with a buffer ID register 170 in addition to a plurality of segment registers 146.

The maximum number of buffers assignable is eight. It will be assumed that all eight BFIDs have been acquired. The segment assignment information for the eight buffers are all stored in the save memory 174. Of the entirety of information, the segment assignment information for two buffers are also stored in the register groups 140. The buffer ID registers 170 store the associated BFIDs.

When the assignment control circuit 120 asserts WR in order to record segment assignment information, the CASH control circuit 172 updates the data in the associated area in the save memory 174. If the data for the associated buffer space is located in a register group 140, the updated data is reflected in the group. If the data is not located in either of the register groups 140, the updated data for the associated buffer space may be loaded into one of the register groups.

When the assignment control circuit 120 asserts CLR in order to clear segment assignment information, the CASH control circuit 172 designates all segments in the associated area in the save memory 174 as "unassigned". If the data for the associated buffer space is located in a register group 140, all segment registers 146 in the register group 140 are designated "unassigned".

When the assignment control unit 120 asserts RD in order to read segment assignment information, the CASH control circuit 172 outputs the data in the associated area in the save memory 174 via BS_RD.

When the CPU 110 designates a logical address ADD[31:0], the CASH control circuit 172 determines whether the data for the associated buffer space is located in a register group 140 by checking the buffer ID register 170. If the data is located, the circuit 172 asserts a CASH_SEL signal to output the segment assignment information in the associated register group 140 as B_SO. If the segment assignment information for the associated buffer space is not located in a register group 140, the circuit 172 loads the segment assignment information for the associated buffer space from the save memory 174 to one of the register groups 140, before outputting the data as B_SO.

According to the method of processing as described above, the circuit size of the state storage circuit 126 as a whole can be reduced in comparison with the state storage circuit 126 of FIG. 8.

A description will now be given of a variation to the basic implementation directed to improvement in segment transfer process.

[Variation Directed to Improvement in Transfer Process]

Figure 19:
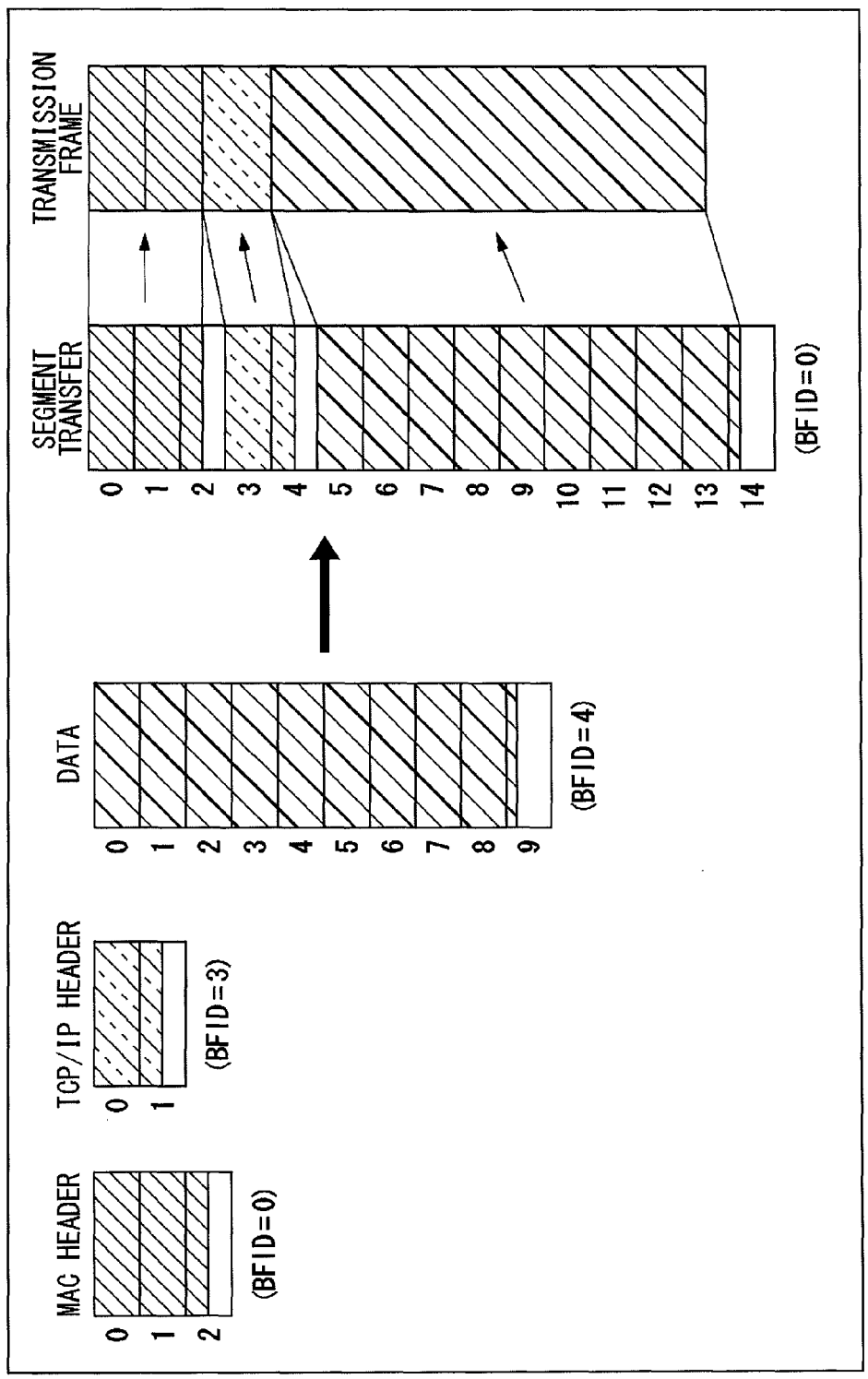
FIG. 19 is a schematic diagram illustrating a problem associated with a segment transfer process.

FIG. 19 is a schematic diagram illustrating a problem associated with a segment transfer process.

As described with reference to FIG. 16 and FIG. 17, the memory management device 100 is capable of changing the destination of assignment of segments in a transfer source buffer space to a transfer destination segment buffer space. In the case of communications-related application software based on Transmission Control Protocol/Internet Protocol (TCP/IP), for example, the following three processes can be defined:

Content-related process for generating transmission data carrying contents.

TCP/IP process for generating a TCP/IP header to be appended to transmission data.

MAC process for generating a Media Access Control (MAC) header to be appended to transmission data.

These processes need not be separate processes or threads. The description below is non-limiting as to the nature of the processes.

The memory management device 100 sets up buffer spaces for a content-related process, a TCP/IP process, and a MAC process, respectively. In the illustration, ten segments are assigned to the buffer space (ID:4) for the content-related process, two segments are assigned to the buffer space (ID:3) for the TCP/IP process, and three segments are assigned to the buffer space (ID:0) for the MAC process.

Of the ten segments in the buffer space (ID:4), the segment (No.:9) is only partly filled with data. The same is true of the segment (No.:1) of the buffer space (ID:3) and the segment (No.:2) of the buffer space (ID:0). The segments in the buffer space (ID:3) and the segments in the buffer space (ID:4) are transferred to the buffer space (ID:0). This results in the buffer space (ID:0) including a total of 15 segments. The data included in the buffer space (ID:0) after the transfer form a transmission frame.

However, since only a part of segment (No.:2) in the buffer space (ID:0) stores data and only a part of the segment (No.:3) in the buffer space (ID:3) stores data, the data in the buffer space (ID:0) after the transfer is partly discontinuous. In the illustrated example, continuity of data is lost in the segment (No.:2) and the segment (No.:4) in the buffer space (ID:0) after the transfer.

We propose hereinafter a method of using continuous logical addresses to address data in a buffer space from the CPU 110 even in such a case. The method disclosed will be referred to as the variation directed to improvement in transfer process.

Figure 20:
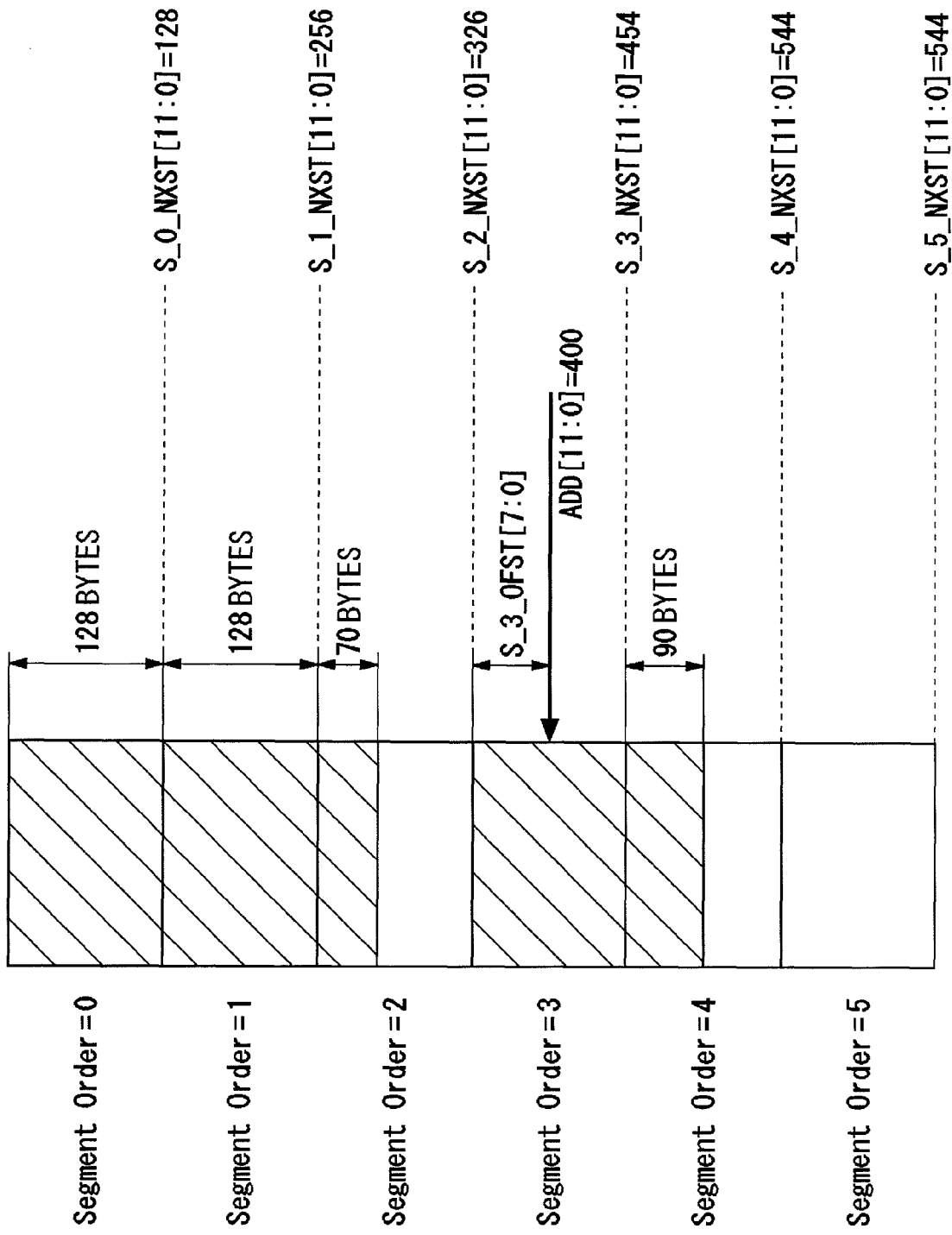
FIG. 20 is a schematic diagram related to a variation directed to improvement in transfer process, illustrating a method of ensuring continuous logical addresses after a segment transfer process.

FIG. 20 is a schematic diagram related to the variation directed to improvement in transfer process, illustrating a method of ensuring continuous logical addresses after a segment transfer process.

The segment register 146 in the basic implementation is a 9-bit register, in which the highest-order one bit indicates whether a segment is assigned and the lower-order eight bits indicate SegID of the assigned segment. In the variation directed to improvement in transfer process, the segment register 146 is expanded to 21 bits in size. Of the data Bn_Sm [20:0] stored in the segment register 146 (No.:m) of the register group 140 (ID:n), the highest-order one bit Bn_Sm[20] indicates whether a segment is assigned. Bn_Sm[19:8] indicates an "tail address". Bn_Sm[7:0] indicates SegID of the assigned segment. The "tail address" indicates "the number of bytes located between the start of the buffer space and the end of the data stored in the segment". Of Bn_Sm[20:0] in the segment register 146, Bn_Sm[19:8] is output from the selector 144 of the state storage circuit 126 as S_m_NXST[11:0].

In the case of the buffer space shown in FIG. 20, for example, 128-byte data is stored in the segment (No.:0) and the segment (No.:1). However, the segment (No.:2) only stores 70-byte data. The segment (No.:3) stores 128-byte data. However, the segment (No.:4) only stores 90-byte data. The segment (No.:5) does not store data at all.

In the illustrated example, the tail address S_O_NXST[11:0] of the segment (No.:0) is 128.

This is because there are 128 bytes between the start (logical address=0x0000) of the buffer space and the end (logical address=0x00FF) of the segment (No.:0). Similarly, the tail address S_1_NXST[11:0] of the segment (No.:1) is 256 since 128+128=256. The tail address S_2_NXST[11:0] of the segment (No.:2) is 326 since 256+70=326. Similarly, the tail address S_3_NXST[11:0] of the segment (No.:3) is 454 since 326+128=454. The tail address S_4_NXST[11:0] of the segment (No.:4) is 544 since 454+90=544.

In the address conversion method of the basic implementation shown with reference to, for example, FIG. 11, a physical address is identified by identifying a segment number (SegOdr) by ADD[11:8], identifying SegID by a segment number (SegOdr), and identifying an intra-segment address (SegAdd) by ADD[7:0]. However, in the case of the buffer space shown in FIG. 20, the continuity of logical addresses is lost since a part of the segment (No.:2) is unused. In other words, an attempt by the CPU 110 to address the 70th byte and the subsequent bytes in the segment (No.:2) will result in an unauthorized access. In order to prevent an unauthorized access from occurring, it is necessary to ensure that a "hole" occurring in a part of the segment (No.:2) is not addressed.

In the variation directed to improvement in transfer process, the logical address is controlled based upon the tail address such that the logical address of the data at the end of the segment (No.:2) and the logical address of the data at the start of the segment (No.:3) are continuous, in order to ensure that the "hole" in the segment is not addressed. In the illustrated example, the range of logical addresses is controlled so that the logical addresses for the segment (No.:0) range from "0 to 127", the logical addresses for the segment (No.:1) range from "128 to 255", the logical addresses for the segment (No.:2) range from "256 to 325", the logical addresses for the segment (No.:3) range from "326 to 453", and the logical addresses for the segment (No.:4) range from "454 to 543".

Hereinafter, the logical addresses are denoted by decimal numbers unless otherwise specified.

For example, it will be assumed that address 400 in the buffer space is designated by a logical address ADD[11:0] as the destination of access. Since S_2_NXST[11:0]=326 and S_3_NXST[11:0]=454, address 400 is located in the segment (No.:3). Since S_2_NXST[11:0]=326 and 400−326=74, address 400 indicates the 74th byte from the start of the segment (No.:3).

Figure 21:
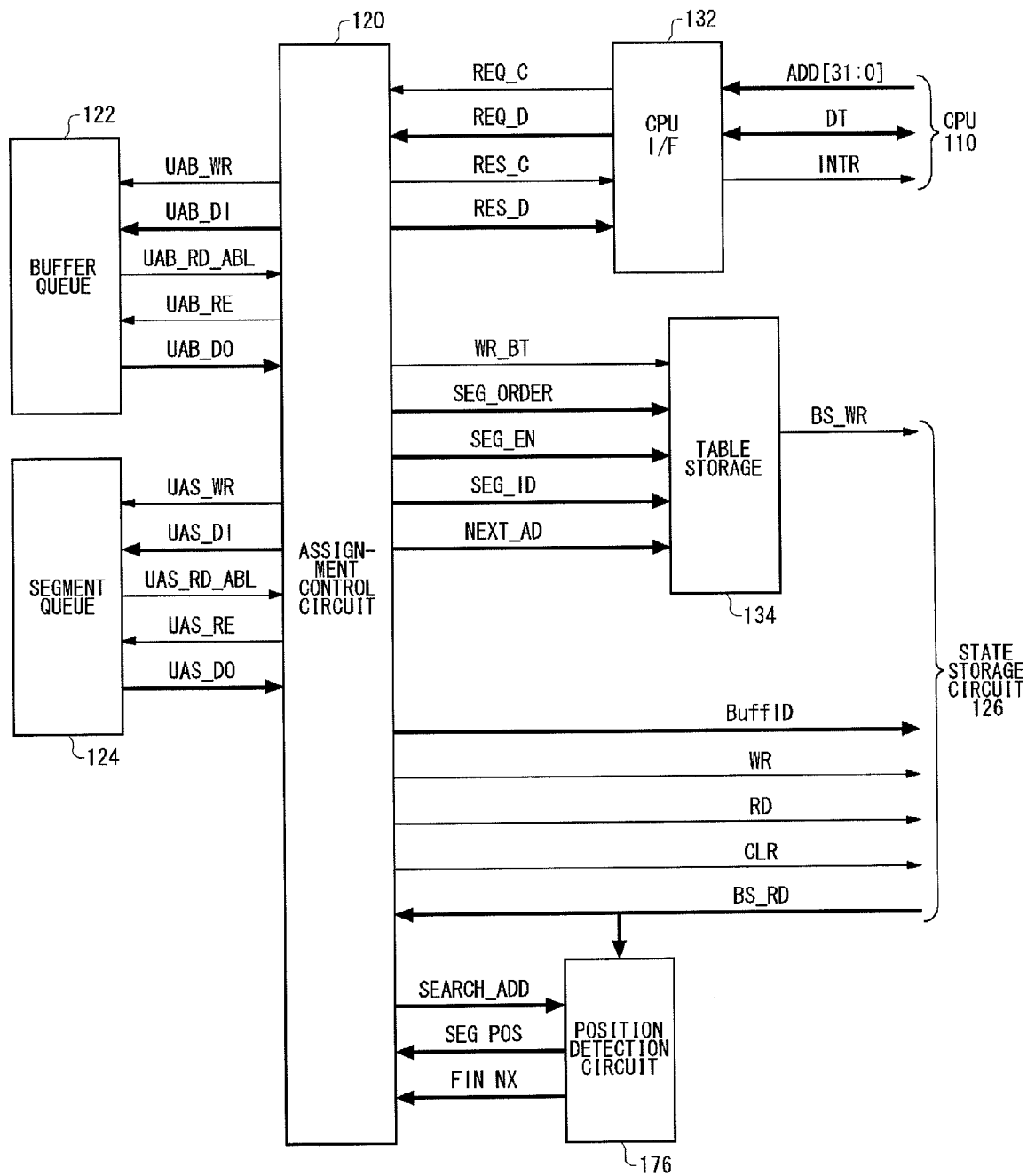
FIG. 21 is related to the variation directed to improvement in transfer process and shows the configuration of the assignment control circuit and the peripheral circuit.

FIG. 21 is related to the variation directed to improvement in transfer process and shows the configuration of the assignment control circuit 120 and the peripheral circuit.

The difference from the memory management device 100 of FIG. 7 is that a position detection circuit 176 is added.

Further, NEXT_AD is introduced for the assignment control circuit 120 to indicate a tail address. The position detection circuit 176 is a circuit for detecting a segment number which includes the logical address designated by SEARCH_ADD. SEG_POS denotes the associated segment number. FIN_NX denotes the tail address of the segment number which includes the logical address designated by SEARCH_ADD. The position detection circuit 176 will be described in further detail with reference to FIG. 23.

Figure 22:
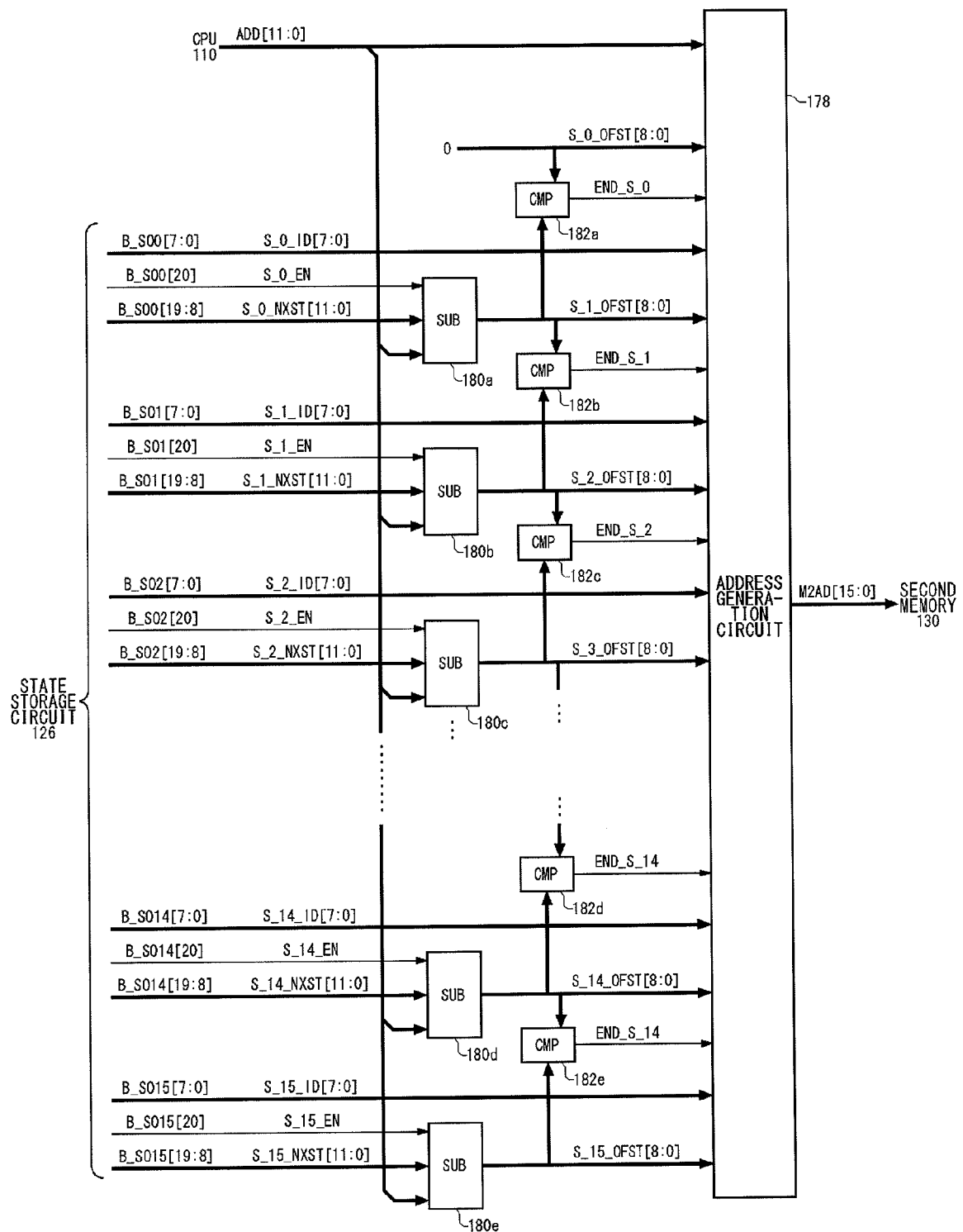
FIG. 22 shows the configuration of the address conversion circuit according to the variation directed to improvement in transfer process.

FIG. 22 shows the configuration of the address conversion circuit 128 according to the variation directed to improvement in transfer process. A logical address ADD designated by the CPU 110 and B_SO sent from the state storage circuit 126 are fed to the address conversion circuit 128. Of the logical address ADD[31:0], ADD[31:6] is fed to the selector 144 of the state storage circuit 126. The selector 144 transmits the segment assignment information for the buffer space designated by ADD[31:16] to the address conversion circuit 128 as B_SO.

Of the logical address ADD[31:0] designated by the CPU 110, ADD[11:0] (SegOdr/SegAdd) is fed to all subtractor circuits 180 in the address conversion circuit 128. Each of the subtractor circuits 180 corresponds to SegID. For example, a subtractor 180a corresponds to SegID=0 and a subtractor circuit 180b corresponds to SegID=1. Since the segment register 146 has a data size of 21 bits, B_SOm fed from the state storage circuit 126 is also 21-bit data (it is assumed that SegID=m). B_SO0[20] for the segment (No.:0), which indicates whether a segment is assigned to the segment, is fed as an SS_0_EN signal to the subtractor circuit 180a corresponding to the segment (No.:0). B_SO0[19:8], which indicates the tail address of the segment (No.:0), is also fed to the subtractor circuit 180a as S_0_NXST[11:0]. The same is true of the other segment numbers. B_SO0[7:0], which indicates SegID for the segment (No.:0), is fed to an address generation circuit 178 as S_0_ID[7:0]. The same is true of the other segment numbers.

(1) Subtractor Circuit 180

The subtractor circuits 180 and comparison circuits 182 are circuits for identifying a segment number which includes a logical address designated by ADD[11:0]. The operating logic is as follows.

When S_m_EN=1 (segment is assigned):

Computes ADD[11:0]−S_m_NXST[11:0], where m denotes a segment number. If the computation yields a value of 0 or greater, the computation result is output as S_m+1_OFST[7:0].

S_m+1_OFST[8] is set to 0. If the computation yields a negative value, S_m+1_OFST[8]=1 is output.

When S_m_EN=0 (segment is not assigned).

S_m+1_OFST[8:0] is set to 0. S_0_OFST[8:0] is always set to 0.

In the example shown in FIG. 20, ADD[11:0]=400 (address 400). Therefore, m=0 (segment (No.:0):
S_1_OFST[7:0]=272 since S_0_EN=1 (assigned) and ADD[11:0]−S_0_NXST[11:0]=400−128=272. Further, S_1_OFST[8]=0.

m=1 (segment (No.:1):
S_2_OFST[7:0]=144 since S_1_EN=1 (assigned) and ADD[11:0]−S_1_NXST[11:0]=400−256=144. Further, S_2_OFST[8]=0.

m=2 (segment (No.:2):
S_3_OFST[7:0]=74 since S_2_EN=1 (assigned) and ADD[11:0]−S_2_NXST[11:0]=400−326=74. Further, S_3_OFST[8]=0.

m=3 (segment (No.:3):
S_4_OFST[8]=1 since S_3_EN=1 (assigned) and ADD[11:0]−S_3_NXST[11:0]=400−454<0.

m=4 (segment (No.:4):
S_5_OFST[8]=1 since S_4_EN=1 (assigned) and ADD[11:0]−S_4_NXST[11:0]=400−544<0.

m=5 (segment (No.:5):
S_5_OFST[8:0]=0 since S_3_EN=0 (unassigned).

(2) Comparison Circuit 182

The comparison circuit 182 compares S_m_OFST[8:0] and S_m+1_OFST[8:0] and outputs the result of comparison as END_S_k. The operating logic is as follows.

When S_m OFST[8]=0 and S_m+1 OFST[8]=1: END_S_m=1

In the other cases: END_S_m=0

In the example shown in FIG. 20, m=0 (Segment (No.:0):
END_S_0=0 since S_0_OFST[8]=0 and S_1_OFST[8]=0.

m=1 (Segment (No.:1):
END_S_1=0 since S_1_OFST[8]=0 and S_2_OFST[8]=0.

m=2 (Segment (No.:2):
END_S_2=0 since S_2_OFST[8]=0 and S_3_OFST[8]=0.

m=3 (Segment (No.:3):
END_S_3=1 since S_3_OFST[8]=0 and S_4_OFST[8]=1.

m=4 (Segment (No.:4):
END_S_4=0 since S_4_OFST[8]=1 and S_5_OFST[8]=1.

m occurring when END_S_m=1 denotes the segment number of the segment which includes the logical address denoted by ADD[11:0]. In this case, the segment (No.:3) is identified as including the logical address 400.

(3) Address Generation Circuit 178

The address generation circuit 178 generates a physical address M2AD[15:0] from ADD[11:0], END_S_m, S_m_ID [7:0], and S_m_OFST[7:0].

When END_S_0=1 for the segment with m=0 (segment (No.:0)), M2AD[15:0] is generated such that M2AD [15:8]=S_0_ID[7:0] and M2AD[7:0]=ADD[7:0].

When END_S_m=1 for the segments other than the segment with m=0 (segment (No.:0)), M2AD[15:0] is generated such that M2AD[15:8]=S_m_ID[7:0] and M2AD [7:0]=S_m_OFST[7:0].

In the example illustrated in FIG. 20, M2AD[15:8]=S_3_ID[7:0] and M2AD[7:0]=S_3_OFST[7:0]=74 since END_S_3=1. Thus, the physical address is identified as being the 74th byte from the start of the segment associated with the segment (No.:3).

Figure 23:
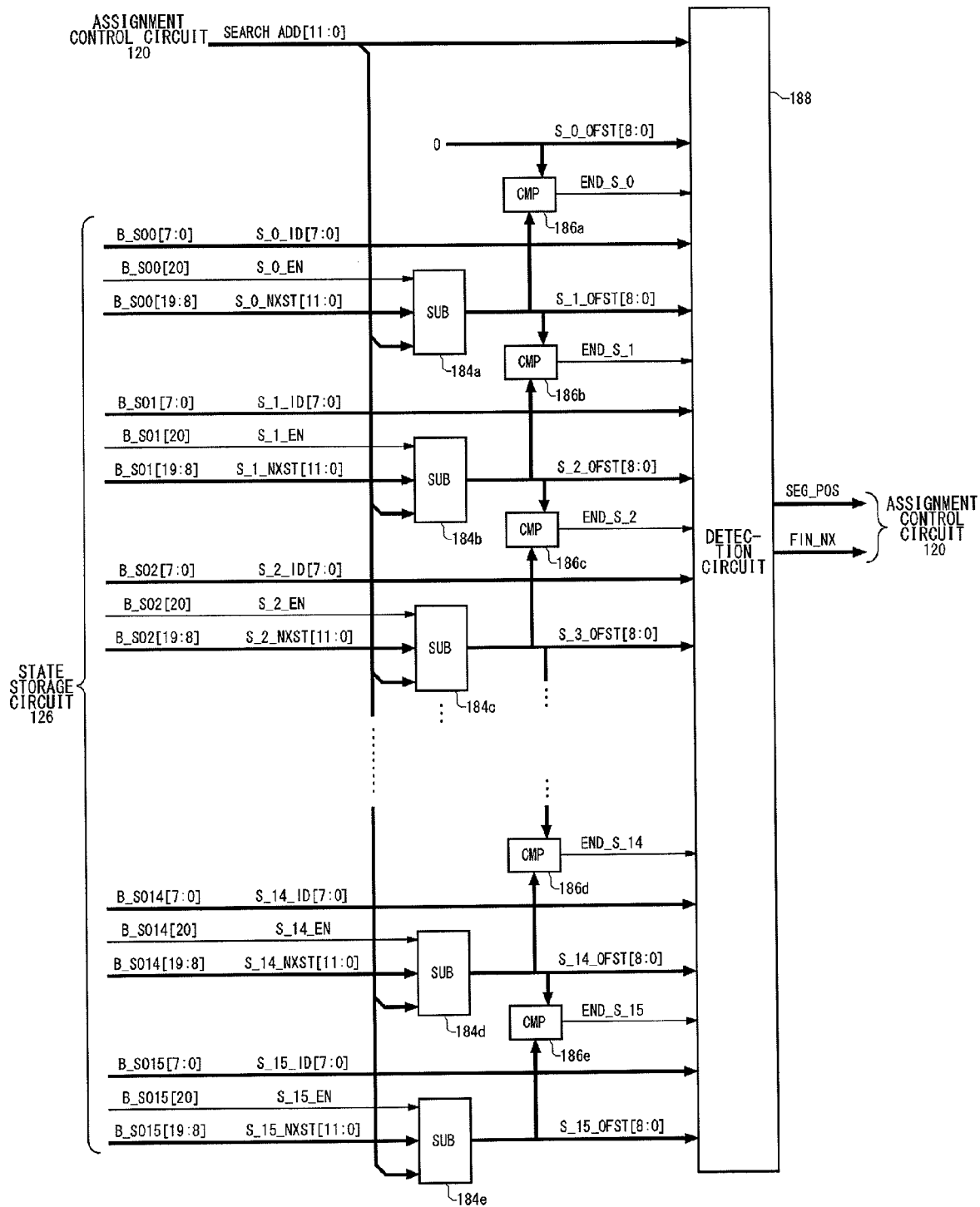
FIG. 23 shows the configuration of a position detection circuit according to the variation directed to improvement in transfer process.

FIG. 23 shows the configuration of the position detection circuit 176 according to the variation directed to improvement in transfer process.

When a partial buffer release request command is input, the position detection circuit 176 is fed an input of "released address-1", designated by the configuration parameters, as SEARCH_ADD. The basic scheme is the same as that of the address conversion circuit 128 shown in FIG. 22. The detection circuit 178 outputs the segment number to which the "released address-1" indicated by SEARCH_ADD belongs, i.e., outputs the maintained number as SEG_POS. The detection circuit 188 outputs the tail address in the segment (No.: maintained number) as FIN_NX.

A subtractor 184 operates on the same logic as the subtractor circuit 180 of FIG. 22 to subtract S_m_NXST[11:0] from ADD[11:0]. A comparison circuit 186 detects a segment number which includes "released address-1", i.e., the maintained number, using the same logic as used in the comparison circuit 182 of FIG. 22. In the case of the memory management device 100 according to the variation directed to improvement in transfer process, "released address-1" is fed to the position detection 176 as SEARCH_ADD in step S70 of FIG. 17 for partial buffer release. The position is detected as SEG_POS.

Figure 24:
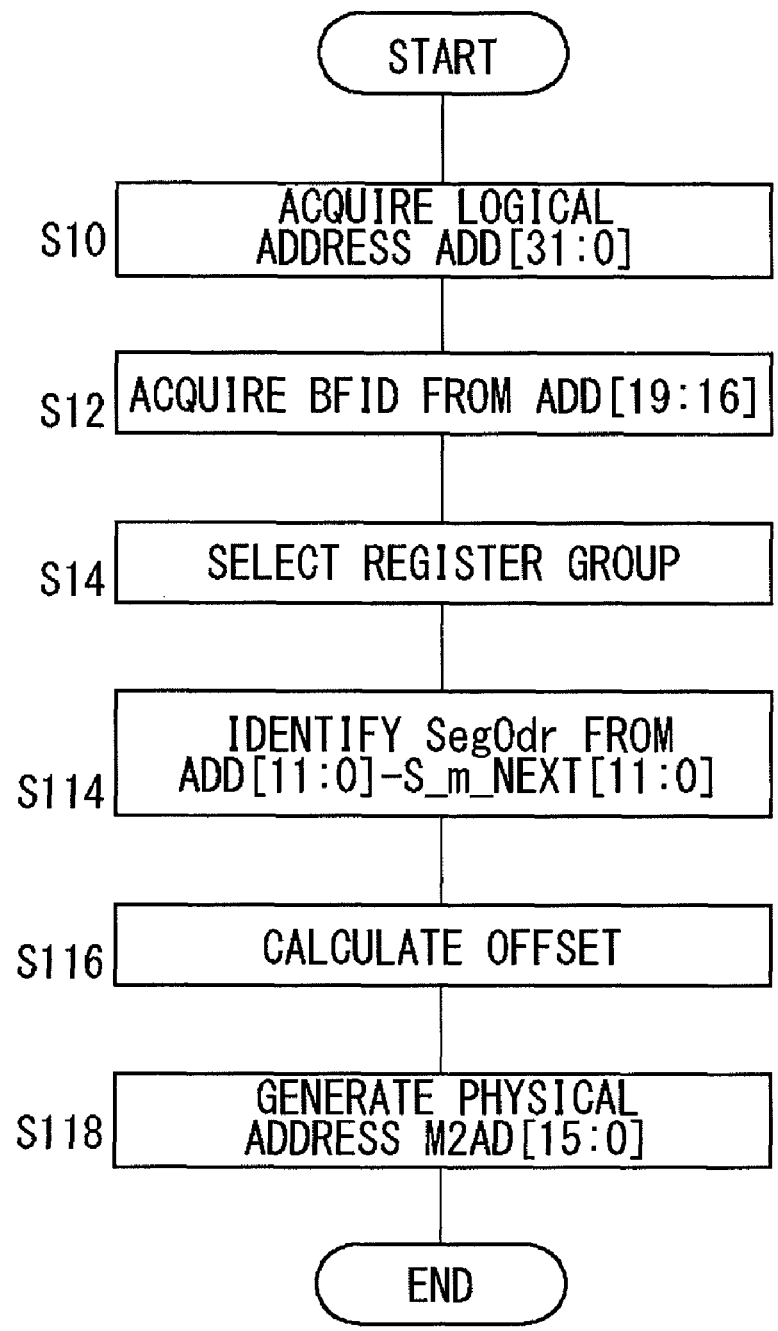
FIG. 24 is a flowchart showing the steps performed for address conversion in the variation directed to improvement in transfer process.

FIG. 24 is a flowchart showing the steps performed for address conversion in the variation directed to improvement in transfer process.

Referring to FIG. 24, the details of the steps denoted by the same reference numerals as those of FIG. 11 are the same as those described with reference to FIG. 11. After the state storage circuit 126 selects a register group 140 based upon a logical address ADD, the address conversion circuit 128 uses the processing method described with reference to FIG. 22 to identify a segment number to which the logical address belongs (S114). The circuit 126 generates a physical address M2AD[15:0] by computing an offset S_m_OFST[7:0] in the segment thus identified (S116, S118).

The process for acquiring a buffer according to this variation is similar to the process described with reference to FIG. 12. The difference is that a tail address is recorded in the segment register 146. The process for fully releasing a buffer according to this variation is similar to the process described with reference to FIG. 13. The process for partially releasing a buffer according to this variation is similar to the process described with reference to FIG. 15. The difference is that a maintained number is identified by the position detection circuit 176.

Figure 25:
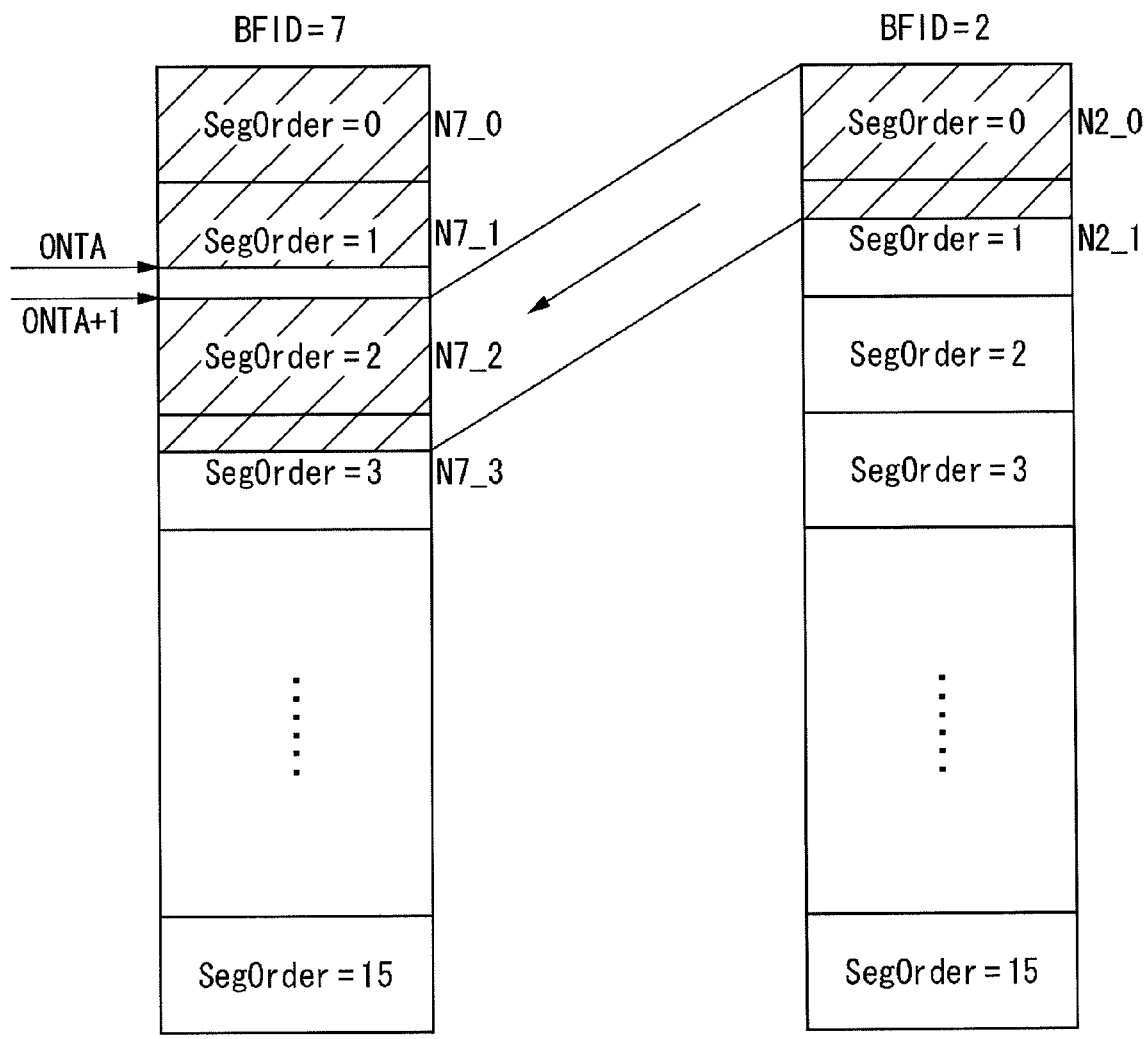
FIG. 25 is a schematic diagram related to the variation directed to improvement in transfer process, illustrating the details of a segment transfer process.

FIG. 25 is a schematic diagram related to the variation directed to improvement in transfer process, illustrating the details of a segment transfer process.

The steps performed in a segment transfer process are similar to the steps described with reference to FIG. 17. The difference is that the step for modifying the tail address of a segment is added. FIG. 25 shows two buffer spaces: a transfer destination buffer space (ID:7) and a transfer source buffer space (ID:2). In the transfer destination buffer space (ID:7), segments are assigned to the segment number "0" and the segment number "1". Segments are also assigned to the segment numbers "0" and "1" in the transfer source buffer space (ID:2). It will be assumed that the destination of assignment of the segments in the buffer space (ID:2) is changed to the segment buffer space (ID:7).

In response to a segment transfer request, the assignment control circuit 120 changes the destination of assignment of the segments associated with the segment (No.:0) and the segment (No.:1) of the transfer source buffer space (ID:2) to the segment (No.:2) and the segment (No.:3) of the buffer space (ID:2), respectively.

The tail address of a segment (No.:m) in a segment buffer (ID:n) will be denoted by "Nn_m". The change in the destination of assignment of a segment requires setting up N7_2 and N7_3. For this purpose, the assignment control circuit 120 stores the tail logical address of the segment (No.:2) in the buffer space (ID:7) as "ONTA". Thus, the start logical address of the of the segment (No.:3) would be "ONTA+1". The assignment control circuit 120 configures the tail address such that N7_2=N2_0+ONTA and N7_3=N2_1+ONTA. The configuration as described above allows the tail address of the transfer destination segment to be set up properly after the segment transfer.

In the variation directed to improvement in transfer process, the segment register 146 stores the tail address in the associated segment. The address conversion circuit 128 refers to the tail address so as to assign logical addresses in the buffer space occurring after the segment transfer only to an area where data is located. For this reason, access to areas in the post-transfer buffer space other than the area where data is located can be more properly prevented than otherwise.

A description will now be given of a variation to a linking process in which the function for linking buffers is introduced.

[Variation Directed to Linking Process]

In the basic implementation and the variation directed to improvement in transfer process, the number of segments included in a buffer space is described as being eight in maximum. Therefore, the size of a buffer space is limited to eight segments, i.e., 256×8=2048 bytes (2 kilobytes).

However, different tasks require different sizes of a buffer space. For example, a process A may only require a buffer space of 2 kilobytes, whereas another process B may require a buffer space of 100 kilobytes. A process A may normally require a buffer space of 2 kilobytes only but may require a buffer space of 100 kilobytes in some rare cases.

A buffer space of 2 kilobytes is implemented by eight segments, but to implement a buffer space of 100 kilobytes, 400 segments are required. The maximum size of a buffer space may be configured to be 100 kilobytes in preparation for a case where 100 kilobytes are requested. This will result, however, in including 400 segment registers per register group 140. Since the process A rarely requires the entirety of 400 segment registers 146, however, the operation of the memory management device 100 would be inefficient.

Hereinafter, a method is disclosed whereby the desired goal is achieved by introducing in the memory management device 100 the function of linking a plurality of buffer spaces so as to enlarge a range of logical addresses. The variation will be referred to as "variation directed to linking process".

Figure 26:
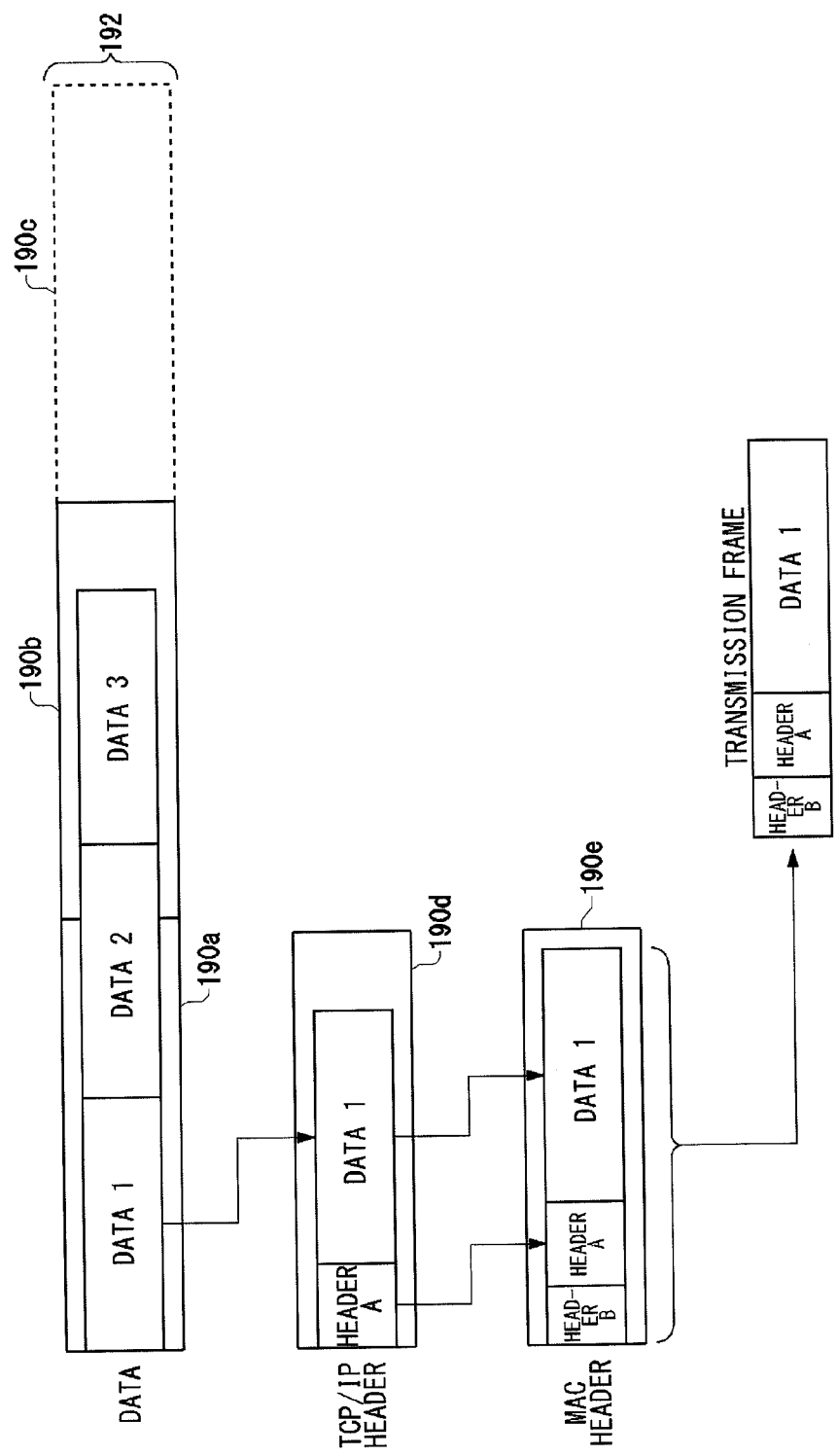
FIG. 26 is a schematic diagram illustrating a buffer linking process as it relates to data transmission using TCP/IP.

FIG. 26 is a schematic diagram illustrating a buffer linking process as it relates to data transmission using TCP/IP.

Communications applications are designed to handle the maximum frame size of 1522 bytes of the Ethernet™ protocol. However, TCP/IP, higher than Ethernet, has no upper limit as to the data size it handles. The variation directed to linking provides a method of creating a buffer space sufficient to handle TCP/IP data by linking a plurality of buffers spaces. Hereinafter, an enlarged logical address space formed by linking a plurality of buffer spaces will be referred to as a "linked space".

In this case, too, the following three processes are defined:
Content-related process for generating transmission data carrying contents.
TCP/IP process for generating a TCP/IP header to be appended to transmission data.
MAC process for generating a Media Access Control (MAC) header to be appended to transmission data. It will be assumed that the three processes are performed asynchronously.

A linked space 192 formed by buffers 190a, 190b, and 190c stores transmission data items 1, 2, and 3. In a content-related process, the buffer 190a is first acquired and the transmission data item 1 is then recorded therein. To record the next transmission data item 2, the new buffer 190b is acquired and linked to the buffer 190b. The transmission data item 2 is recorded so as to span the buffer 190a and the buffer 190b. The next transmission data item 3 is recorded in the buffer 190b. To store additional transmission data, the buffer 190c will be linked. The linked space can be addressed by continuous logical addresses despite the boundaries between the buffer spaces. In this way, the logical address range used by a content-related process is expanded as needed.

In TCP/IP process, a buffer 190d is acquired and a header A (TCP/IP header) is generated and recorded therein.

A segment transfer request causes the transmission data item 1 in the buffer 190a to be transferred to the buffer 190d.

The buffer 190d stores the header A and the transmission data item 1. The transmission data item 1 in the buffer 190a is deleted.

In a MAC process, a buffer 190e is acquired and a header B (MAC header) is generated and recorded in the buffer 190e. A segment transfer request causes the header A plus the transmission data item 1 to be transferred to the buffer 190e. The buffer 190e stores the header B, the header A, and the transmission data item 1. The buffer 190d may be fully released. In this way, the data set stored in the buffer 190e and comprising the header B, the header A, and the transmission data item 1 is transmitted outside as a transmission frame. The buffer 190e may be fully released in this process.

When the transmission data item 2 has been transmitted, the buffer 190e is fully released. According to the processing method described above, the size of a buffer space can be varied substantially, by acquiring and releasing as many buffers as necessary in accordance with the required process and at a desired point of time.

Figure 27:
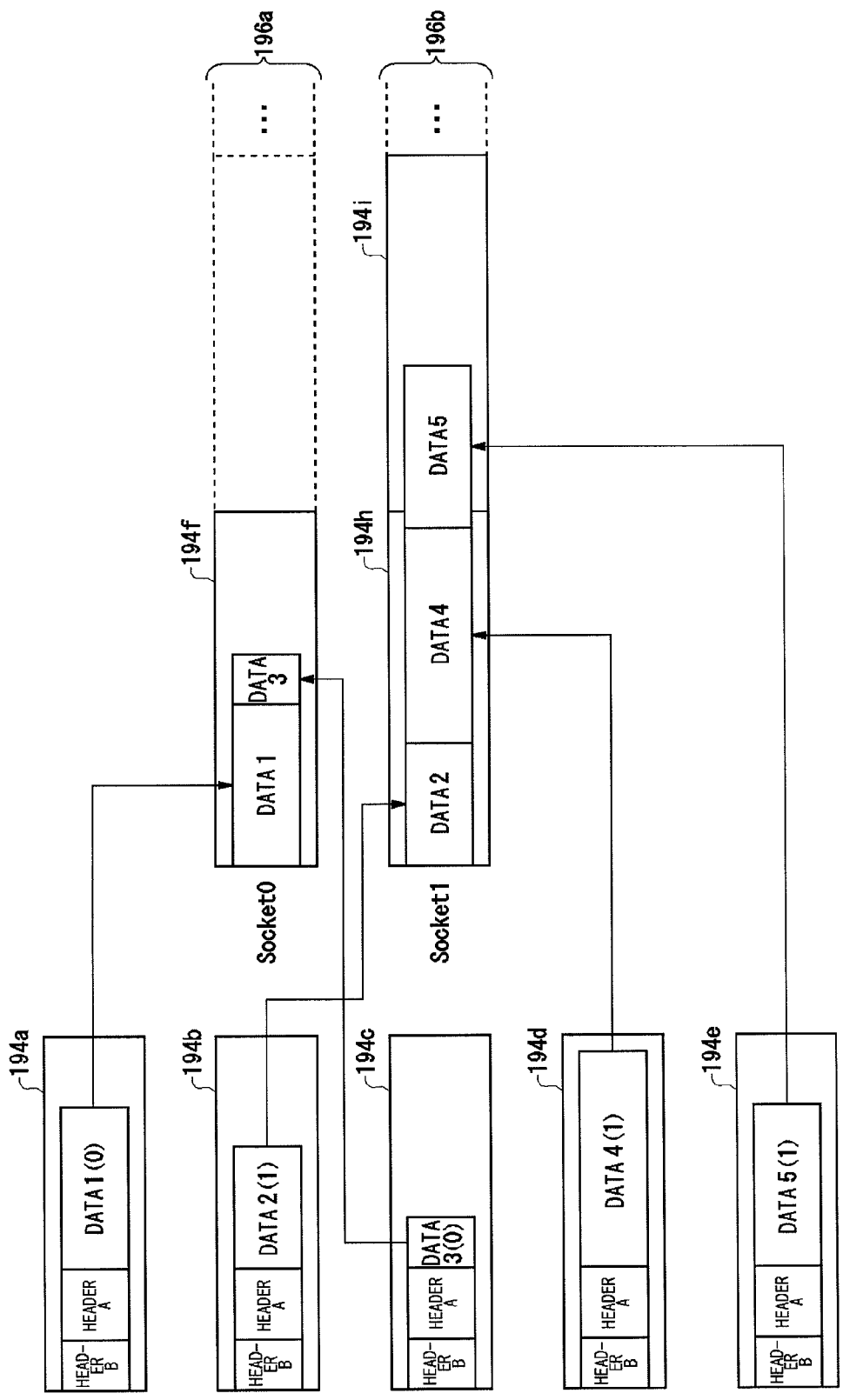
FIG. 27 is a schematic diagram illustrating a buffer linking process as it relates to data reception using TCP/IP.

FIG. 27 is a schematic diagram illustrating a buffer linking process as it relates to data reception using TCP/IP.

A reception task, having received a TCP/IP packet from an external device, identifies destination application software by referring to a socket number (port number) described in the TCP/IP header of the packet. Referring to FIG. 27, five received data items 1-5 are stored in five buffers 194a, 194b, 194c, 194d, and 194e, respectively. The reception task may acquire a buffer every time the task receives a TCP/IP packet. Since the process of acquiring a buffer does not require OS functions, a buffer can be acquired at a low cost without imposing a substantial load on the CPU. Therefore, program codes for acquiring a buffer for each received packet can be executed at a low cost.

The received data item 1 in the buffer 194a and the received data item 3 in the buffer 194c are destined to the socket number:0. The received data items 2 in the buffer 194b, the received data item 4 in the buffer 194d, and the received data item 5 in the buffer 194e are destined to the socket number:1. Accordingly, the reception task makes available a linked space 196a for the socket number:0 and a linked space 196b for the socket number:1 to build received data. The reception task records the received data item 1 and the received data item 3 in the buffer 194f in the linked space 196a. The reception task further records the received data item 2 and the received data item 4 in the buffer 194h in the linked space 196b. Subsequently, the task links a buffer 194i to the linked space 196b and continues to record the received data item 5 therein.

According to this processing method, as many buffer spaces as are required for each socket are made available when needed.

In the following description of the variation directed to linking, it is assumed that the maximum number of buffers is 16, the segment size is 128 bytes, the maximum number of segments per buffer is 16, the total number of segments is 256 (=16×16), and the maximum number of spaces connected is 16.

Figure 28:
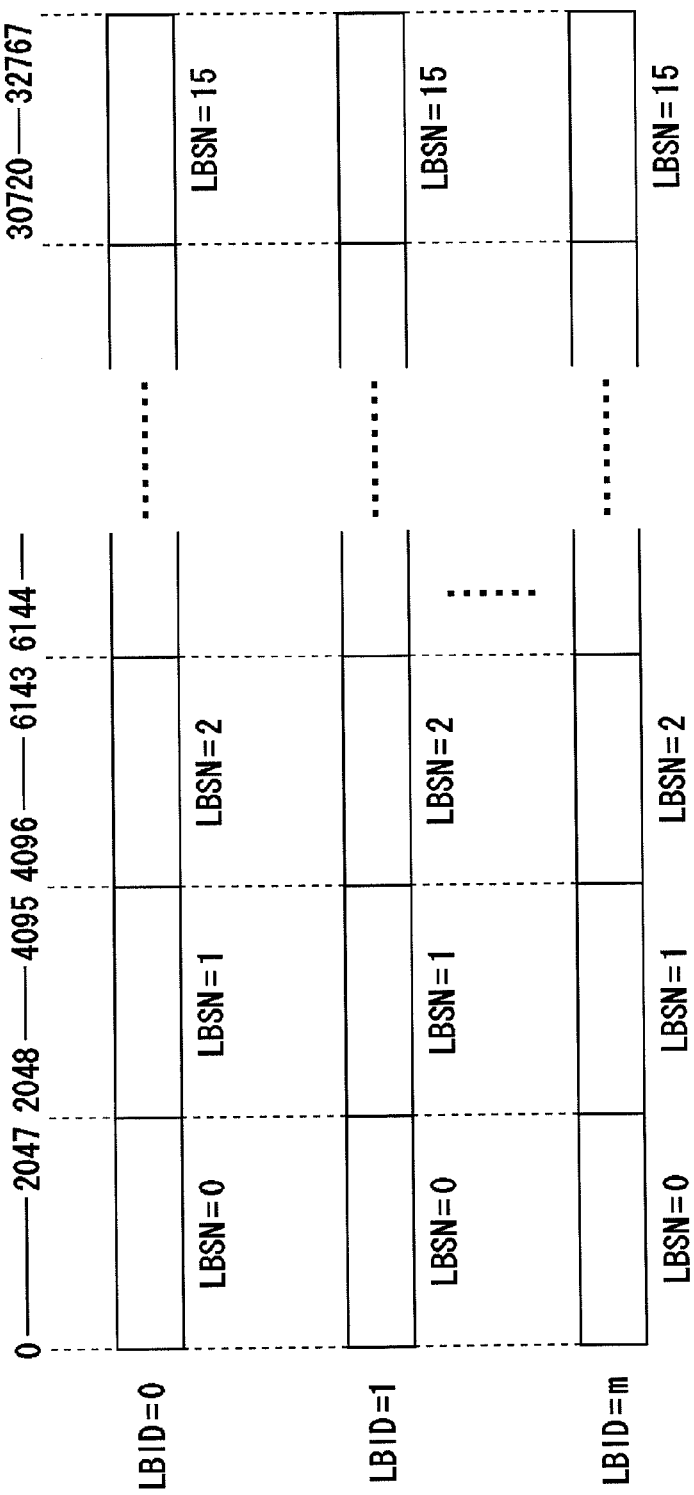
FIG. 28 is a schematic diagram illustrating the relation between LBID and LBSN in a linked space.

FIG. 28 is a schematic diagram illustrating the relation between LBID and LBSN in a linked space.

Each linked space is uniquely identified by an ID called Linked Buffer ID (LBID). Buffer spaces constituting a linked space are assigned sequence numbers called Linked Buffer Sequence Numbers (LBSN). Since the maximum number of segments per buffer is 16 and the size of a segment is 128, the maximum size of a buffer is 2048 bytes (2 kilobytes) since 128×16=2048. Since the maximum number of buffers per linked space is 16, the maximum size of a linked space is 32768 bytes (32 kilobytes) since 2048×16=3276. LBSN identifies a range of logical addresses in a linked space. For example, the buffer with LBSN=0 (hereinafter, denoted as "buffer (LBSN:0)") represents addresses "0-2047" at the start of the range of logical addresses "0-32767" in a linked space. Similarly, the buffer (LBSN:1) represents a range of logical addresses "2048-4095" in the linked space.

As already described, each buffer is formed as a set of segments. A segment number identifies a location in a buffer space. For example, the segment (No.:0) in the buffer (LBSN:1) represents a range of logical addresses "2048-2175", the first 128 bytes in the range of logical addresses "2048-4095". The segment (No.:1) in the buffer (LBSN:1) represents a range of logical addresses "2176-2303" of the range of logical addresses "2048-4095".

To summarize,

LBID: identifies a linked space.

LBSN: identifies an associated range in the range of logical addresses in a linked space in units of buffer sizes.

SegID: identifies an associated range in the range of logical addresses in a linked space in units of segment sizes.

SegAdd: indicates an offset from the start of a segment.

The maximum number of linked space is 16 and the maximum number of buffers assignable is also 16. Therefore, if 16 buffers are linked in a single linked space, it will be impossible to create another linked space. If there are 16 linked spaces each including only a single buffer, it will not be possible to add a new buffer to any of the linked spaces. The combination of the number of linked spaces and the number of buffers can be flexibly set by an application. In this background, a parameter MAX_LSBN is introduced to denote a linked space. MAX_LBSN denotes an upper limit to the number of buffers that can be connected to a linked space. MAX_LBSN is configured to range between 1-16. For example, a linked space configured such that MAX_LSBN=3 will have an LSBN of 0-2. Data is recorded in the buffer (LBSN:0), the buffer (LBSN:1), and the buffer (LBSN:2) in the stated order. When there is not enough space in the buffer (LBSN:2) any more, data continues to be recorded in the buffer (LBSN:0) to continue from the buffer (LBSN:2). If the buffer (LBSN:0) is in use, control waits until the buffer (LBSN:0) is fully released. In this way, data can be recorded in a linked space cyclically.

Figure 29:
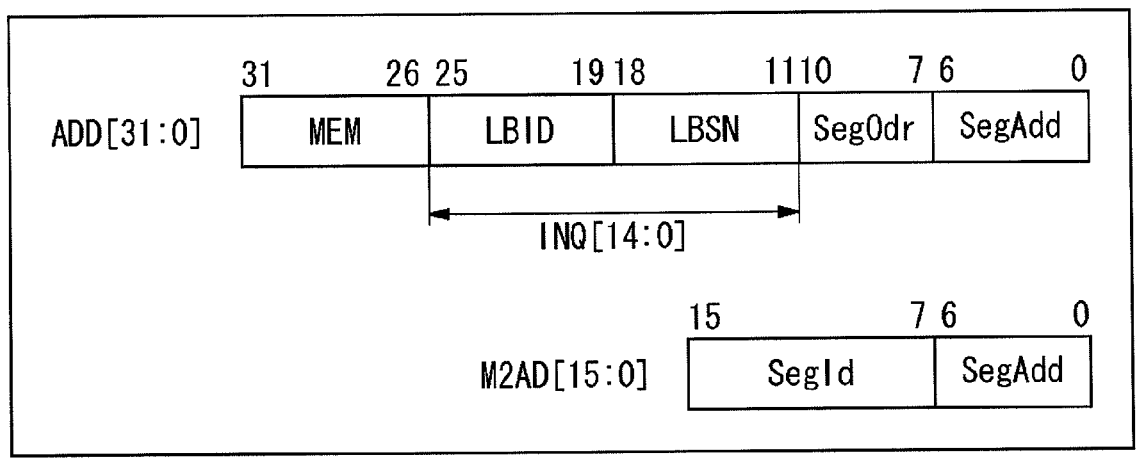
FIG. 29 shows the data structure of a logical address ADD and a physical address M2AD in a variation directed to linking.

FIG. 29 shows the data structure of a logical address ADD and a physical address M2AD in the variation directed to linking.

Memory (MEM): the highest-order six bits ADD[31:26] of the 32-bit logical address ADD[31:0] identifies a memory to be accessed. If ADD[31:26]=0, the first memory 112 is the destination of access. If ADD[31:26]=1, the second memory 130 is the destination of access.

LBID: the seven bits ADD[25:19] indicates LBID.

Since the maximum number of linked spaces is 16, LBID ranges between 0 and 15. LBID identifies a linked space to be accessed.

LBSN: the eight bits ADD[18:11] indicates LBSN. LBID is an integer which ranges between 0 and MAX_LBSN-1. By using LBSN, the range of logical addresses to be accessed can be designated in units of buffer sizes.

Segment number (SegOdr): the four bits ADD[10:7] indicates a segment number. By using a segment number, a range of logical addresses in a buffer space identified by LBSN is defined in units of segment sizes, Since the maximum number of segments per buffer is 16, a segment number ranges between 0 and 15.

Intra-segment address (SegAdd): the seven bits ADD[6:0] indicate an intra-segment address. Since a segment has a size of 128 bytes, an intra-segment address ranges between 0 and 127.

Thus, the CPU 110 designates a location in the second memory 130 to be accessed with a logical address ADD[31:0] which includes MEM, LBID, LBSN, SegOdr, and SegAdd. In place of BFID in ADD of FIG. 5 described in connection with the basic implementation, a buffer is identified by a pair of LBID and LBSN. Hereinafter, the LBID/LBSN pair in ADD [25:11] will be also denoted by INQ[14:0]. The address conversion circuit 128 generates a physical address M2AD[15:0] from a logical address ADD[31:0] and the segment assignment information in the state storage circuit 126.

SegID: the highest-order nine bits M2AD[15:7] of a physical address M2AD[15:0] indicates SegID. SegID identifies a range of physical addresses in units of segment sizes.

Intra-segment address (SegAdd): the seven bits M2AD[7:0] indicates an intra-segment address (SegAdd).

M2AD[15:0] identifies a physical address in the second memory 130.

Figure 30:
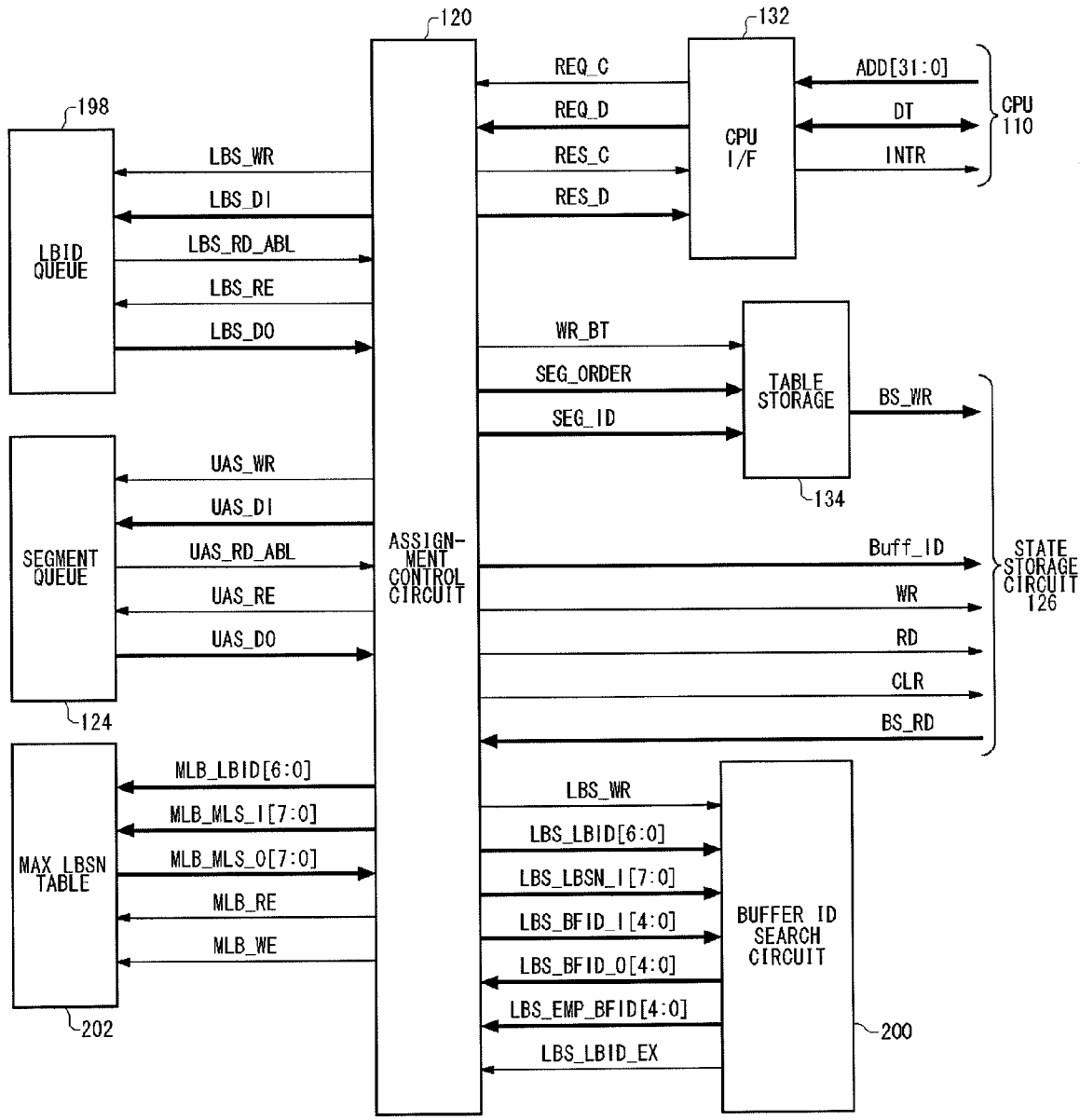
FIG. 30 is related to the variation directed to linking and shows the configuration of the assignment control circuit and the peripheral circuit.

FIG. 30 is related to the variation directed to linking and shows the configuration of the assignment control circuit 120 and the peripheral circuit.

The difference from the assignment control circuit 120 of the basic implementation shown in FIG. 7 is that an LBID queue 198, a MAXLBSN table 202, and a buffer ID search circuit 200 are added and the buffer queue 122 is removed. The function of the buffer queue 122 is implemented in a part of the buffer ID search circuit 200.

(1) LBID Queue 198

The LBID queue 198 is a memory that stores the LBID of a linked space available for assignment in the FIFO mode. Since the maximum number of buffer spaces assignable by the assignment control circuit 120 is 16, the LBID queue 198 stores 16 LBIDs in an initial state. When a new linked space is assigned to a task, the assignment control circuit 120 takes out one LBID from the LBID queue 198. When releasing a linked space already assigned, the assignment control circuit 120 returns the LBID to the LBID queue 198.

The following five signals are exchanged between the LBID queue 198 and the assignment control circuit 120.

a. LBS_WR: a write signal from the assignment control circuit 120 to the LBID queue 198.

b. LBS_DI: an LBID transmission signal from the assignment control circuit 120 to the LBID queue 198. When LBS_WR is asserted, LBID occurring in LBS_DI is written in the LBID queue 198. To release a linked space, the assignment control circuit asserts LBS_WR.

c. LBS_RD_ABL: indicates whether LBID is stored in the LBID queue 198, i.e., whether there remains a linked space available for assignment. LBS_RD_ABL is set to "1" when LBID is stored and to "0" when it is not. In setting up a new linked space, the assignment control circuit 120 refers to LBS_RD_ABL to determine whether a space can be acquired.

d. LBS_RE: a read signal from the assignment control circuit 120 to the LBID queue 198.

e. LBS_DO: an LBID transmission signal from the LBID queue 198 to the assignment control circuit 120. When LBS_RE is asserted, LBID occurring in LBS_DO is read from the LBID queue 198 into the assignment control circuit 120. In setting up a new linked space, the assignment control circuit 120 confirms that UALBS_RD_ABL=1 and asserts LBS_RE.

(2) MAXLBSN Table 202

The MAXLBSN table 202 stores MAX_LBSN of the linked spaces. The following five signals are exchanged between the MAXLBSN table 202 and the assignment control circuit 202.

a. MLB_RE: a read signal from the assignment control circuit 120 to the MAXLBSN table 202.

b. MLB_WE: a write signal from the assignment control circuit 120 to the MAXLBSN table 202.

c. MLB_LBID[6:0]: a signal which allows the assignment control circuit 120 to designate LBID to the MAXLBSN table 202.

d. MLB_MLS_I[7:0]: a signal which allows the assignment control circuit 120 to designate MAX_LBSN to the MAXLBSN table 202. When MLB_WE is asserted, MAX_LBSN designated by MLB_MLS_I for the linked space designated by MLB_LBID is written in the MAXLBSN table 202.

e. MLB_MLS_O[7:0]: an MAX_LBSN transmission signal from the MAXLBSN table 202 to the assignment control circuit 120.

When MLB_RE is asserted, MAX_LBSN occurring in MLB_MLS_O is read from the MAX_LBSN table 202.

(3) The buffer ID Search Circuit 200

The buffer ID search circuit 200 stores INQ, i.e., LBID/LBSN, and BFID in association with each other. Further, the buffer ID search circuit 200 manages free BFIDs similarly as the buffer queue 122 of the basic implementation. The following seven signals are exchanged between the buffer ID search circuit 200 and the assignment control circuit 120.

a. LBS_WR: a write signal from the assignment control circuit 120 to the buffer ID search circuit 200.

b. LBS_LBID[6:0]: an LBID transmission signal from the assignment control circuit 120 to the buffer ID search circuit 200.

c. LBS_LBSN[7:0]: an LBSN transmission signal from the assignment control circuit 120 to the buffer ID search circuit 200.

d. LBS_BFID_I[4:0]: a BFID transmission signal from the assignment control circuit 120 to the buffer ID search circuit 200. The highest-order one bit LBS_BFID_0[4] indicates distinction between a write instruction and a clear instruction and the lowest-order three bits LBS_BFID_0[3:0] indicates BFID. When LBS_WR is asserted in concurrence with a write instruction, BFID is associated with LBID/LBSN designated by LBS_LBID[6:0] and LBS_LBSN[7:0]. When LBS_WR is asserted in concurrence with a clear instruction, the association between BFID and LBID/LBSN designated by LBS_LBID[6:0] and LBS_LBSN[7:0] is cleared. LBS_BFID_I[4]=1 indicates a write instruction and LBS_BFID_I[4]=0 indicates a clear instruction.

e. LBS_BFID_0[4:0]; a BFID transmission signal from the buffer ID search circuit 200 to the assignment control circuit 120. The highest-order one bit LBS_BFID_0[4] indicates whether a buffer is assigned or unassigned and the lowest-order three bits LBS_BFID_0[3:0] indicates BFID. LBS_BFID_0[4] indicates whether BFID is assigned to LBID/LBSN designated by BS_LBID[6:0] and LBS_LBSN [7:0]. LBS_BFID_0[4]=1 indicates "assigned" and LBS_BFID_0[4] indicates "unassigned".

f. LBS_EMP_BFID[4:0]: a signal which takes a value 1 when there is a free BFID and 0 when there is no free BFIDs.

g. LBS_LBID_EX: a signal which takes a value 1 when one or more buffer spaces are assigned to a linked space designated by LBS_LBID[6:0] and 0 when they are not.

Figure 31:
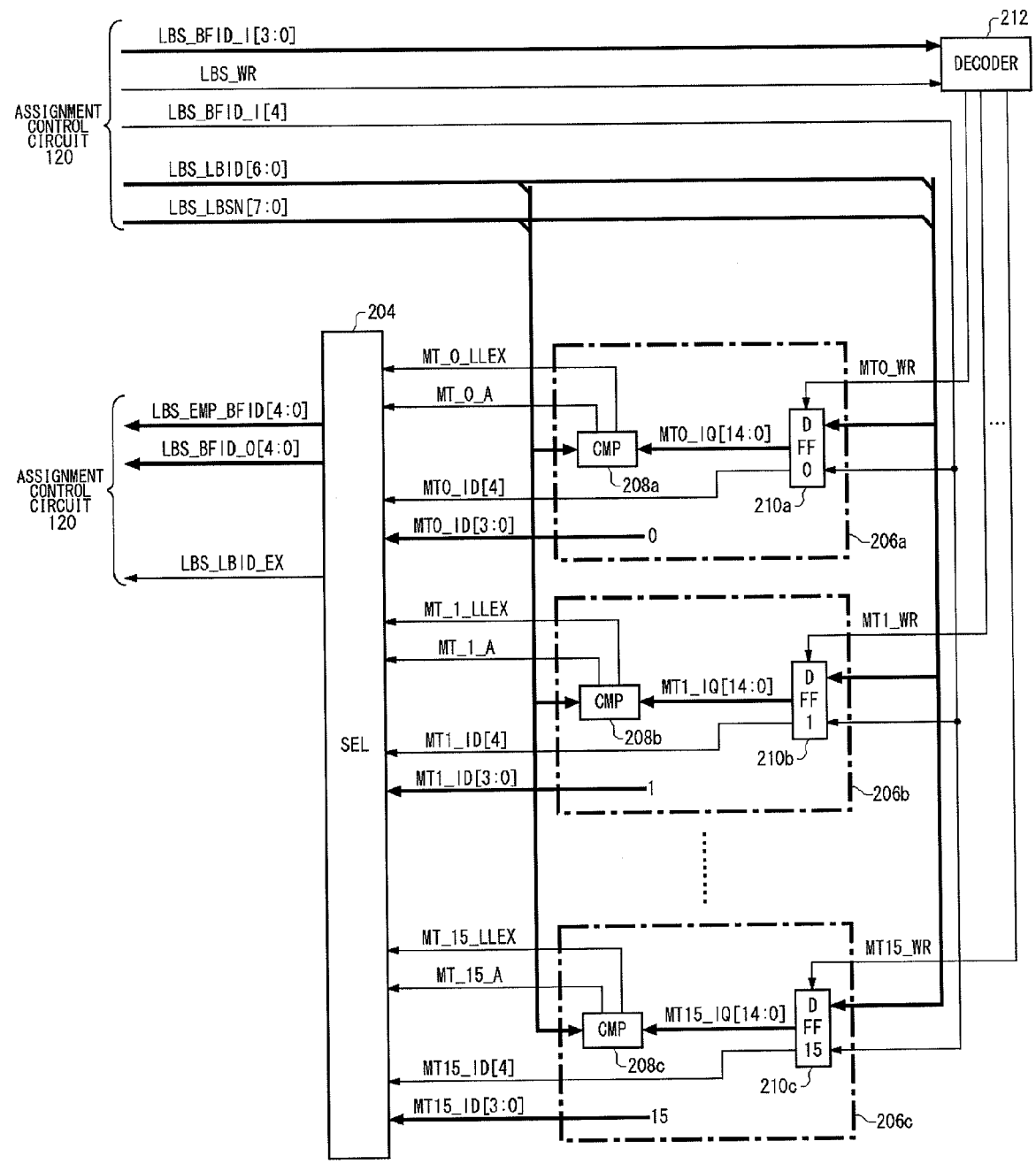
FIG. 31 shows the circuit configuration of a buffer ID search circuit according to the variation directed to linking.

FIG. 31 shows the circuit configuration of the buffer ID search circuit 200 according to the variation directed to linking.

INQ information circuits 206 are provided for respective buffer spaces. Therefore, 16 INQ information circuits 206 are provided. An INQ information circuit 206a corresponds to BFID=0 and the INQ information circuit 206b corresponds to BFID=1. Each INQ information circuit 206 is provided with a comparison circuit 208 and a storage circuit 210. The storage circuit 210 is a 16-bit flip-flop circuit. Of the data MTn [15:0] stored in the storage circuit 210, MTn[14:0] indicates INQ, i.e., LBID/LBSN, and MTn[15] indicates whether a buffer is assigned to the INQ. MTn[15]=0 indicates "unassigned" and MTn[15]=1 indicates "assigned". For example, when MT4[15]=1, and LBID=3 and LBSN=1 are indicated by MT4[14:0], it means that the buffer (BFID:4) is assigned to the second buffer (LBSN:1) from the start of the linked space (LBID:3).

LBS_BFID_I[3:0] and LBS_WR are fed to a decoder 212. When LBS_WR is asserted, the decoder 212 asserts MTn_WR fed to the INQ information circuit 206 corresponding to BFID designated by LBS_BFID_I[3:0]. If LBS_B-FID_I[4]=1, i.e., in the event of a write instruction, LBS_L-BID[6:0] and LBS_LBSN[7:0] are written in the storage circuit 210 of the INQ information circuit 206. Since LBID/LBSN and BFID are associated with each other, MTn[15] is set to 1. Thus, the assignment control circuit 120 is capable of recording LBID, LBSN, and BFID in the buffer ID search circuit 200 in association with each other, by giving a write instruction with LBS_BFID_I[4]=1, designating LBID, LBSN, and BFID, and then asserting LBS_WR. Of MTn[15: 0], MTn[15], which indicates whether a buffer is assigned, is fed to the selector 204 as MTn_ID[4]. MTn[14:0], which indicates a combination of LBID and LBSN, is fed to the comparison circuit 208 as MTn_IQ[14:0].

The data in the associated storage circuit 210 is cleared by giving a clear instruction with LBS_BFID_I[4]=0 and then asserting MTn_WR. In this case, the association between LBID, LBSN, and BFID is cleared so that BFID is made available again for assignment.

The comparison circuit 208 compares MTn_IQ[14:0] indicating a combination of LBID and LBSN with LBS_LBID [6:0], LBS_LBSN[7:0] transmitted from the assignment control circuit 120. MT_n_A=1 is yielded when the combination of LBID and LBSN indicated by MTn_IQ[14:0] and the combination of LBID and LBSN indicated by LBS_LBID[6: 0] and LBS_LBSN[7:0] completely match. Otherwise, MT_n_A=0. In other words, MT_n_A indicates whether the combination LBID/LBSN inquired for by LBS_LBID[6:0], LBS_LBSN[7:0] is recorded in the storage circuit 210.

Further, MT_n_LLEX=1 is yielded when LBID included in MTn_IQ[14:0] and LBID included in LBS_LBID[6:0] match. Otherwise, MT_n_LLEX=0. In other words, MT_n_LLEX indicates whether LBID inquired for by LBS_LBID[6:0] is stored in the storage circuit 210. Therefore, when MT_n_A=1, MT_n_LLEX=1 without exception. MT_n_A and MT_n_LLEX are fed to the selector 204. A predetermined value is given to the selector 204 as MTn_ID [3:0]. MTn_ID[3:0] denotes a signal indicating BFID.

To summarize, signals input to the selector 204 are as follows.
  a. MT_n_LLEX: indicates whether a buffer (BFID:k) is assigned to a linked space designated by the assignment control circuit 120 (0: unassigned, 1: assigned).
  b. MT_n_A: indicates whether a buffer (BFID:n) is assigned to a buffer space identified by LBID/LSBN designated by the assignment control circuit 120 (0: unassigned, 1: assigned).
  c. MTn_ID[4]: indicates whether a buffer with BFID indicated by MTn_ID[3:0] is assigned to any of the linked spaces (0: unassigned, 1: assigned).
  d. MTn_ID[3:0]: BFID.

To summarize, the following signals are output from the selector 204 to the assignment control circuit 120.
  a. LBS_EMP_BFID[4:0]: the lowest-order three bits LBS_EMP_BFID[3:0] indicate BFID, the highest-order one bit LBS_EMP_BFID[4] indicates whether BFID indicated by LBS_EMP_BFID[3:0] is available for assignment. If S_EMP_BFID[4]=1, it means BFID is available. If LES_EMP_BFID[4]=0, it means BFID is not available for assignment. The selector 204 checks MTn_ID[4] for BFID=0 through BFID=15 sequentially. If there is BFID for which MTn_ID[4]=0 (unassigned), the selector 204 outputs LES_EMP_BFID[4]=1 and LES_EMP_BFID[3:0]=BFID. If there is no BFIDs for which MTn_ID[4]=0, the selector 204 outputs LES_EMP_BFID[4]=0 and LES_EMP_BFID [3:0]=0. That is, the assignment control circuit 120 is capable of knowing whether a buffer is available for assignment and BFIDs of buffers available for assignment, by referring to LBS_EMP_BFID[4:0]. LBS_EMP_BFID[4:0] corresponds to UAB_RD_ABL and UAB_DO described with reference to FIG. 7 in connection with the basic implementation.
  b. LBS_BFID_O[4:0]: the highest-order one bit LBS_B-FID_O[4] indicates whether the BFID corresponding to the combination of LBID and LBSN indicated by LBS_LBID[6: 0] and LBS_LBSN[7:0] is available. The lowest-order three bits LBS_BFID_O[3:0] indicates the BFID. If LBS_BFID_O [4]=1, it means that BFID corresponding to the designated combination LBID/LBSN is available. If LBS_BFID_O [4]=0, it means that BFID is not available. The selector 204 checks MTn_ID[4] and MT_n_A for BFID=0 through BFID=15 sequentially. If there is BFID for which MTn_ID [4]=1 (assigned) and MT_n_A=1 (LBID/LBSN shows a match), the selector 204 outputs LBS_BFID_O[4]=1 and LBS_BFID_O[3:0]=BFID. If there is not, the selector 204 outputs LBS_BFID_O[4]=0 and LBS_BFID_O[3:0]=0. In other words, the assignment control circuit 120 is capable of knowing whether a buffer is assigned to LBID/LBSN designated by LBS_LBID[6:0] and LBS_LBSN[7:0] and BFID of the buffer assigned, by referring to LBS_BFID_O[4:0].
  c. LBS_LBID_EX: indicates whether one or more buffers are assigned to LBID designated by LBS_LBID[6:0]. If LBS_LBID_EX=1, it means that a buffer is assigned. If LBS_LBID_EX=0, it means that no buffers are assigned.

Figure 32:
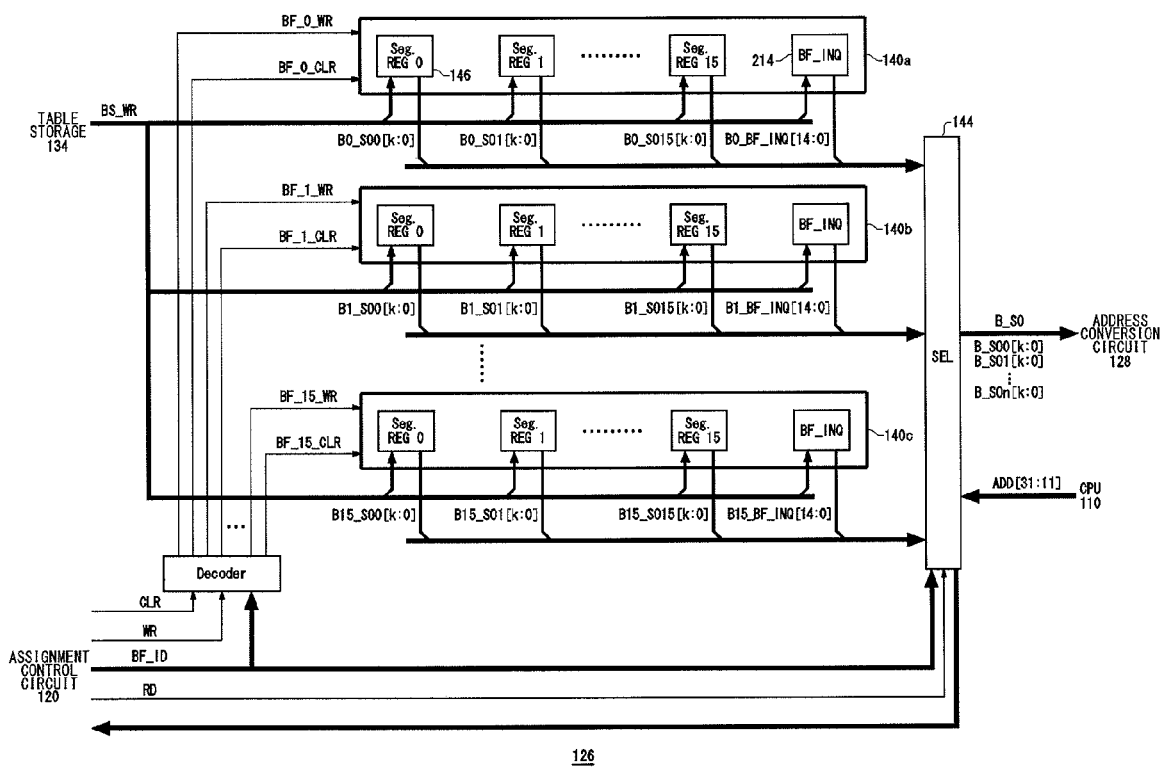
FIG. 32 shows the configuration of the state storage circuit according to the variation directed to linking.

FIG. 32 shows the configuration of the state storage circuit 126 according to the variation directed to linking.

The configuration of the state storage circuit 126 as shown is substantially the same as that of the state storage circuit 126 shown in FIG. 8 according to the basic implementation. The difference is that a link register 214 is included in each register group 140 in addition to a plurality of segment registers 146. The link register 214 records INQ[14:0], i.e., a combination of LBID and LBSN, corresponding to the associated BFID. The combination is output to the selector 144 as Bn_BF_INQ[14:0]. When a logical address ADD[31:16] shown in FIG. 29 is fed to the selector 144, the selector 144 checks the link registers 214 so as to identify a register group recording the LBID/LBSN indicated by ADD[25:11]. Through these steps, BFID corresponding to the LBID/LBSN indicated by ADD[25:11] is identified.

Figure 33:
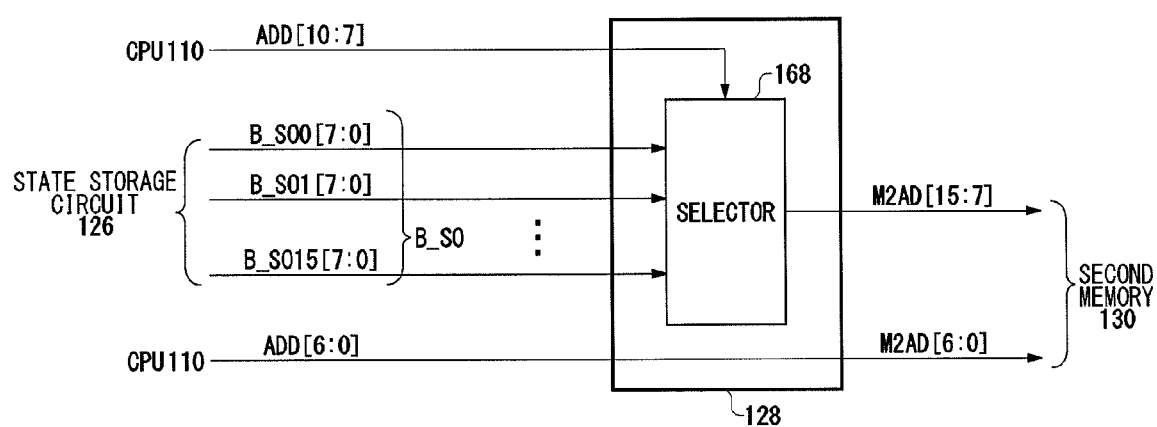
FIG. 33 shows the configuration of the address conversion circuit according to the variation directed to linking.

FIG. 33 shows the configuration of the address conversion circuit 128 according to the variation directed to linking.

The configuration of the address conversion circuit 128 as shown in substantially the same as that of the address conversion circuit shown in FIG. 10 according to the basic implementation. A logical address ADD designated by the CPU 110 and B_SO transmitted from the state storage circuit 126 are fed to the address conversion circuit 128. Of the logical address ADD[31:0], ADD[31:11] is fed to the selector 144 of the state storage circuit 126. The selector 144 transmits the segment information for the buffer space corresponding to the LBID/LBSN designated by ADD[31:11] to the address conversion circuit 128 as B_SO. If the designated buffer space is not located, access to the second memory 130 fails.

Of the logical address ADD[31:0] designated by the CPU 110, SegOdr designated by ADD[10:7] is fed to the selector 168 in the address conversion circuit 128. If SegOdr=m, the selector 168 sends SegID, included in B_SO, of the associated segment (No.:m) as M2AD[14:7]. The intra-segment address (SegAdd) indicated by ADD[6:0] is sent as M2AD [6:0] unmodified. In this way, a logical address ADD[31:0] is converted into a physical address [15:0].

Figure 34:
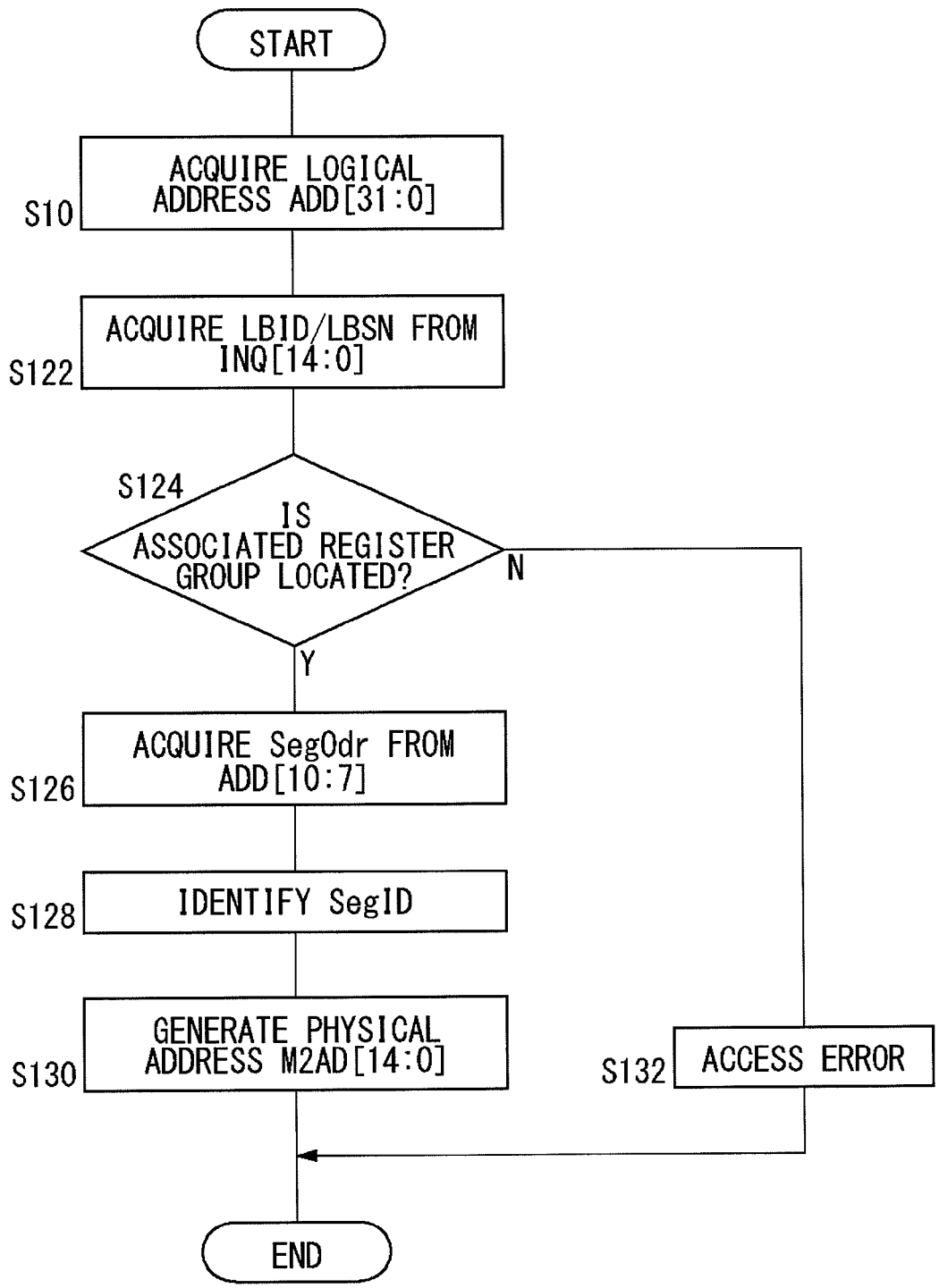
FIG. 34 is a flowchart showing the steps performed in address conversion according to the variation directed to linking.

FIG. 34 is a flowchart showing the steps performed in address conversion according to the variation directed to linking.

A task executed by the CPU 110 designates a location in the second memory 130 to be accessed, using a logical address ADD[31:0]. The address conversion circuit 128 acquires the logical address ADD[31:0] (S10). Thereupon, the state storage circuit 126 acquires ADD[31:16] in the logical address ADD[31:0]. The selector 144 of the state storage circuit 126 acquires the LBID/LBSN of the buffer space to be accessed, by referring to INQ[14:0] in ADD[31:0] (S122). The selector 144 of the state storage circuit 126 checks the link register 214 of each register group 140 so as to determine whether the associated register group is located (S124). The assignment control circuit 120 may perform the same determination by placing an inquiry to the buffer ID search circuit 200.

If the associated register group is not located (N in S124), the selector 144 is notified of an access error (S132). If the associated register group is located (Y in S124), the selector 144 of the state storage circuit 126 forward the segment assignment information from the associated register group 140 to the address conversion circuit 128 as B_SO.

The address conversion circuit 128 acquires the segment number by referring to ADD[10:7] (S126). The selector 168 of the address conversion circuit 168 identifies SegID for the designated segment number by referring to B_SO (S128). A physical address M2AD[15:0] is generated from SegID thus identified and the intra-segment address indicated by ADD [6:0].

Figure 35:
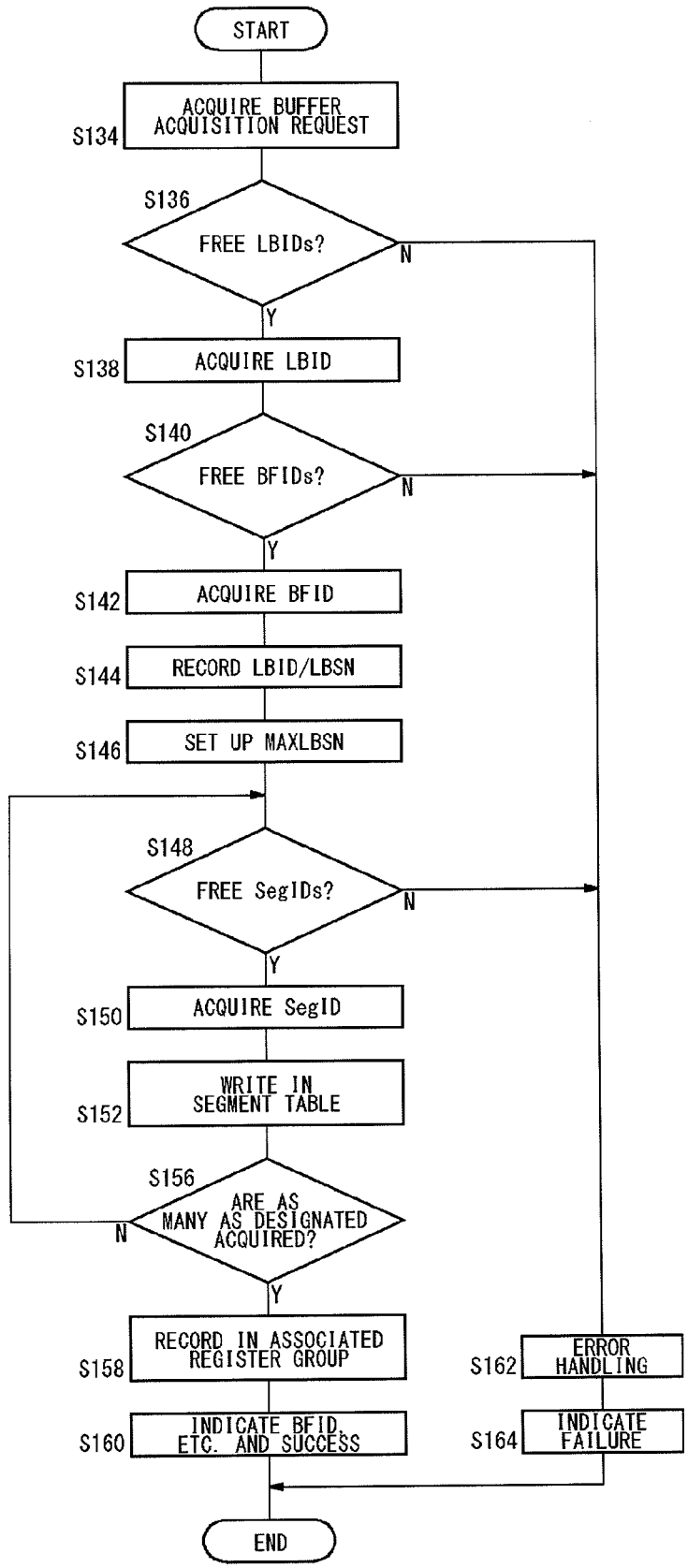
FIG. 35 is a flowchart showing the steps performed in buffer acquisition in the variation directed to linking.

FIG. 35 is a flowchart showing the steps performed in buffer acquisition in the variation directed to linking.

In order to request a buffer space in which to store a result of execution, a task sends a "buffer acquisition request" command to the assignment control circuit 120 via the CPU interface 132. In addition to the number of segments to be assigned to the buffer, the task also transmits MAX_LBSN as a configuration parameter. Upon reading REQ_D from the buffer acquisition request, the assignment control circuit 120 starts a buffer acquisition process described below.

The assignment control circuit 120 acquires a buffer acquisition request command (S24). The assignment control circuit 120 checks LBS_RD_ABL of the LBID queue 198 to determine whether there is a free LBID (S136). If there is no free LBIDs (N in S136), control proceeds to S162 for error handling. If there is a free LBID (Y in S136), the assignment control circuit 120 acquires one LBID by referring to LBS_DO (S138). It will be assumed that LBID=p is acquired.

The assignment control circuit 120 then checks LBS_EMP_BFID[4] from the buffer ID search circuit 200 to determine whether there is a free BFID (S140). If there is no free BFIDs, i.e., buffers available for assignment (N in S140), control proceeds to S162 for error handling. If there is a free buffer (Y in S140), the assignment control circuit 120 acquires one BFID by referring to LBS_EMP_BFID[3:0] (S142). It will be assumed that BFID=n is acquired.

The assignment control circuit 120 configures LBS_B-FID_I[3:0] such that BFID=n, sets LBS_BFID J[4] to "1" to indicate a write instruction, configures LBS_LBID[6:0] such that LBID=p, configures LBS_LBSN[7:0] such that LBSN=0, and then asserts LBS_WR so as to record LBID/LBSN=(p,0) in BFID=n (S144). The assignment control circuit 120 records a configuration parameter MAX_LBSN in the MAXLBSN table 202 (S146). In this way, LBID and MAX_LBSN are associated in the MAXLBSN table 202.

The assignment control circuit 120 checks UAS_RD_ABL from the segment queue 124 to determine whether there is a free SegID (S148). If there are no free segments (N in S148), control proceeds to S162 for error handling. If there is a free segment (Y in S148), the assignment control circuit 120 acquires one SegID by referring to UAS_DO (S150). The assignment control circuit 120 records BFID=n and SegID in the segment table of the table storage 134 in association with LBID=p and LBSN=0 (S152). The SegIDs are recorded, starting with the segment number 0 in the buffer (LBSN:0). The segment number for which SegID is recorded is designated as "assigned:1" and the other segment numbers are designated as "unassigned:0". If the number of SegIDs acquired falls short of the number designated in the configuration parameters (N in S156), control returns to S148. If as many SegIDs as designated are acquired (Y in S156), the assignment control circuit 120 allows segment assignment information to be recorded in the associated register group 140 of the state storage circuit 126, designating the acquired BFID=n and asserting WR (S158).

Thus, the new association between a buffer and segments is recorded in the state storage circuit 126. The link register 214 records (LBID,LBSN)=(p,0). The assignment control circuit 120 notifies the CPU 110 of the success of "buffer acquisition request", via RES_D, with LBID=p, LBSN=0, and BFID=n as result parameters (S160).

Meanwhile, if the acquisition of LBID, BFID or SegID fails (N in S136, N in S140, N in S148), the assignment control circuit 120 performs a predetermined error handling process (S162) and then notifies the CPU 110 of the failure of "buffer acquisition request" (S164).

Figure 36:
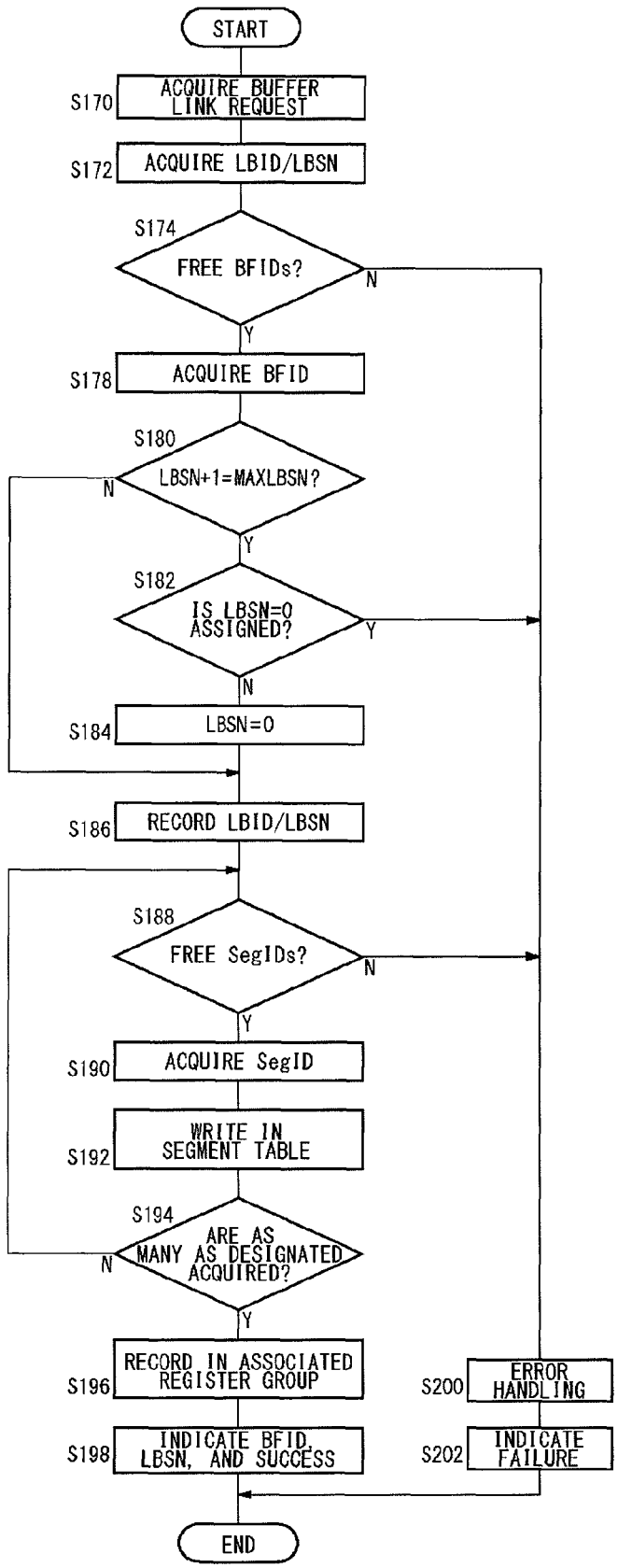
FIG. 36 is a flowchart showing the steps performed in buffer linking according to the variation directed to linking.

FIG. 36 is a flowchart showing the steps performed in buffer linking according to the variation directed to linking.

When a new buffer is linked to a linked space to which one or more buffers are assigned, the CPU 110 feeds a "buffer link request" to the assignment control circuit 120. The configuration parameters of a buffer link request include LBID, LBSN, and the number of segments. LBID identifies a link space subject to the linking process, and LBSN identifies the location of linking in the linked space. For example, if LBSN=2, a new buffer is linked to the location identified by LBSN=3, basically. It will be assumed here that LBID=p and LBSN=q are designated in the configuration parameters.

The assignment control circuit 120 acquires a buffer link request command (S170). The assignment control circuit 120 acquires LBID=p and LBSN=q from the configuration parameters (S172). The assignment control circuit 120 checks LBS_EMP_BFID[4] from the buffer ID search circuit 200 to determine whether there is a free BFID (S174). If there are no free BFIDs (N in S174), control proceeds to S200 for error handling. If there is a free BFID (Y in S174), the assignment control circuit 120 acquires one BFID by referring to LBS_EMP_BFID[3:0] (S178). It will be assumed that BUFID=n is acquired.

If it is determined that q+1=MAX_LBSN does not hold by referring to LBSN=q designated by the configuration parameters (N in S180), LBSN=q+1 will be a new location to link a buffer to. If q+1=MAX_LBSN (Y in S180), a buffer is linked to the location identified by LBSN=0. However, if the buffer (LSBN:0) is already assigned (Y in S182), control proceeds to S200 for error handling. If the buffer (LBSN:0) is released (N in S182), the buffer (LSBN:0) will be a new location to link a buffer to (S184). The assignment control circuit 120 records the combination LBID=p, LBSN=q+1 or 0, and BFID=n in the buffer ID search circuit 200 (S186).

Subsequently, the assignment control circuit 120 checks UAS_RD_ABL from the segment queue 124 to determine whether there is a free SegID (S188). If there are no free segments (N in S180), control proceeds to S200 for error handling. If there is a free segment (Y in S188), the assignment control circuit 120 acquires one SegID by referring to UAS_DO (S190). The assignment control circuit 120 records BFID=n, SegID, LBID=p, and LBSN=q+1 or 0 in the table storage 134 in association with (S192). The segment number for which SegID is recorded is designated as "assigned:1" and the other segment numbers are designated as "unassigned:0". If the number of SegIDs acquired falls short of the number designated in the configuration parameters (N in S194), control returns to S188. If as many SegIDs as designated are acquired (Y in S194), the assignment control circuit 120 allows the segment assignment information to be recorded in the associated register group 140 of the state storage circuit 126, designating acquired BFID=n and asserting WR (S196).

In this way, the new correspondence between a buffer and segments is recorded in the state storage circuit 126. The link register 214 will record (LBID,LBSN)=(p,q+1 or 0). The assignment control circuit 120 notifies the CPU 110 of the success of "buffer link request" via RES_D, with LBSN=q+1 or 0 and BFID=n as result parameters (S198).

Meanwhile, if the acquisition of BFID or SegID fails (N in S174, N in S182, N in S188), the assignment control circuit 120 performs a predetermined error handling process (S200) and notifies the CPU 110 of the failure of "buffer link request" (S202).

Figure 37:
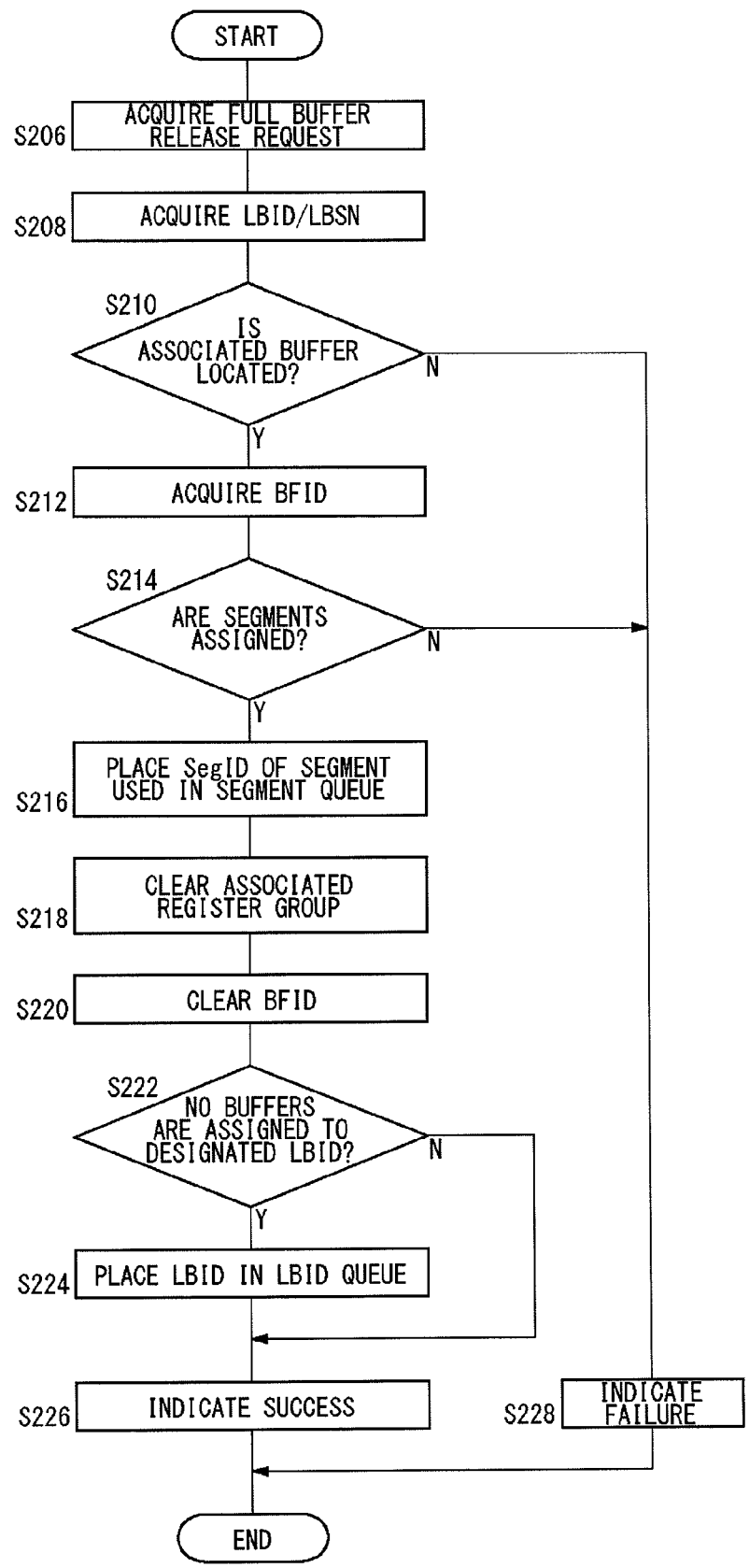
FIG. 37 is a flowchart showing the steps performed in full buffer release according to the variation directed to linking.

FIG. 37 is a flowchart showing the steps performed in full buffer release according to the variation directed to linking.

In the variation, as in the basic implementation, a task transmits, for full release, a "full buffer release request command" to the assignment control circuit 120 via the CPU interface 132. LBID of a linked space to be released and LBSN of a buffer space to be released are designated by configuration parameters for the full buffer release request according to the variation directed to linking. It will be assumed here that LBID=p and LBSN=q are designated in the configuration parameters.

The assignment control circuit 120 acquires a full buffer release request command (S206). The assignment control circuit 120 acquires LBID=p and LBSN=q designated in the configuration parameters (S208). The assignment control circuit 120 places an inquiry to the buffer ID search circuit 200 to determine whether a buffer is assigned to the combination (LBSN,LBID)=(p,q) (S210). If a buffer is not assigned (N in S210), the assignment control circuit 120 notifies the CPU 110 of the "failure" of the full buffer release request (S228). If a buffer is assigned (Y in S210), the assignment control circuit 120 acquires the assigned BFID by referring to LBS_BFID_O[3:0] (S212). It will be assumed that BFID=n. The assignment control circuit then reads the data in the register group 140 corresponding to BFID=n from BS_RD. If there are no segments designated as "assigned:1" in the associated buffer space (N in S214), the "full buffer release request" is invalid so that the circuit 120 notifies the CPU 110 of a failure (S228).

If a segment designated as "assigned:1" is located (Y in S214), the assignment control circuit 120 places SegID of the segment designated as "assigned:1" in the segment queue 124 (S216). Further, the assignment control circuit 120 sets all of the segment registers 146 in the register group (ID:n) to "unassigned:0", by asserting CLR (S220). In this way, the association between a buffer and segments in the register group 140 (ID:n) is cleared and the formerly assigned segments are made available again for assignment. The assignment control circuit 120 indicates a clear instruction to the buffer ID search circuit 200 by setting LBS_BFID[4] such that LBS_BFID[4]=0 and clears the association between BFID=n and (LBID,LBSN)=(p,q) using LBS_LBID, LBS_LBSN, and LBS_BFID_I. In this way, the association in the buffer ID search circuit 200 between buffers and a linked space is cleared. If no buffers are assigned in a designated linked space (LBID:p) (Y in S222), the assignment control circuit 120 places LBID=p in the LBID queue 198 so as to make LBID=p available for assignment again (S224). If at least one buffer is assigned (N in S222), step S224 is skipped. Whether or not any buffer is assigned to LBID=p designated in the configuration parameters is determined according to the value of LBS_LBID_EX. Finally, the assignment control circuit 120 notifies the CPU 110 of the success of "full buffer release request" via RES_D (S226). The steps performed in partial buffer release are the same as those described in relation to the basic implementation.

Figure 38:
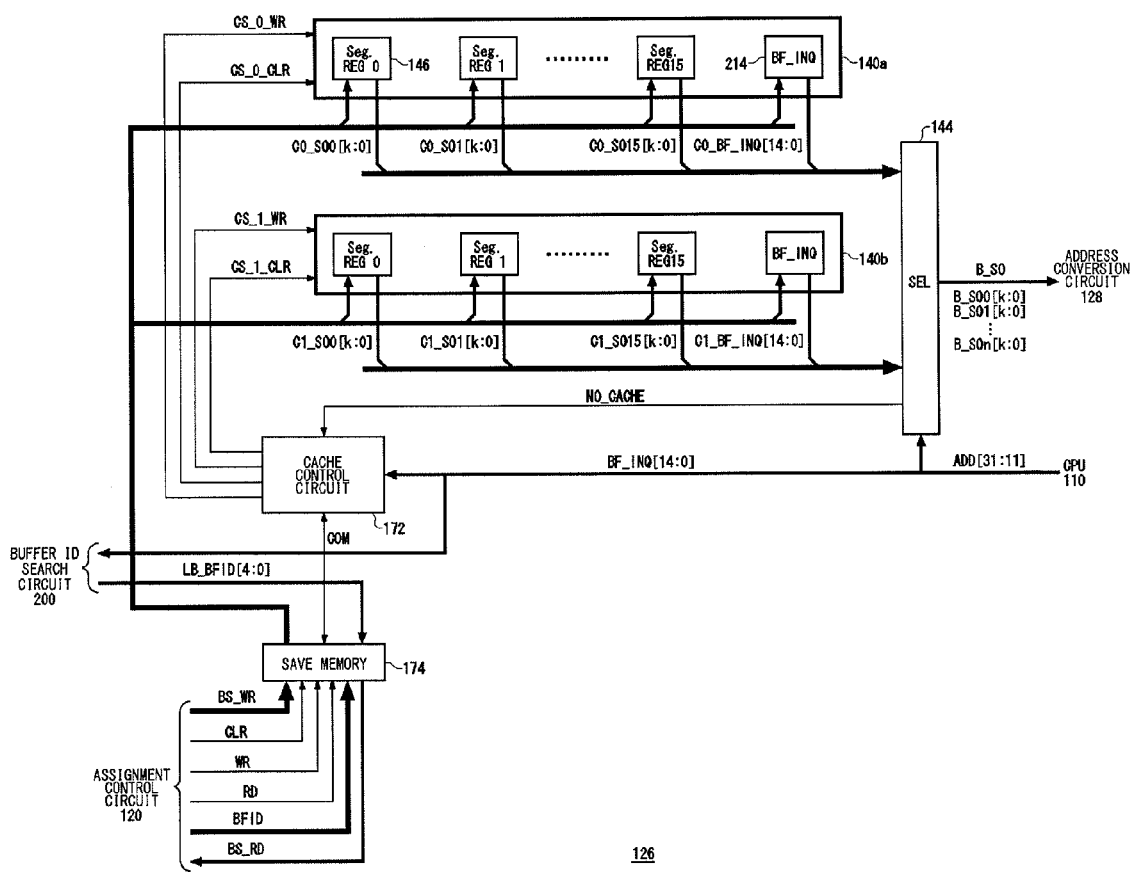
FIG. 38 is related to the variation directed to linking and shows the configuration of the state storage circuit provided with a cache control function.

FIG. 38 is related to the variation directed to linking and shows the configuration of the state storage circuit 126 provided with a cache control function.

The illustrated configuration is basically the same as that of the state storage circuit 126 of FIG. 18. The difference is that each register group 140 includes the link register 214 but does not include the buffer ID register 170. As in FIG. 18, it will be assumed that there are only two register groups 140. The segment assignment information for all buffers are stored in the save memory 174. Of these, the segment assignment information for two buffers are also stored in the register group 140a or the register group 140b. The link register 214 stores INQ, i.e., LBID/LBSN corresponding to the associated register group 140.

When the assignment control circuit 120 asserts WR in order to record segment assignment information, the CASH control circuit 172 updates the data in the associated area in the save memory 174. If the data for the associated buffer space is located in a register group 140, the updated data is reflected in the group. If not, the circuit 120 loads the updated data for the associated buffer space into one of the register groups 140.

When the assignment control circuit 120 asserts CLR in order to clear segment assignment information, the CASH control circuit 172 updates the data in the associated area in the save memory 174. If the data for the associated buffer space is located in a register group 140, all segment registers 146 in the register group 140 are designated "unassigned".

When the assignment control unit 120 asserts RD in order to read segment assignment information, the CASH control circuit 172 outputs the data in the associated area in the save memory 174 via BS_RD.

When the CPU 110 designates a logical address D[31:0], the selector 144 retrieves INQ[14:0] from the address and determines whether the data for the associated buffer space is located in a register group 140 by checking the link register 214. If the data is located, the circuit 172 outputs the segment assignment information in the register group 140 as B_SO to the address conversion circuit 128. If the data for the associated buffer space is not located in the register groups 140, the circuit 120 asserts NO_CACHE.

Meanwhile, ADD[31:0] is converted into BF_INQ[14:0] and sent to the buffer ID search circuit 200. For compatibility with the cache control function of the state storage circuit 126, the buffer ID search circuit 200 has the function of returning BFID corresponding to LBID/LBSN designated by BF_INQ[14:0] to the save memory 174 via LB_BFID[4:0]. The configuration of the buffer ID search circuit 200 will be described with reference to FIG. 39.

The CASH control circuit 172 selects the segment assignment information in the save memory 174 for the associated buffer, based upon the data returned from the state storage circuit 126. The circuit 172 loads the information in one of the register groups 140 before outputting the information as B_SO.

Figure 39:
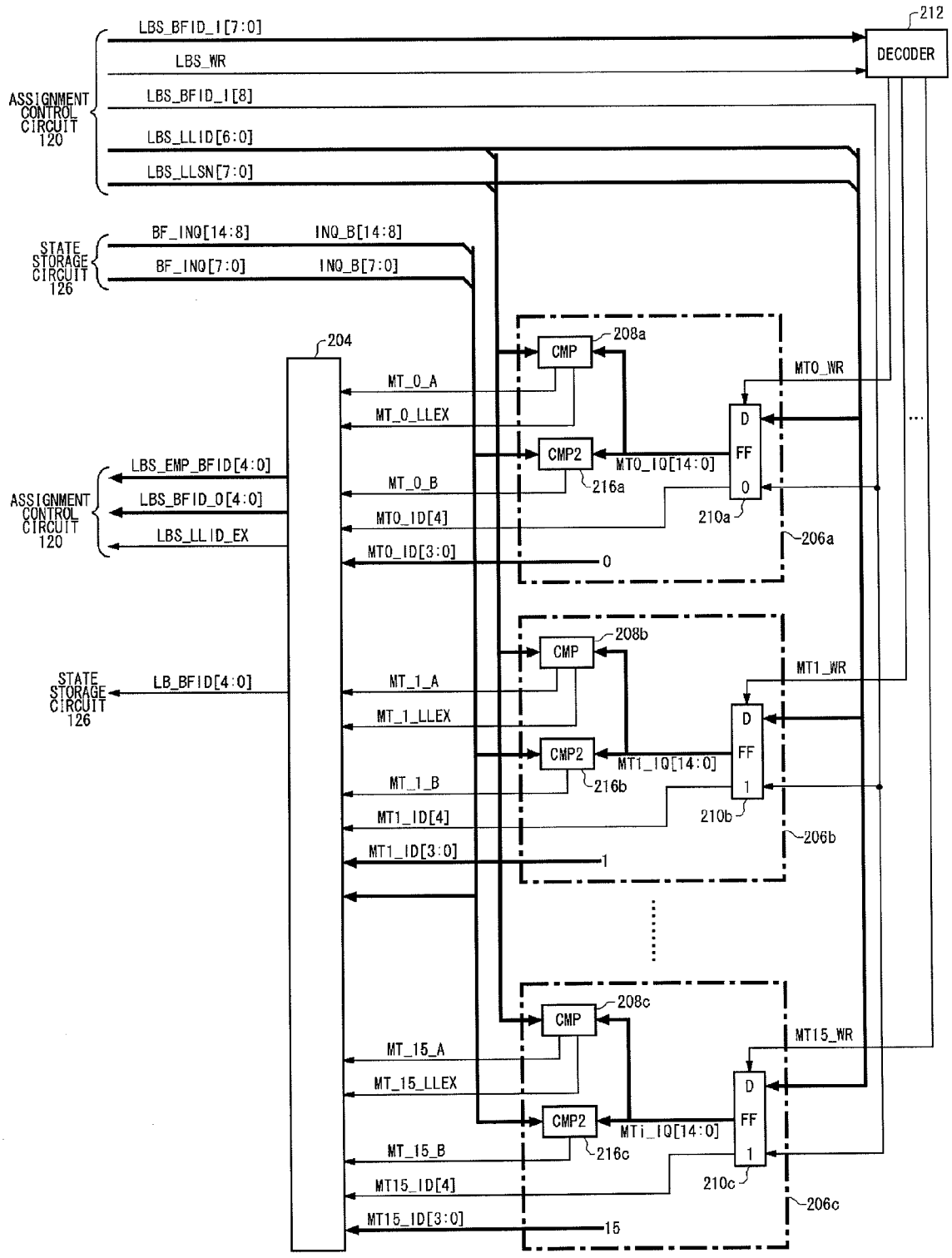
FIG. 39 shows the configuration of the buffer ID search circuit configured to be compatible with the cache control function of the state storage circuit of FIG. 38.

FIG. 39 shows the configuration of the buffer ID search circuit 200 configured to be compatible with the cache control function of the state storage circuit 126 of FIG. 38.

The difference from the buffer ID search circuit 200 shown in FIG. 31 is that the circuit 200 is fed from the state storage circuit 126 BF_INQ[14:8] and BF_INQ[7:0], BF_INQ[14:8] indicating LBID and BF_INQ[7:0] indicating LBSN. The circuit 200 outputs BFID corresponding LBID/LBSN designated by BF_INQ[14:0] to the state storage circuit 126 as LB_BFID[4:0].

For this purpose, the INQ information circuit 206 is additionally provided with a second comparison circuit 216. The second comparison circuit 216 compares LBID/LBSN designated by BF_INQ[14:0] and LBID/LBSN in the storage circuit 210. If they match, the circuit 216 asserts MT_n_B. The selector 204 outputs BFID corresponding to BF_INQ [14:0] to the state storage circuit 126 via LB_BFID[4:0].

According to segment-by-segment memory management described in the basic implementation, variation directed to improvement in transfer process, and variation directed to linking, the usage efficiency of the second memory 130 can be improved. Various application task executed by the CPU 110 can access buffer spaces using logical addresses. Particularly, according to the memory management method described in the variation directed to improvement in transfer process, continuity of logical addresses can be maintained even when segments are transferred between a plurality of buffer spaces. Accordingly, programming load can be reduced while improving the efficiency of memory usage.

According to the memory management method described in the variation directed to linking, a range of logical addresses can be expanded beyond the size of a single buffer space. For this reason, even those applications requiring a memory size that varies greatly can be executed without excessively elaborating or enlarging the circuitry of the memory management device 100.

The uniqueness of the memory management device 100 lies, in part, in that the memory management function as described above is implemented in hardware logic. As an application task executed by the CPU 110 feeds commands such as a "buffer acquisition request" or a "full buffer release request" to the memory management device 100, the memory management device 100 can execute the command without hardly depending on the computing power of the CPU 110.

If the function comparable with the memory management function is to be implemented by a software OS, the function will have to be executed by the OS by using the computing power of the CPU 110. Since the memory management device 100 is dedicated to memory management unlike the CPU 110, which is a general-purpose processor, overhead is significantly reduced. Reduction in overhead not only improves the system throughput significantly but also reduces power consumption. The advantage will prove useful especially in an embedded system, in which high speed, small storage capacity, and small power consumption are design requirements.

Normally, program codes, such as the malloc function of C, for reserving a heap memory cost high.

For this reason, a computer program which frequently repeats reservation and release of a heap memory will be poor in processing performance. Therefore, memory areas of relatively large sizes are often reserved initially. However, the execution of such a program will likely to create a "memory area reserved as an assigned area but is not actually used". This will create a situation that cannot be easily tolerated by a system with a small memory capacity.

In contrast, the memory management device 100 can perform a memory management process such as reservation and release of a heap memory without imposing a substantial load on the CPU 110. Accordingly, a "program which frequently repeats reservation and release of a heap memory" does not require a high execution cost. In other words, the inventive approach allows a program which "reserves as much memory as necessary when it is needed and release as much memory as unnecessary when it is no longer needed" to be executed with a high performance. Thus, the efficiency of memory usage can be improved in respect of coding.

As described at the outset, the memory management function is a core function of an OS. The inventive approach makes it possible to provide the core function in the form of memory management device 100, which is hardware. Therefore, the memory management device 100 is expected to improve the efficiency of memory usage of various electronic devices and, ultimately, the processing performance thereof.

Described above is an explanation based upon an exemplary embodiment. The embodiment is intended to be illustrative only and it will be obvious to those skilled in the art that various modifications to constituting elements and processes could be developed and that such modifications are also within the scope of the present invention.

The function of the "execution control circuit" as described in the claims is primarily implemented as the function of the CPU 110. The function of the "memory" as described in the claims is primarily implemented as the function of the second memory 130. The "range number" as described in the claims is represented by a segment number (SegOdr). The "invalidation of segment ID" as described in the claims is represented by designation as "unassigned:0." Similarly, the "segment ID validly recorded" as described in the claims is represented by an assigned segment.

The function of the "save control circuit" as described in the claims is mainly implemented as the function of the CASH control circuit. The "recorded state information" as described in the claims is represented as a tail address indicated by Bn_Sm[19:8].

The "linked space queue" as described in the claims is mainly represented as the LBID queue 198.

The "linked ID" and "location number" described in the claims are represented as LBID and LBSN, respectively.

The "first bus" described in the claims largely corresponds to the data bus DT connecting the CPU 110 and the assignment control circuit 120. The "second bus" corresponds to the plurality of signal lines for, for example, BS_RD and BS_WR connecting the assignment control circuit 120 and the state storage circuit 126 via or not via the table storage 134. The "third bus" largely corresponds to a transmission signal line for B_SO connecting the state storage circuit 126 and the address conversion circuit 128. The "fourth bus" corresponds to the plurality of signal lines connecting the assignment control circuit 120 and the segment queue 124. The "fifth bus" corresponds to the plurality of signal lines connecting the assignment control circuit 120 and the buffer queue 122.

It will be understood to those skilled in the art that the other functions to be achieved by the elements as claimed are implemented by each of the functional blocks described or by the coordination of the blocks.

What is claimed is:

1. A memory management device comprising:
an execution control circuit configured to execute at least one task;
a memory divided into a plurality of segments, and configured to store data in units of segments;
an assignment control circuit configured to assign to a task a buffer ID identifying one of a plurality of buffer spaces, which are logical address spaces;
an address conversion circuit configured to convert a logical address in a buffer space into a physical address;
a state storage circuit configured to store, as segment assignment information, the association between a buffer space and a segment by associating a buffer ID and a segment ID;
a segment queue configured to store a segment ID of a segment available for assignment; and
a buffer queue configured to store a buffer ID of a buffer space available for assignment, wherein the state storage circuit includes a plurality of register groups each including a plurality of segment registers, each register group being associated with one of the plurality of buffer spaces, and a segment register storing a range number identifying a range of logical addresses in the associated buffer space, the assignment control circuit, upon receipt of a buffer acquisition request requesting assignment of a buffer space that includes at least one segment, sets up association between a buffer space and a segment by acquiring a buffer ID and at least one segment ID from the buffer queue and the segment queue, respectively, and by recording the at least one segment ID thus acquired in at least one segment register in the register group associated with the buffer ID thus acquired, and the address conversion circuit, upon receipt of an access request designating a destination of access with a logical address, converts a logical address into a physical address by referring to segment assignment information output from the state storage circuit, identifying a range number which occurs in the register group associated with a task requesting the access and which is associated with the designated logical address, acquiring a segment ID stored in the segment register associated with the range number, and identifying a physical address associated with the segment ID.

2. The memory management device according to claim 1, wherein the assignment control circuit, upon receipt of a full release request requesting release of a buffer space, makes the buffer space designated in the full release request and the segments associated with the buffer space available again for assignment, by invalidating the segment IDs recorded in the segment registers in the register group associated with the buffer ID designated in the full release request, places the designated buffer ID in the buffer queue, and places the invalidated segment IDs in the segment queue.

3. The memory management device according to claim 1, wherein the assignment control circuit, upon receipt of a partial release request requesting partial release of a buffer space, makes the segments associated with the logical address designated in the partial release request and the subsequent addresses available again for assignment, by identifying a range number associated with the logical address preceding the logical address designated in the partial release request by a predetermined number of bytes in the register group associated with the buffer ID designated in the partial release request, invalidates the segments indicated by the range numbers associated with the logical addresses that follow the logical address associated with the identified range number, and placing the invalidated segment IDs in the segment queue.

4. The memory management device according to claim 1, wherein the assignment control circuit, upon receipt of a segment transfer request requesting transfer of data from a first buffer space to a second buffer space, associates the segments corresponding to the second buffer space with the first buffer space, by additionally recording, in the segment registers in the register group associated with the first buffer space, the segment IDs validly recorded in the register group associated with the second buffer space.

5. The memory management device according to claim 4, wherein the assignment control circuit, upon receipt of a segment transfer request, makes the second buffer space available again for assignment, by invalidating the segment IDs in the segment registers in the register group associated with the second buffer space, placing the buffer IDs associated with the second buffer space in the buffer queue, and placing the invalidated segment IDs in the segment queue.

6. The memory management device according to claim 1, wherein each of the register groups in the state storage circuit further includes a buffer register for storing a buffer ID, the state storage circuit includes:
a save memory configured to save data stored in the buffer registers and the segment registers; and
a save control circuit configured to execute data load from the save memory to a register group, and wherein the save control circuit loads, in the absence of data for an access destination buffer space in the register groups, data for the access destination buffer space in the save memory to a register group.

7. The memory management device according to claim 1, wherein each of the segment registers further stores recorded state information indicating a range in which data is written in the associated segment, and the address conversion circuit refers to the recorded state information upon receipt of an access request so as to adjust the association between a range number and a logical address range.

8. The memory management device according to claim 1, further comprising a linked space queue configured to store a link ID of a linked space available for assignment, the available linked space being one of a plurality of linked spaces each formed as a single logical address space by linking at least one buffer space, wherein each of the register groups includes a link register configured to store a link ID of a linked space to which the associated buffer space belongs and also store a position number indicating a logical address range which forms the entirety of logical address range of the linked space and which is associated with said buffer space, the control assignment circuit, upon receipt of a buffer acquisition request, sets up association between a linked space and a buffer space, by acquiring, in addition to a buffer ID and a segment ID, a link ID from the link space queue, and recording a link ID and a position number in the link register in the register group associated with the acquired buffer ID, the assignment control circuit, upon receipt of a buffer link request requesting addition of a buffer space to a linked space, adds a buffer space to the linked space by acquiring a buffer ID from the buffer queue, recording the link ID and the position number designated in the buffer link request in the link register in the register group associated with the buffer ID thus acquired, the address conversion circuit, upon receipt of an access request, identifies, as a register group to be accessed by a task originating the access request, a register group storing the link ID and the position number designated in the access request.

9. A memory management device for controlling access from a CPU to a memory divided into a plurality of segments, the device comprising:

- an assignment control circuit connected to the CPU via a first bus and configured to assign to a task a buffer ID identifying one of a plurality of buffer spaces, which are logical address spaces;
- a state storage circuit connected to the assignment control circuit via a second bus and configured to store, as segment assignment information, the association between a buffer space and a segment by associating a buffer ID and a segment ID;
- an address conversion circuit connected to an address bus of the CPU, connected to the state storage circuit via a third bus, and configured to convert a logical address in a buffer space into a physical address;
- a segment queue connected to the assignment control circuit via a fourth bus and configured to store a segment ID of a segment available for data write; and
- a buffer queue connected to the assignment control circuit via a fifth bus and configured to store a buffer ID of a buffer space available for assignment, wherein the state storage circuit includes a plurality of register groups each including a plurality of segment registers, each register group being associated with one of the plurality of buffer spaces, and a segment register being assigned a range number identifying a range of logical addresses in the associated buffer space, the assignment control circuit, upon receipt of a buffer acquisition request requesting assignment of a buffer space that includes at least one segment from the CPU via the first bus, acquires a buffer ID and at least one segment ID from the buffer queue and the segment queue, respectively, via the fourth bus and the fifth bus, respectively, and records the segment ID thus acquired in at least one segment register in the register group associated with the buffer ID thus acquired, and the address conversion circuit, upon receipt of a logical address sent from the CPU to the address bus, converts a logical address into a physical address by referring to segment assignment information output from the state storage circuit via the third bus, identifying a range number which occurs in the buffer space associated with a task requesting the access and which is associated with the designated logical address, identifying a segment ID stored in the segment register associated with the range number, and identifying a physical address associated with the segment ID.

\* \* \* \* \*

UNITED STATES PATENT AND TRADEMARK OFFICE
CERTIFICATE OF CORRECTION

PATENT NO. : 8,060,723 B2  
APPLICATION NO. : 12/281603  
DATED : November 15, 2011  
INVENTOR(S) : Naotaka Maruyama Page 1 of 1

It is certified that error appears in the above-identified patent and that said Letters Patent is hereby corrected as shown below:

On the Title Page

In Item (86) PCT No., change "PCT/US2007/050131" to --PCT/JP2007/050131--.

Signed and Sealed this
Fourteenth Day of April, 2015

Michelle K. Lee
*Director of the United States Patent and Trademark Office*